United States Patent
Kawasaki et al.

(10) Patent No.: US 6,223,265 B1
(45) Date of Patent: *Apr. 24, 2001

(54) SINGLE-CHIP MICROCOMPUTER SYNCHRONOUSLY CONTROLLING EXTERNAL SYNCHRONOUS MEMORY RESPONSIVE TO MEMORY CLOCK SIGNAL AND CLOCK ENABLE SIGNAL

(75) Inventors: Shumpei Kawasaki, Tokyo; Yasushi Akao, Kokubunji; Kouki Noguchi, Tokyo; Atsushi Hasegawa, Tachikawa; Hiroshi Ohsuga, Hino; Keiichi Kurakazu, Tokorozawa; Kiyoshi Matsubara, Higashimurayama; Akio Hayakawa, Hachiouji; Yoshitaka Ito, Kodaira, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,093

(22) Filed: Nov. 13, 1998

Related U.S. Application Data

(63) Continuation of application No. 09/055,099, filed on Apr. 3, 1998, which is a continuation of application No. 08/306,100, filed on Sep. 14, 1994, now abandoned.

(30) Foreign Application Priority Data

Sep. 17, 1993 (JP) .................................................... 5-255099
Feb. 9, 1994 (JP) .................................................... 6-036472

(51) Int. Cl.[7] .................................................... G06F 12/00
(52) U.S. Cl. .......................... 711/167; 711/105; 711/111; 710/129; 712/33; 712/34; 712/35; 712/36; 712/37; 712/38; 712/39; 712/40; 713/500; 713/600

(58) Field of Search ...................................... 713/500–600; 712/32–36, 33–40; 711/105–217

(56) References Cited

U.S. PATENT DOCUMENTS

| 4,491,907 | 1/1985 | Koeppen et al. ........................ 712/34 |
| 4,626,985 | 12/1986 | Briggs ...................................... 712/40 |

(List continued on next page.)

FOREIGN PATENT DOCUMENTS

| 0346917 | 12/1989 | (EP) | ................................ G06F/13/28 |
| 0506594 | 9/1992 | (EP) | .................................. G06F/3/12 |

(List continued on next page.)

OTHER PUBLICATIONS

IEEE Journal of Solid–State Circuits, vol. 26, No. 11, Nov. 11, 1991, pp. 1586–92, "A 0.5W 64–Kilobyte Snoopy Cache Memory with Pseudo Two–Port Operation" by Kobayashi et al.

(List continued on next page.)

Primary Examiner—Meng-Ai T. An
Assistant Examiner—Nabil El-Hady
(74) Attorney, Agent, or Firm—Loudermilk & Associates

(57) ABSTRACT

A single-chip microcomputer comprising: a first bus having a central processing unit and a cache memory connected therewith; a second bus having a dynamic memory access control circuit and an external bus interface connected therewith; a break controller for connecting the first bus and the second bus selectively; a third bus having a peripheral module connected therewith and having a lower-speed bus cycle than the bus cycles of the first and second buses; and a bus state controller for effecting a data transfer and a synchronization between the second bus and the third bus. The single-chip microcomputer has the three divided internal buses to reduce the load capacity upon the signal transmission paths so that the signal transmission can be accomplished at a high speed. Moreover, the peripheral module required to have no operation speed is isolated so that the power dissipation can be reduced.

19 Claims, 42 Drawing Sheets

U.S. PATENT DOCUMENTS

| | | | | |
|---|---|---|---|---|
| 4,649,511 | * | 3/1987 | Gdula | 711/106 |
| 4,670,838 | | 6/1987 | Kawata | 714/38 |
| 4,794,524 | | 12/1988 | Carberry et al. | 712/32 |
| 4,870,562 | * | 9/1989 | Kimoto et al. | 711/167 |
| 4,918,650 | * | 4/1990 | De Wolf | 710/129 |
| 4,935,867 | * | 6/1990 | Wang et al. | 711/217 |
| 4,975,593 | * | 12/1990 | Kurakazu et al. | 327/141 |
| 4,984,195 | | 1/1991 | Nakamura et al. | 710/101 |
| 5,155,819 | | 10/1992 | Watkins et al. | 712/36 |
| 5,175,841 | | 12/1992 | Magar et al. | 711/211 |
| 5,270,898 | | 12/1993 | Elms et al. | 361/96 |
| 5,341,172 | * | 8/1994 | Nio et al. | 348/441 |
| 5,353,424 | | 10/1994 | Partovi et al. | 711/128 |
| 5,386,573 | | 1/1995 | Okamoto | 710/260 |
| 5,388,841 | | 2/1995 | San et al. | 463/44 |
| 5,398,048 | * | 3/1995 | O'Mahony | 345/212 |
| 5,426,744 | | 6/1995 | Sawase et al. | 712/228 |
| 5,426,769 | | 6/1995 | Pawluski | 710/2 |
| 5,469,544 | | 11/1995 | Aatresh et al. | 710/110 |
| 5,493,656 | | 2/1996 | Tsukamoto | 710/100 |
| 5,506,973 | | 4/1996 | Okazawa et al. | 710/126 |
| 5,530,890 | | 6/1996 | Moore et al. | 712/32 |
| 5,659,797 | | 8/1997 | Zandveld et al. | 710/22 |
| 5,878,269 | * | 3/1999 | Eitrheim et al. | 712/42 |

FOREIGN PATENT DOCUMENTS

| | | | | |
|---|---|---|---|---|
| 0523764 | 1/1993 | (EP) | | G06F/13/28 |
| 0588607 | 3/1994 | (EP) | | G06F/15/78 |
| 0624844 | 11/1994 | (EP) | | G06F/12/08 |

OTHER PUBLICATIONS

Proceedings, IEEE 1993 Custom Integrated Circuits Conference, May 9, 1993, pp. 25.21–25.24, "A High Performance/Low Power K–byte 4–Way Set Associative Integrated Cache Memory," by Nguyen et al.

IBM Technical Disclosure Bulletin, Nov. 1989, vol. 32, No. 6A, pp. 246–248, "Method of Communication Between a PC and a 68000–Based System Using Parallel Ports."

* cited by examiner

SINGLE-CHIP MICROCOMPUTER SYNCHRONOUSLY CONTROLLING EXTERNAL SYNCHRONOUS MEMORY RESPONSIVE TO MEMORY CLOCK SIGNAL AND CLOCK ENABLE SIGNAL

This application is a continuation of Ser. No. 09/055,099, filed Apr. 3, 1998, which is a continuation of Ser. No. 08/306,100, filed Sep. 14, 1994, abandoned.

BACKGROUND OF THE INVENTION

The present invention relates to a single-chip microcomputer and, more particularly, to a technique which is effective when applied to a high-performance and high-function single-chip microcomputer suited for a home game machine or a portable data communication terminal device.

There is a single-chip microcomputer or a single-chip data processor in which a central processing unit, a direct memory access controller, (as will be shortly referred to as the "DMAC") and a peripheral circuit such as a variety of timers are constructed into a semiconductor integrated circuit device.

An example of this single-chip microcomputer is disclosed in "HITACHI Single-Chip RISC Microcomputer SH7032, SH7034 HARDWARE MANUAL" issued by Hitachi Ltd., in March, 1993.

Thanks to development of the semiconductor technology, a number of semiconductor elements can be formed over one semiconductor substrate. As a result, around the central processing unit, there can be formed peripheral circuits to enhance the performance and function. If, however, a number of peripheral circuits are simply packaged for higher performance and more functions, it has been found that disadvantages are caused from the standpoint of the operation speed or the power dissipation. Moreover, this microcomputer has to have its three-dimensional image processing function enhanced.

SUMMARY OF THE INVENTION

An object of the present invention is to provide a single-chip microcomputer which can realize a high performance and multiple functions.

Another object of the present invention is to provide a single-chip microcomputer which can realize a high operation speed and a low power dissipation.

Still another object of the present invention is to provide a user-friendly single-chip microcomputer.

A further object of the present invention is to provide a single-chip microcomputer which is enabled by a simple construction to enlarge the operation margin and access a synchronous direct type RAM (i.e., Random Access Memory).

A further object of the present invention is to provide a single-chip microcomputer which can execute a three-dimensional image processing at a high speed.

The aforementioned and other objects and novel features of the present invention will become apparent from the following description to be made with reference to the accompanying drawings.

A representative of the invention to be disclosed herein will be briefly described in the following. Specifically, an internal bus is divided into three: the first bus is connected with a central processing unit and a cache memory, and the second bus is connected with a direct memory access controller and an external bus interface. The first bus and the second bus are equipped with a break controller having a bus transceiver function to connect the first address bus and the second address bus selectively. The third bus given a lower speed than the first and second bus cycles is connected with peripheral modules. There is provided a bus state controller for data transfers and synchronizations between the second bus and the third bus.

By dividing the internal bus into three buses, according to the above-specified means, the load capacity of a signal transmission path can be reduced to effect the signal transmissions at a high speed. Moreover, the consumption of current through the peripheral modules required to have no high operation speed can be reduced because the peripheral modules are isolated.

Another representative of the invention to be disclosed herein will be briefly described in the following. Specifically, the internal bus is divided into three: the first bus is connected with a central processing unit and a fixed point type multiply and accumulate arithmetic unit, and the second bus is connected with a fixed point type divider unit.

According to the above-specified means, the first bus is connected with the fixed point type multiply and accumulate arithmetic unit so that the multiply and accumulate arithmetic operations can be accomplished at a high speed with a small number of cycles. The second bus is connected with the fixed point type divider unit, in which the arithmetic result is subjected to a dividing operation while multiply and accumulate operation can be carried out in parallel, so that a three-dimensional image processing can be accomplished at a high speed.

Still another representative of the invention to be disclosed herein will be briefly described in the following. Specifically, the peripheral modules to be connected with the third bus are exemplified by at least one of a free running timer, a serial communication interface and a watch-dog timer.

According to the above-specified means, the peripheral modules to be connected with the third bus are the free running timer, the serial communication interface and/or the watch-dog timer, which have no direct participation in the speed-up of the data processing, so that they can be given low-speed bus cycles. Thus, the existing peripheral modules can be used as they are without following the high speed of the central processing unit, to make the design efficient and to reduce the power dissipation in the peripheral modules.

A further representative of the invention to be disclosed herein will be briefly described in the following. Specifically, the aforementioned break controller is given a function to monitor the rewrite of the data of the cache memory by the direct memory access controller.

According to the above-specified means, the break of the cache data due to the rewrite of the data of the cache memory by the direct memory access controller can be detected while speeding up the operation and reducing the power dissipation by dividing the internal bus.

A further representative of the invention to be disclosed herein will be briefly described in the following. Specifically, each of the aforementioned circuit blocks is constructed of full static type CMOS circuits and is equipped with an operation mode controller including a register for controlling the feed/stop of a clock pulse.

According to the above-specified means, the clock can be fed to only the necessary circuit block so that the power dissipation can be reduced.

A further representative of the invention to be disclosed herein will be briefly described in the following.

Specifically, the aforementioned external bus interface is given the burst read mode and the single-write mode of the synchronous dynamic type RAM, and the interface function to access the dynamic type RAM and a pseudo-static type RAM directly.

According to the above-specified means, the synchronous dynamic type RAM, the dynamic RAM and the pseudo-static type RAM can be directly connected by the external bus interface, to improve the user-friendliness.

A further representative of the invention to be disclosed herein will be briefly described in the following. Specifically, the external bus interface produces a clock pulse, which has its phase advanced from the clock pulse of the central processing unit, and feeds it to the clock terminal of the synchronous dynamic type RAM.

According to the above-specified means, the synchronous dynamic type RAM can be accessed by the clock pulse, which has its phase advanced from the clock pulse of the central processing unit, so that its operation margin can be enlarged.

A further representative of the invention to be disclosed herein will be briefly described in the following. Specifically, a matching is given among the data to be read out in the burst read mode of the synchronous dynamic type RAM, the data of one block of the aforementioned cache memory, and the data transfer unit by the direct memory access controller.

According to the above-specified means, the data to be read out in the burst read mode of the synchronous direct type RAM, the data of one block of the aforementioned cache memory, and the data transfer unit by the direct memory access controller are made to have equal data, so that an efficient data transfer can be accomplished.

A further representative of the invention to be disclosed herein will be briefly described in the following. Specifically, the external bus interface is equipped with a memory control signal generator for generating a control signal necessary for setting the operation mode of the synchronous dynamic type RAM by using an address signal partially, when the central processing unit is started by accessing a predetermined access space to set a row address strobe signal (i.e., RAS), a column address strobe signal (i.e., CAS) and a write enable signal (i.e., WE) to the low level.

According to the above-specified means, the synchronous dynamic type RAM can have its modes easily set by the central processing unit.

A further representative of the invention to be disclosed herein will be briefly described in the following. Specifically, the aforementioned cache memory is constructed of a plurality of tag memories and data memories corresponding to the tag memories. These tag memories and data memories are composed of CMOS static type memory cells. A sense amplifier for amplifying the read signals of the memory cells is exemplified by a CMOS sense amplifier having a CMOS latch circuit and power switch MOSFETs composed of P-channel type MOS FETs and N-channel type MOSFETs for feeding the operation current to the CMOS latch circuit.

According to the above-specified means, the sense amplifier is constructed of a CMOS latch circuit so that no DC current can flow after a signal amplification to reduce the power dissipation.

A further representative of the invention to be disclosed herein will be briefly described in the following. Specifically, only such one of the plurality of data memories as corresponds to a hit signal coming from the tag memory is activated.

According to the above-specified means, only the data memory corresponding to the hit signal coming from the tag memory can be activated to reduce the power dissipation.

A further representative of the invention to be disclosed herein will be briefly described in the following. Specifically, the plurality of data memories invalidate the transmission of all or a portion of the hit signals from the tag memory by the cache controller to make a direct access possible by the central processing unit.

According to the above-specified means, the plurality of data memories of the cache memory can be wholly or partially used as an internal RAM so that the manners of use can satisfy the various requests of users.

A further representative of the invention to be disclosed herein will be briefly described in the following. Specifically, in a single-chip microcomputer including a central processing unit and a cache memory, the cache memory is exemplified by CMOS static type memory cells as memory elements, and a sense amplifier for amplifying the read signal is exemplified by a CMOS sense amplifier composed of a CMOS latch circuit, P-channel type and N-channel type MOSFETs for feeding the operation current to the CMOS latch circuit.

According to the above-specified means, in the single-chip microcomputer including the central processing unit and the cache memory, the CMOS latch circuit is used in the amplification portion of the sense amplifier of the cache memory so that no DC current can flow after the signal amplification of the sense amplifier to reduce the power dissipation.

A further representative of the invention to be disclosed herein will be briefly described in the following. Specifically, only such one of the plurality of data memories as corresponds to the hit signal corresponding to the hit signal coming from the tag memory is activated.

According to the above-specified means, in the single-chip microcomputer having the cache memory packaged therein, only the data memory corresponding to the hit signal can be activated to reduce the power dissipation.

A further representative of the invention to be disclosed herein will be briefly described in the following. Specifically, a first external terminal and a second external terminal are switched for a bus request signal and a bus acknowledge signal, respectively, when a slave mode is set according to a bus use priority control signal, and the first external terminal and the second external terminal are switched for a bus grant signal and a bus release signal, respectively, when a master mode is set.

According to the above-specified means, one single-chip microcomputer can be used for both the slave mode and the master mode in accordance with the bus use priority control signal, and the terminals are switched for use. As a result, the external terminals can be reduced in number and easily connected to improve the user-friendliness.

A further representative of the invention to be disclosed herein will be briefly described in the following. Specifically, of the three-dimensional image processings, the clipping processing of the data of a coordinate point having been perspectively transformed and the coordinate transformation processing for transforming a coordinate point intrinsic to a predetermined object into a coordinate having a specified view point as an origin point cooperatively with a multiply and accumulate unit are accomplished by the central processing unit in parallel with the perspective transformation processing of the coordinate point having been subjected to the coordinate transformation processing by a divider unit.

According to the above-specified means, while the clipping processing and the coordinate transformation processing of the three-dimensional image processing are being performed by the central processing unit and the multiply and accumulate operation unit, the perspective transformation processing taking a longer time is performed in parallel by the divider unit so that a high-speed three-dimensional image processing can be realized.

DESCRIPTION OF THE PREFERRED EMBODIMENTS

Figure 1:
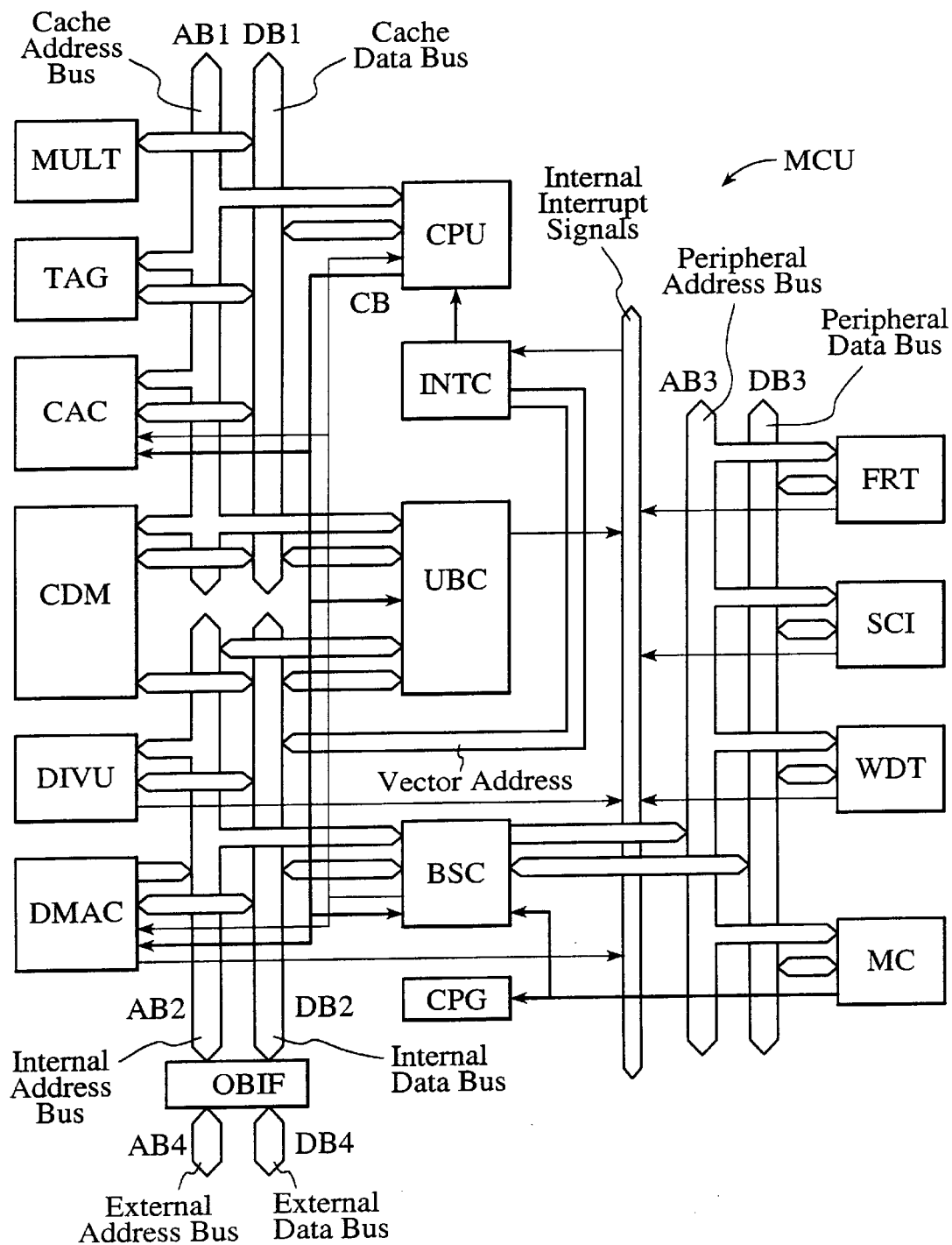
FIG. 1 is a block diagram showing one embodiment of a single-chip microcomputer according to the present invention.

FIG. 1 is a block diagram showing one embodiment of a single-chip microcomputer or microprocessor MCU according to the present invention. The individual circuit blocks of FIG. 1 are formed over a single substrate of single-crystalline silicon by the well-known CMOS (i.e., Complementary MOS) semiconductor integrated circuit manufacturing technology.

The single-chip microcomputer MCU in this embodiment is so directed toward the new generation, although not especially limitative thereto, as to realize high-performance arithmetic operations thereby to integrate the peripheral devices necessary for the system construction by a RISC (i.e., Reduced Instruction Set Computer) type central processing unit CPU and to realize a low power dissipation indispensable for applications to portable devices.

The central processing unit CPU has a set of the RISC type instructions and can improve the instruction executing speed drastically because a fundamental instruction is subjected to a pipe line processing and is operated in the one-instruction and one-state (i.e., in one system clock cycle). Moreover, the central processing unit CPU has its multiplier unit MULT packaged therein to effect such multiply/accumulate arithmetic operations at a high speed as are indispensable for the three-dimensional arithmetic operations, as will be described hereinafter.

The single-chip microcomputer MCU includes as the internal peripheral modules an interrupt controller INTC, a direct memory access controller DMAC, a divider unit DIVU, a free running timer FRT, a watch-dog timer WDT and a serial communication interface SCI so that the user system may be constructed of the minimum number of parts. By an external memory access support function of an internal cache memory, moreover, the single-chip microprocessor MCU can be connected with a dynamic type RAM (i.e., Random Access Memory), a synchronous dynamic type RAM and a pseudo-static type RAM directly without a glue logic circuit.

The peripheral modules are so disposed around the aforementioned high-speed central processing unit CPU as to exhibit the performance sufficiently and to establish high performances and high or multiple functions while reducing the power dissipation. In order to cause the peripheral modules to operate efficiently, the internal bus is divided into the following three.

The first internal bus is composed of an address bus AB1 and a data bus DB1 which are connected with the central processing unit CPU, a multiplier unit (or multiply and accumulate arithmetic unit) MULT and the cache memory. The aforementioned multiplier unit MULT is connected with only the data bus DB1 of the aforementioned first internal bus so that it may operate integrally with the central processing unit CPU to execute multiplications and accumulations. Thus, the first internal bus (AB1, DB1) is used mainly for the data transfer between the central processing unit CPU and the cache memory so that it can be called the "cache address bus" and the "cache data bus". The cache memory is composed of a tag memory TAG, a data memory CDM and a cache controller CAC.

The central processing unit CPU has a schematic construction, as follows. The data bus DB1 has a construction of 32 bits. A general purpose register file is constructed of sixteen general purpose registers each composed of 32 bits, three control registers each composed of 32 bits, and four system registers each composed of 32 bits. The RISC type instruction set has an efficient instruction code with an instruction having a fixed length of 16 bits. An unconditional/conditional branching instruction is made of a delayed branching type to reduce the disturbances of the pipe line at a branching time. An instruction execution is made by one instruction per state so that it is accelerated to 35 ns per instruction when the central processing unit CPU is operated by an operation frequency of 28.7 MHz. The central processing unit CPU has its performance determined by the operation frequency and the number of clocks per instruction execution (i.e., CPI: Cycles Per Instruction). Of these, the operation frequency is conveniently set to the aforementioned value of 28.7 MHz so that it may use the clocks commonly with a TV video signal processing line when the central processing unit CPU is incorporated into a game machine. Incidentally, in case image data are to be displayed in a non-interlace manner in a color TV set of the NTSC type, clocks (of 28.6 MHz) eight times as high as the color subcarrier frequency of about 3.58 MHz are usually used in the video signal circuit.

Since, in this embodiment, the central processing unit CPU is connected with the first internal bus (AB1 and DB1) connected with only the cache memories (TAG, CAC, CDM) and the multiplier unit MULT, the load capacity of the bus can be drastically reduced to simplify the bus drive circuit of the central processing unit CPU for the aforementioned high-speed operations and to reduce the power dissipation of the bus drive circuit.

The second internal bus is composed of an address bus AB2 and a data bus DB2 and connected with the divider unit DIVU, the direct memory access controller DMAC and an external bus interface OBIF. When an access to the aforementioned cache memory is a miss hit, the central processing unit CPU has to fetch data by accessing to an external memory. For this, there is required a function to transmit an address signal on the first internal bus to the second internal bus. On the other hand, when the first and second internal buses are separated, as described above, the direct memory access controller DMAC may be caused by a program miss to garble the content of the data memory CDM of the cache memory.

In this embodiment, a break controller UBC coupled between the aforementioned first internal bus and second internal bus is utilized to solve the aforementioned problem such as the miss hit at the cache memory or the data break of the cache memory. The break controller UBC is intrinsically used for debugging a program but is equipped with a transceiver circuit by making use the necessity for it to be connected with the first internal bus and the second internal bus, so that an address signal on the first internal bus may be transmitted at the time of a miss hit at the aforementioned cache miss to the address bus AB2 on the second internal bus thereby to access the external memory. Moreover, the break controller UBC monitors an address signal on the second internal bus to monitor the rewrite of data in the data memory CDM by the direct memory access controller DMAC.

The third internal bus is composed of an address bus AB3 and a data bus DB3, which are connected with peripheral function module circuits, namely, the free running timer FRT, the serial communication interface SCI, the watch-dog timer WDT and an operation mode controller MC, although not especially limitative thereto. Thus, the third internal bus can be deemed as the peripheral address bus AB3 and the peripheral data bus DB3.

The aforementioned third internal bus has its cycle delayed more than those of the aforementioned first and second internal buses. Specifically, noting that those individual peripheral modules (i.e., the free running timer FRT, the serial communication interface SCI and the watch-dog timer WDT) do not have their substantial performances or functions improved even if their operation speeds are accelerated, they may be exemplified by the circuit constructions of the individual peripheral modules substantially as they are, which are mounted on the existing single-chip microcomputer operating at about 10 MHz. Thus, it is possible to improve the designing efficiency of the single-chip microcomputer. Moreover, the power dissipations of the individual peripheral modules can be reduced by lowering their individual operation frequencies.

With this, however, the data transfer with the central processing unit CPU or the like cannot be effected as it is, because the central processing unit CPU and the individual peripheral modules have different operation frequencies. Thus, there is provided a bus state controller BSC. This bus state controller BSC transmits a signal (e.g., a data signal) as it is when it transfers the signal from the third internal bus to the second internal bus. This is because a pulse generator CPG produces a clock pulse (i.e., a third clock pulse) to be used in the bus cycle of the third internal bus by dividing the system clock for determining the bus cycles of the first and second internal buses, so that the signal of the third internal bus can be transmitted as it is to the second internal bus. On the contrary, the bus state controller BSC synchronizes the signal on the second internal bus with the third clock pulse by delaying the signal on the second internal bus, if necessary, when it transmits the signal on the second internal bus to the third internal bus.

The interrupt controller INTC has the following schematic construction. For an internal interruption, the interrupt controller INTC has five external interrupt terminals (i.e., external terminals) NMI, /IRL0 to /IRL3), as will be described hereinafter. Fifteen external interrupt levels can be set by the terminals /IRL0 to /IRL3. The symbol "/ (i.e., slash)" attached to alphabets, as appearing herein and in some drawings, designates a bar signal having its low level at an active level. Incidentally, the bar signals appearing in the drawings are indicated by attaching lines to the tops of the alphabetical signal or terminals names according to the conventional inscribing method.

The internal interruptions are made by eleven causes: two by the direct memory access controller DMAC; one by the divider unit; three by the free running timer FRT; one by the watch-dog timer WDT; and four by the serial communication interface SCI. Vector numbers can be set for the individual internal interrupt causes.

Thanks to the adoption of the aforementioned bus dividing method, it is possible to shorten the lengths of the individual buses and to reduce the number of elements to be connected with the buses. As a result, the load capacities of the individual buses can be drastically reduced to speed up the central processing unit CPU and to effect a high-speed data processing with a low power dissipation. In case, moreover, a user break controller is interposed between the aforementioned first internal bus and second internal bus, there is provided by the aforementioned bus division a function to detect whether or not the data (i.e., cache data) cached in the cache data memory CDM have been erroneously rewritten by the direct memory access controller DMAC, so that the reliability of the data cached in the cache data memory CDM is not deteriorated.

Moreover, such function modules, e.g., the central processing unit CPU, the cache memory or the direct memory access controller DMAC of one embodiment are configured such that their bus cycles will not exert direct influences upon the performance and the function of the single-chip microcomputer. On the other hand, such function modules, e.g., the free running timer FRT, the serial communication interface SCI or the watch-dog timer WDT, that their bus cycles will not exert direct influences upon the data processing, are connected with the third internal bus for the low-speed bus cycles. As a result, any high-speed type peripheral module need not be developed or designed according to the speed-up of the central processing unit CPU, but the circuit of the single-chip microcomputer can be efficiently specified. Moreover, the operation clock to be fed to the function module such as the free running timer FRT, the serial communication interface SCI or the watch-dog timer WDT can be lowered to reduce the power dissipation of the single-chip microcomputer.

Figure 2:
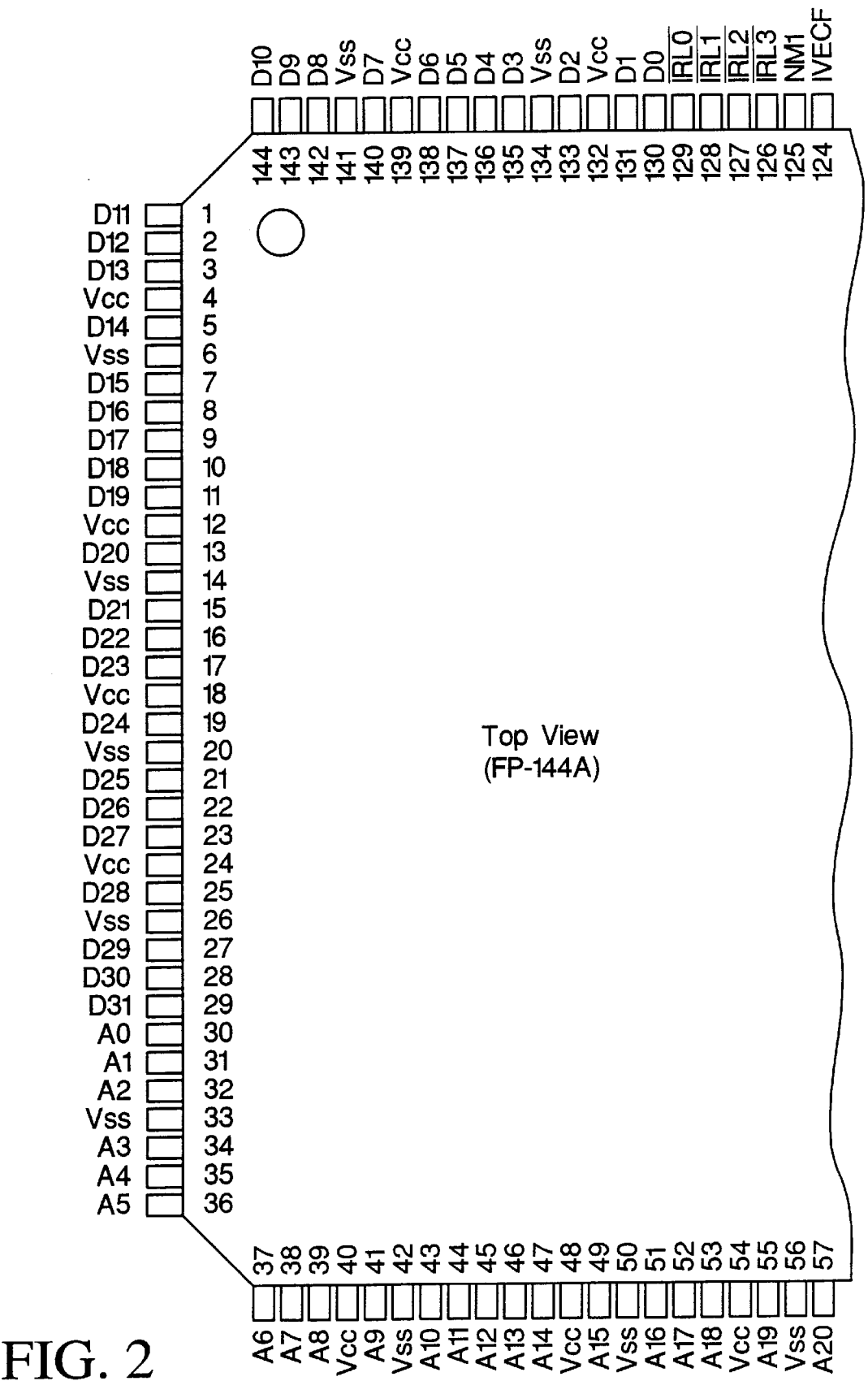
FIG. 2 is a top view of the pin arrangement showing a lefthand half of one embodiment of the single-chip microcomputer according to the present invention.
Figure 3:
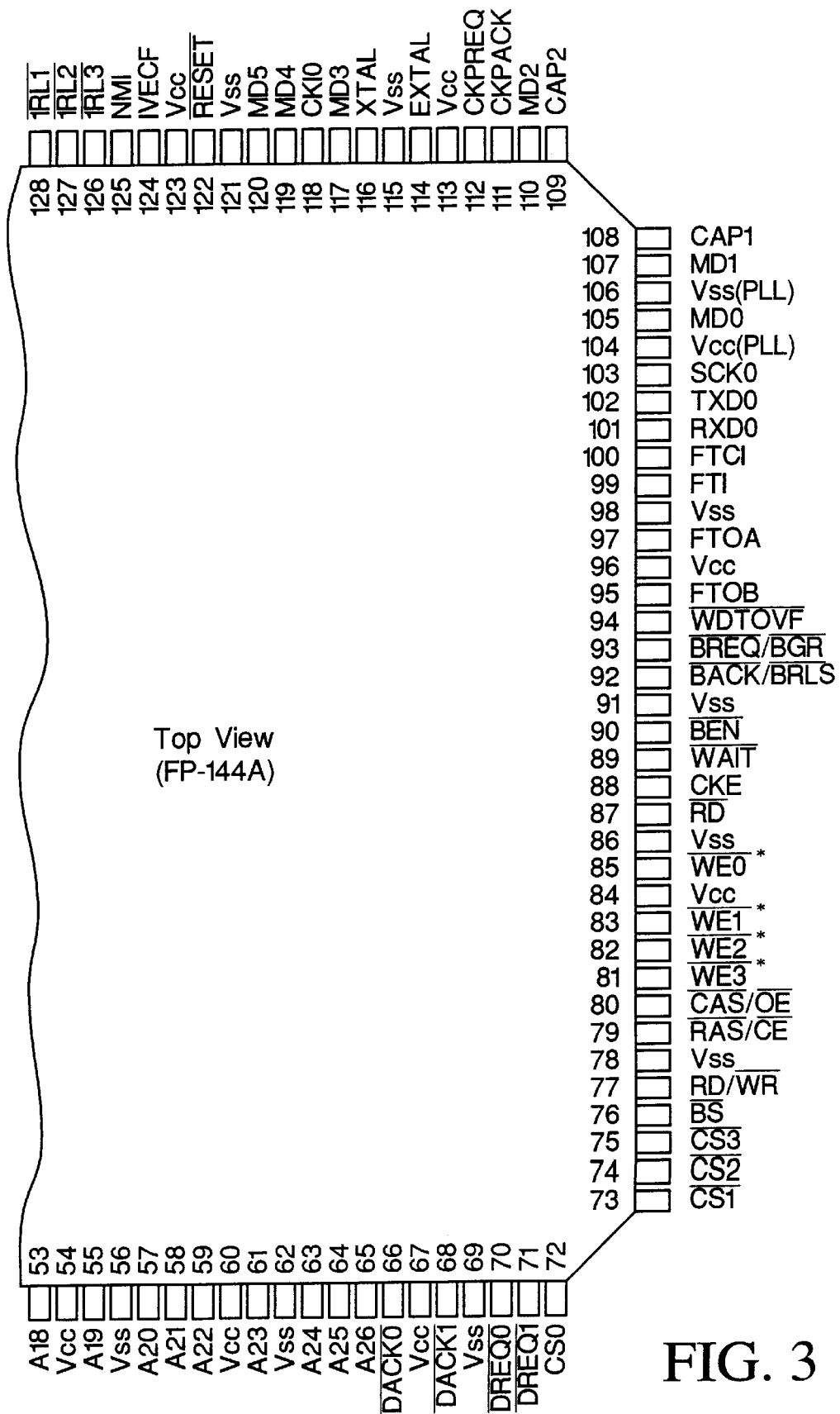
FIG. 3 is a top view of the pin arrangement showing a righthand half of one embodiment of the single-chip microcomputer according to the present invention.

FIGS. 2 and 3 are top views showing the arrangement of pins (i.e., external terminals) of one embodiment of the single-chip microcomputer according to the present invention. FIG. 2 presents a lefthand half, and FIG. 3 presents a righthand half. In order to clarify the correlation between these halves, the central portion is doubly shown in FIGS. 2 and 3. This embodiment uses a plastic QFP package having one hundred and forty four pins.

The representative external terminals have the following functions. The terminals, each of which has a plurality of meanings and switched for use according to the operation mode, are discriminated in FIGS. 2 and 3 by giving them the symbol "/(slash)". Since these slashed signals are used herein to indicate the bar signals, as described above, the symbol "/" of FIGS. 2 and 3 is replaced for description by a symbol "*".

For the power supply, an external terminal Vcc is a terminal to be fed with the power potential of the circuit, and an external terminal Vss is a terminal to be fed with the ground (potential) of the circuit. For controlling the operation modes: external terminals MD0 to MD2 are terminals to be fed with the clock select signal; external terminals MD3 and MD4 are terminals to be fed with a signal for specifying the bus size in a space CS0; and an external terminal MD5 is a terminal to be fed with a signal for specifying the later-described slave/master modes. For the address bus, external terminals A0 to A26 are external address terminals. For the data bus, external terminals D0 to D31 are external input/output data terminals.

For bus controls, external terminals /CS0 to /CS3 are terminals to be fed with a chip select signal. An external terminal /BS is a terminal to be fed with a bus start signal. An external terminal RD*/WR is a terminal to be fed with a read*write signal. An external terminal /RAS*/CE is a terminal to be fed with a row address strobe signal, when the dynamic type RAM and the synchronous dynamic type RAM are used, and with a chip enable signal when a pseudo-static type RAM is used. An external terminal /CAS*/0E is a terminal to be fed with a column address strobe signal, when the synchronous dynamic type RAM is used, and with an output enable signal and a refresh control signal when the pseudo-static type RAM is used.

An external terminal /WE0 is a terminal to be fed with a signal indicating the lowest order byte write when in a fundamental interface; an external terminal /WE1 is a terminal to be fed a signal indicating a 3rd byte write when in the fundamental interface; an external terminal /WE2 is a terminal to be fed with a signal indicating a 2nd byte write when in the fundamental interface; and an external terminal /WE3 is a terminal to be fed with the highest order byte write when in the fundamental interface. In addition, the external terminals /WE0 to /WE3 are used as either terminals to be fed with a column address strobe signal CAS for selecting each byte when the dynamic type RAM is used or terminals to be fed with a mask signal for masking each byte when the synchronous dynamic type RAM is used. An external terminal /RD is a terminal to be fed with a read pulse signal and is connected with an OE terminal (i.e., output enable terminal) of an external device connected with the outside of this single-chip microcomputer. An external terminal /WAIT is an external terminal for inputting a hardware wait. An external terminal /BEN is a terminal to be fed with an external data buffer enable signal, and a read*write signal (RD*/WR) is used for controlling the direction of the data buffer.

An external terminals /BACK*/BRLS is a terminal which is selectively used as a terminal to be fed with a bus use acknowledge input signal (i.e., bus acknowledge signal), when this single-chip microcomputer is brought into a slave mode by the signal fed to the terminal MD5, or as a terminal to be fed with a bus open request input signal (i.e., bus release signal) when this single-chip microcomputer is brought into a master mode by the signal fed to the terminal MD5. An external terminal /BREQ*/BGR is a terminal which is selectively used as a terminal to be fed with a bus use priority request output signal (i.e., bus request signal), when this single-chip microcomputer is brought into a slave mode by the signal fed to the terminal MD5, or as a terminal to be fed with a bus use acknowledge output signal (i.e., bus grant signal) when this single-chip microcomputer is brought into a master mode by the signal fed to the terminal MD5. An external terminal CKE is a terminal to be fed with a clock enable signal of the synchronous dynamic type RAM.

For the interruption, an external terminal /RESET is a terminal to be fed with a reset signal. External terminals /IRL0 to /IRL3 are terminals to be fed with interrupt level input signals. An external terminal NMI is a terminal to be fed with a non-maskable interrupt input signal, and an external terminal IVECF is a terminal to be fed with an interrupt vector fetch output signal.

For the clocks, an external terminal EXTAL is an input terminal for receiving an oscillatory output from one output terminal of a quartz oscillator (i.e., crystal) coupled to the outside of this single-chip microcomputer. An external terminal XTAL is either an input terminal for receiving an oscillatory output from the other output terminal of the aforementioned quartz oscillator (i.e., crystal) or an input terminal for receiving a system clock (i.e., frequency doubling clock) fed from the outside of the single-chip microcomputer. An external terminal CKPACK is a terminal for receiving a clock pause acknowledge output signal. An external terminal CKPREQ is a terminal for receiving a clock pause request input signal. An external terminal CKI0 is a clock input/output. External terminals CAP1 and CAP2 are terminals which are connected with capacity elements used in a phase lock loop circuit (i.e., PLL). The external terminals Vss (i.e., PLL) and Vcc (i.e. PLL) are supply terminals of the PLL.

For the DMAC, external terminals /DREQ0 and /DREQ1 are input terminals to be fed with a direct memory access (DMA) transfer request signal from an external device and correspond to the channel 1 and the channel 2. External terminals /DACK0 and /DACK1 are output terminals for outputting a DMA transfer accept (i.e., DMA transfer acknowledge) signal to the external device having outputted the DMA transfer request signal, when the DMA transfer is acknowledged to the DMA transfer request signal, and correspond to the channel 1 and the channel 2.

For the SCI: an external terminal TXD0 is an output terminal for outputting the serial data to be transmitted to an external device; an external terminal RXD0 is an input terminal to be fed with received seal data fed from an external device; and an external terminal SCK0 is an input/output terminal of a serial clock synchronized with the serial data.

For the FRT, an external terminal FTOA is a terminal for outputting an output compare output signal (i.e., A output) of a timer, and an external terminal FTOB is a terminal for outputting an output compare output signal (i.e., B output). An external terminal FTCI is an input signal for receiving an input signal of a counter clock, and an external terminal FTI is an input terminal of an input capture signal.

For the WDT, moreover, an external terminal /WDTOVE is a terminal for outputting a signal indicating an overflow of the watch-dog timer.

Figure 4:
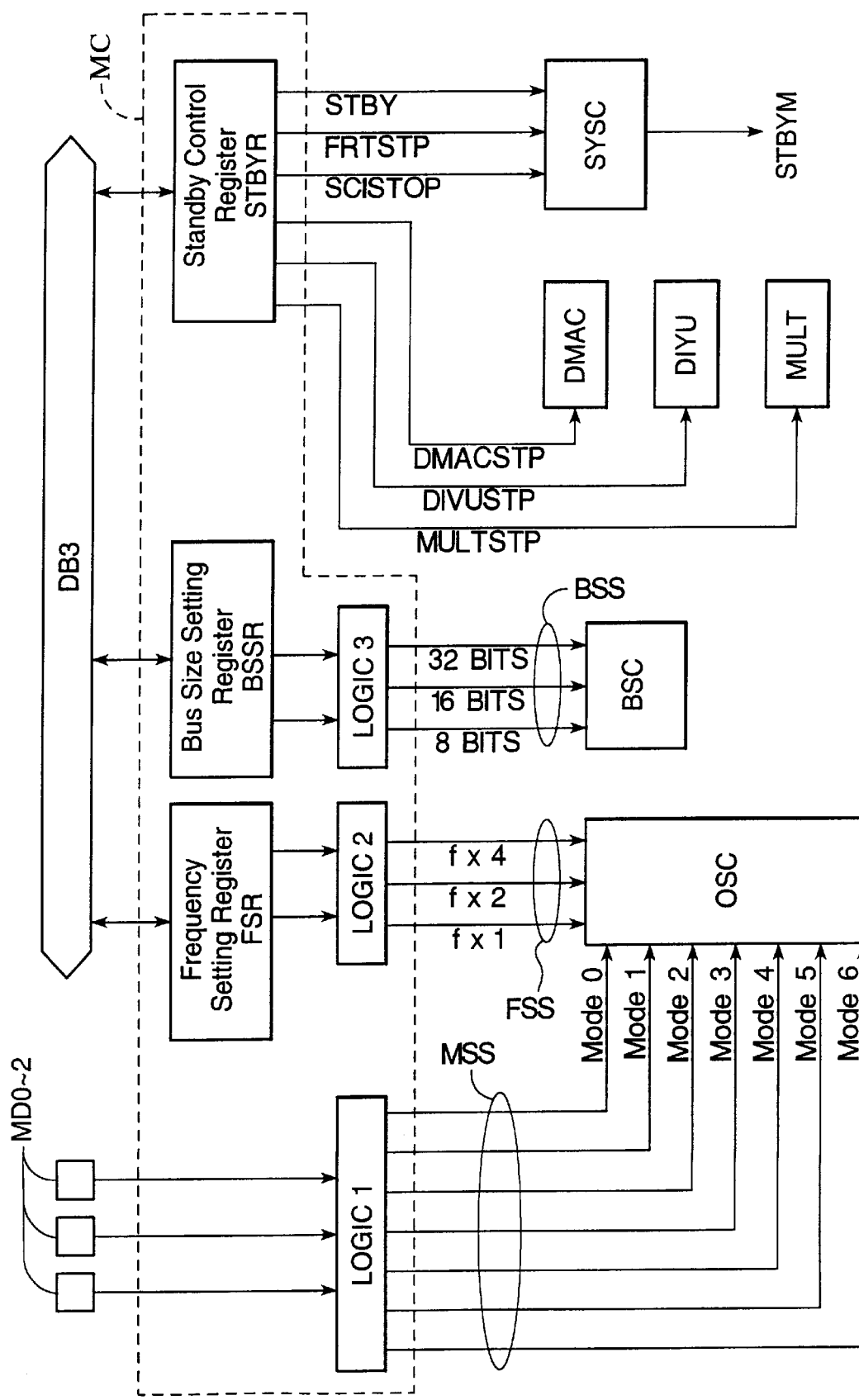
FIG. 4 is a block diagram showing one embodiment of an operation mode controller MC to be packaged in the single-chip microcomputer according to the present invention.

FIG. 4 is a block diagram showing one embodiment of the operation mode controller MC. This operation mode controller MC is constructed of a standby control register STBYR, a bus size setting register BSSR and a frequency setting register FSR. The bus size setting register BSSR has its output decoded by a combinatory lock circuit LOGIC3, which produces a bus size setting signal BSS of 8 bit, 16 bits or 32 bits and feeds it to the bus state controller BSC.

The frequency setting register FSR has its output signal decoded by a combinatory logic circuit LOGIC2, which produces three control signals FSS of f×1, f×2 and f×4 for a frequency f and feeds them to an oscillator OSC. The mode control signals inputted from the mode setting terminals MD0 to MD2 are decoded by a combinatory logic circuit LOGIC1 into seven mode setting signals MSS, which are then fed to the oscillator OSC.

Thus, these clock operation modes can be set to the aforementioned seven modes by combining the selection of using or not the internal oscillator module or frequency doubler, the selection of outputting or not the clock, the selection of synchronizing or not by the PLL, and the selection of changing or not the clock of the CPU and the clock to be outputted to or inputted from the outside to 90 degrees. The operation mode for this phase change to 90 degrees will be described hereinafter.

The individual circuit blocks in the single-chip microcomputer of this embodiment are constructed of full-static type CMOS circuit except some of them. In the circuit requiring no operation, therefore, the internal status is kept in the state before the feed of clocks is interrupted. Therefore, the circuit can be operated continuously from the state before the interruption by inputting the clocks again, but without the operation in which the initial setting or the necessary data need not be retrieved and returned. The cache memory thus constructed of the dynamic CMOS circuit can make accesses immediately after the interruption is released, because the clock phase is so adjusted as to start the operation from the precharge at the start of the feed of the clock.

The standby control register STBYR specifies the circuit block requiring none of the aforementioned operation to interrupt the clock inputting of the corresponding circuit block in response to the control signals such as STBY, DRTSTP, SCISTP, MULTSTP, DIVUSTP or DMACSTP for interrupting the inputting of the clocks to the peripheral modules such as the modules DMAC, DIVU and MULT, as exemplified, and the modules FRT, WDT and SCI, as represented by one block SYSC.

TABLE 1

| Mode | CPG | CPU | CPU Register | Peripheral Module | Terminals |
|---|---|---|---|---|---|
| Sleep | ON | OFF | Held | ON | Held |
| Standby | OFF | OFF | Held | OFF | Held or HiZ |
| Module Stop | ON | ON | Held | OFF, as Specified | FRT, WDT, SCI or HiZ |

Table 1 tabulates the operation modes of the aforementioned standby control register STBYR. In Table 1, letters HiZ implies a high-impedance state. When the module stop mode is specified, there are interrupted the clock inputs of the circuit blocks in response to the aforementioned control signals STBY, DRTSTP, SCISTP, MULTSTP, DIVUSTP and DMACSTP.

The sleep mode, in which the central processing unit CPU is interrupting its operation, is released by the interruption, the DMA address error, the power-ON resetting and the manual resetting. The standby mode, in which the central processing unit CPU and the peripheral modules are necessarily interrupted by interrupting the operation of the clock generator CPG, is released by the NMI interruption, the power-ON resetting or the manual resetting. On the other hand, the module stop mode is established by resetting a predetermined bit of the aforementioned standby control register STBYR to "0".

By providing the aforementioned modes, in the single-chip microcomputer, the clock pulse is fed to only the circuit that requires the feed of the clock while including the operation itself of the clock generator CPG, so that wasteful consumption of the current, which is produced by charging up or discharging the load capacity in the wiring path to be fed with the clock pulse, can be reduced. As a result, it is possible to reduce the power dissipation which is required especially of the single-chip microcomputer to be mounted on a battery-driven portable device.

Figure 5:
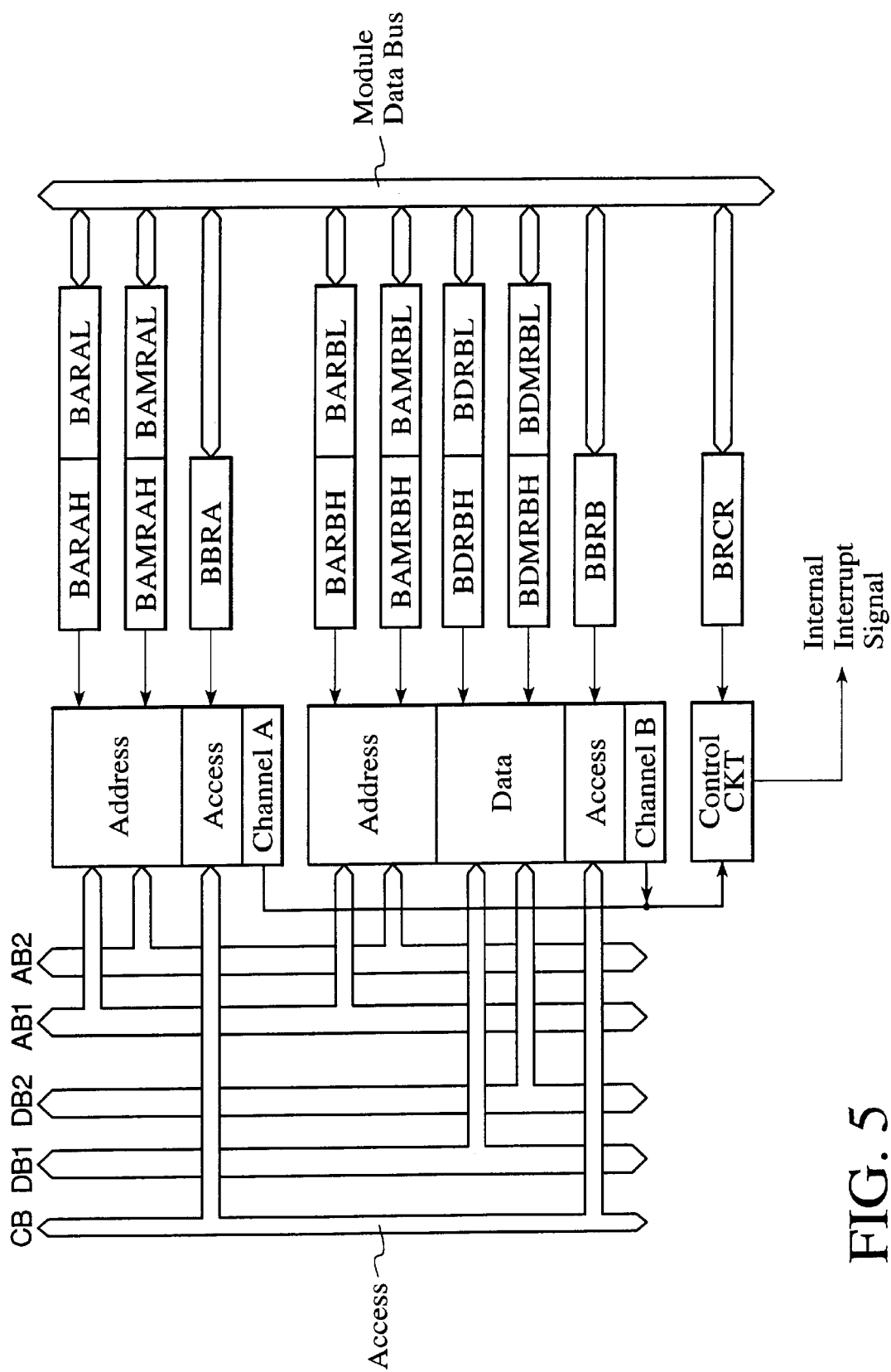
FIG. 5 is a block diagram showing one basic embodiment of a break controller UBC to be packaged in the single-chip microcomputer according to the present invention.

FIG. 5 is a block diagram showing a basic embodiment of the aforementioned break controller UBC. This break controller UBC requires the central processing unit CPU a user break interruption in accordance with the content of the bus cycle which is established by the central processing unit CPU or the direct memory access controller DMAC. By exploiting this function, a self debugger can be constructed to facilitate the program debug of the user. This break controller UBC has two channels, i.e., the channel A and the channel B, of which the channel B can break by specifying data.

Letters BARAH and BARAL, and BARBH and BARBL designate break address registers for the channel A and the channel B. Letters BAMRAH and BAMRAL, and BAMRBH and BAMRBL designate break address mask registers for the channel B. As a result, it is possible to specify the addresses to be broken at the channel A and the channel B and to mask the individual bits.

Letters BDRBH and BDRBL designate break data registers for the channel B. letters BDMRBH and BDMRBL designate break data mask registers for the channel B. As a result, it is possible to specify the data to be broken at the channel B and to mask the individual masks.

Letters BBRA designate a break bus cycle register A for the channel A, and letters BBRB designate a break bus cycle register B for the channel B. Letters BRCR designate a break control register. By these registers, the breaks can be effected by combining the following conditions in addition to the aforementioned address or data conditions: (1) whether or not one or both of the CPU cycle or the peripheral cycle and the bus cycle outside of the chip at the bus release time are to be included in the peripheral cycle; (2) one or both of the instruction fetch or the data access; (3) one or both of the read and write; and (4) the operand size (e.g., a long word, a word or a byte access).

Figure 6:
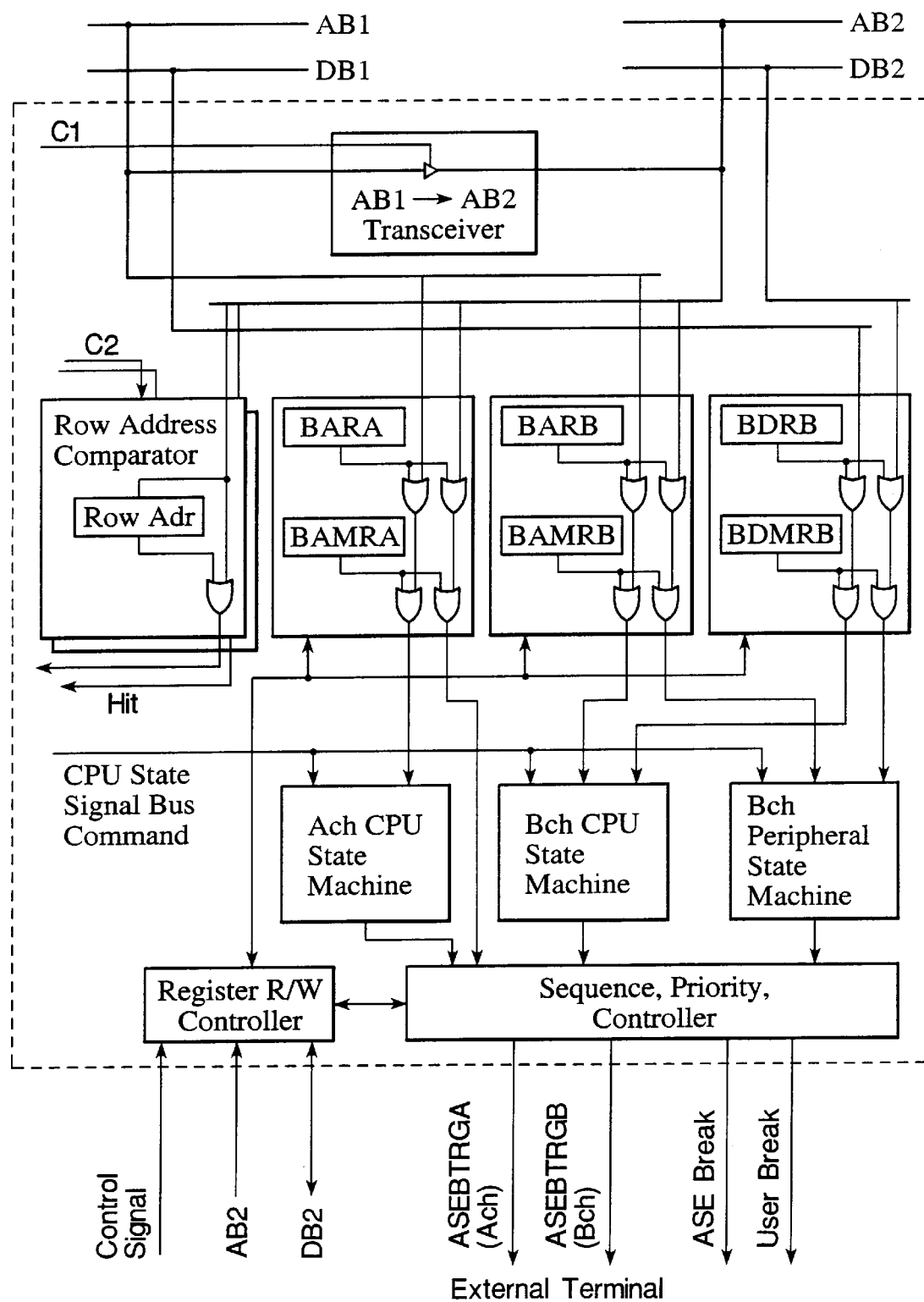
FIG. 6 is a detailed block diagram showing one embodiment of a break controller UBC to be packaged in the single-chip microcomputer according to the present invention.

FIG. 6 is a detailed block diagram showing one embodiment of the aforementioned break controller UBC. In this embodiment, the following functions are added to the break controller UBC. As in the foregoing embodiment of FIG. 1, the central processing unit CPU is isolated from the direct memory access controller DMAC and the external bus interface OBIF by the bus division. In case, therefore, a miss hit occurs in the access to the cache memory, the external memory has to be accessed to fetch the data.

In response to a control signal Cl, a bus transceiver transmits the address signal of a first address bus AB1 to a second address bus AB2. Specifically, if a miss hit occurs in the cache memory, the address signal of the address bus AB1 can be transmitted to the address bus AB2 in response to the control signal C1 to access the external memory through the external bus interface OBIF. The data read out of the external memory at this time are transmitted to the central processing unit CPU through a data memory CDM of the cache.

In FIG. 6, a register BARA is an integration of the aforementioned two registers BARAH and BARAL. Other registers BARB and BDRB and their individually corresponding mask registers BAMRA, BAMRB and BDMRB are also individual integrations of the two registers of FIG. 5.

In this embodiment, a row address comparator is provided to accelerate the accesses of the synchronous dynamic type RAM, the dynamic type RAM and the pseudo-static type RAM. The row address register is set with the row addresses of the aforementioned individual RAMs. When the same row address is specified, a hit signal Hit is produced from the aforementioned comparator so that high-speed operations may be accomplished by making accesses while holding the word lines of the individual RAMs in the selected state through the bus state controller BSC.

The break controller UBC is connected with the first internal bus (AB1, DB1) and the second internal bus (AB2, DB2) to make comparison with the addresses set in the registers. Therefore, the comparator and address register connected with the second internal bus (AB2, DB2) are utilized to set the address of the data stored in the cache memory. Thus, it is possible to monitor the break of the data, which is caused as a result that the direct memory access controller DMAC erroneously writes the address stored in the cache memory. In short, merely by dividing the internal bus to speed up the internal circuit and to reduce the power dissipation, such a fatal defect of the system can be eliminated as might otherwise be caused without the treatment of this embodiment to allow the data of the cache memory to be broken and inaccessible from the central processing unit CPU.

Figure 7:
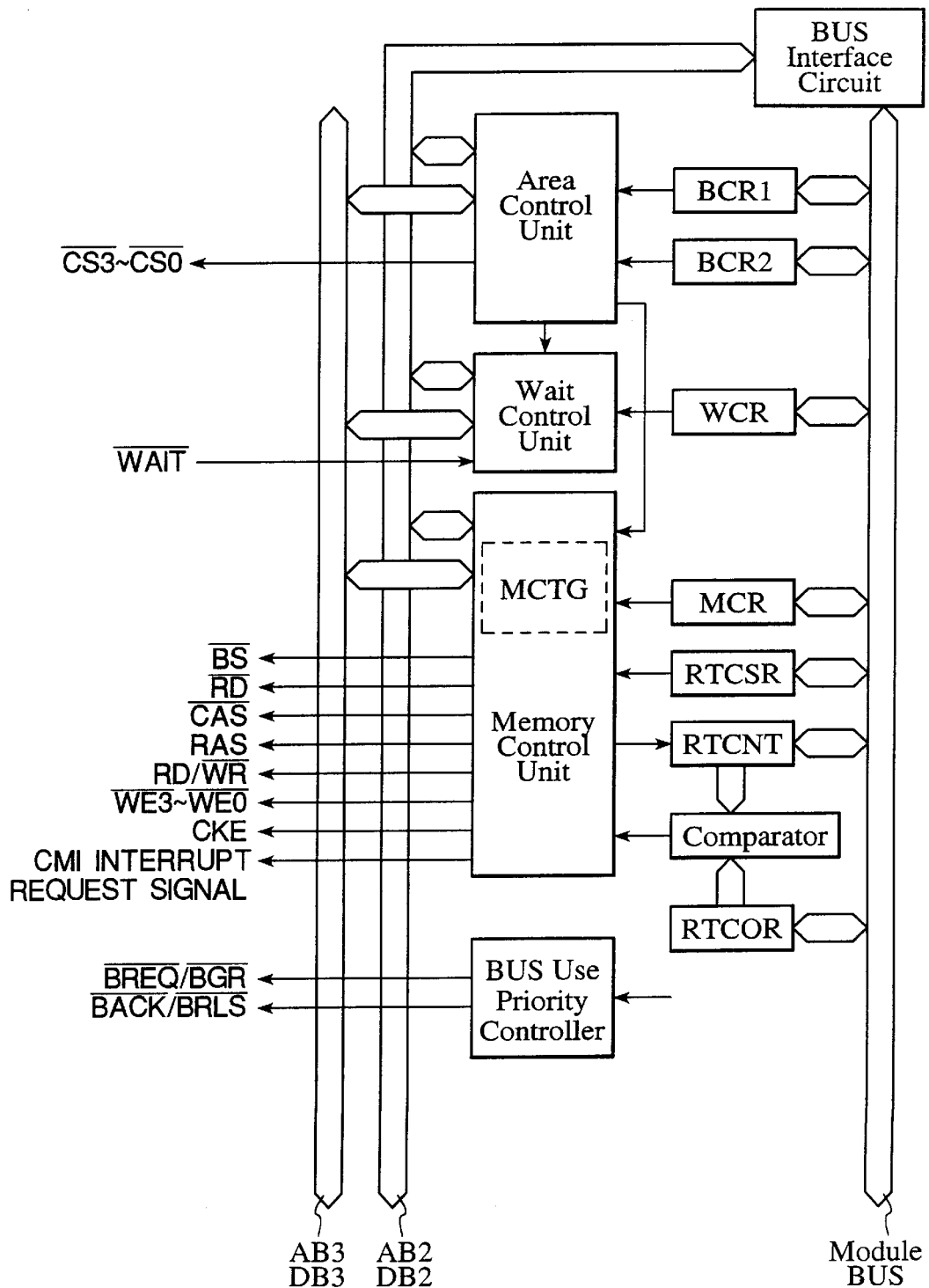
FIG. 7 is a block diagram showing one embodiment of a bus state controller BSC to be packaged in the single-chip microcomputer according to the present invention.

FIG. 7 is a block diagram showing one embodiment of the aforementioned bus state controller BSC. This bus state controller BSC manages an address space and outputs a control signal, if necessary, through the external bus interface OBIF so that an optimum access can be made in eight spaces. As a result, the bus state controller BSC can be directly connected with the various memories such as the dynamic type RAM, the synchronous dynamic type RAM or the pseudo-static type RAM and the peripheral data processor LSI.

The aforementioned area control unit manages the address space by driving it into four. In short, the single-chip microcomputer according to the present invention has its address space architectually made to have 4 G (giga) bytes. However, the memory space has only 256 Mbytes and is divided into two, one of which is a space to be accessed through the cache memory (as is also called the "cached space") and the other of which is a space to be accessed not through the cache memory (as is also called the "non-cached space"). These two spaces are physically given an equal capacity of 128 Mbytes (megabytes) to be accessed. This physical space of 128 Mbytes is divided for use into four partial spaces (i.e., CS0 to CS3), each of which is given the maximum linear address space of 32 Mbytes. For each of these spaces CS0 to CS3, there can be set the specification of the kinds of memories such as the dynamic type RAM, the synchronous dynamic type RAM, the pseudo-static type RAM and the burst ROM. The space CS0 can be specified for use to the ordinary space and the burst ROM; the space CS1 to the ordinary space; the space CS2 to the ordinary space and the synchronous dynamic type RAM; and the space CS3 to the ordinary space, the synchronous dynamic type RAM, the dynamic type RAM and the pseudo-static type RAM.

For the space of the cache control, there are provided an associative purge space (of 128 Mbytes) corresponding to the aforementioned physical space for the cache purge, an address array read/write space (of 128 Mbytes) for reading/writing an address array (or tag address), and a cache forced read/write space for reading/writing the data array forcibly.

In addition, a desired one of the address spaces having bus sizes of 8 bits, 16 bits and 32 bits is made selective. A control signal corresponding to each space can be outputted. In a wait control unit, the insertion of a wait state can be controlled for each space. Since, moreover, the high-speed internal bus (i.e., the second bus) AB2 and DB2 and the low-speed peripheral bus (i.e., the third bus) AB3 and DB3 have different bus cycles, a wait state is inserted for synchronization when the signals of the internal bus AB2 and DB2 are to be transferred to the peripheral bus AB3 and DB3 and when the signals of the peripheral bus AB3 and DB3 are to be transferred to the internal bus AB2 and DB3.

A memory control unit is given refresh functions for refreshing the stored data required for the dynamic type RAM, and there are prepared a CAS before RAS refreshing function and a self-refreshing function. The interval of the refreshing operation can be set by selecting the clock of the refreshing counter.

The bus state controller BSC is provided with an interface to be directly connected with the dynamic type RAM. This interface makes possible: the multiplex outputting of the row/column addresses; the burst transfer at the read time; the high-speed page mode for the continuous access; the RAS down mode to the discontinuous accesses to an identical row address; and the generation of a TP cycle for retaining the RAS precharge time. There is further provided an interface which can be directly connected with the synchronous dynamic type RAM. This interface makes possible: the multiplex outputting of the row/column addresses; the memory accesses by the burst read and single write; and the continuous column accesses by the bank active mode.

The address strobe signals /RAS and /CAS necessary for controlling the aforementioned dynamic type RAM and synchronous dynamic type RAM and the control signal for setting the mode for the synchronous dynamic type RAM and the dynamic type RAM are generated by a memory control signal generator MCTG. In short, when the area control unit detects that the dynamic type RAM or the synchronous dynamic type RAM is an access to the assigned space, the aforementioned control signal is accordingly produced. For setting the mode for the synchronous dynamic type RAM, moreover, when it is detected by the area control unit that the CPU accesses a predetermined address, as will be described hereinafter, the memory control signal generator is started to produce a mode setting control signal.

In the bus use priority controller, the master /slave modes are switched depending upon the input of the high/low levels of the aforementioned terminal MD5. In the master mode, the bus use priority controller outputs the bus use acknowledge signal in response to the bus release requests /BRLS and /BGR from the outside. In the slave mode, the bus use priority controller uses the same terminal as /BACK and /BREQ. In short, in the slave mode, the bus use priority controller outputs a bus use priority request signal to access the bus at the master side in response to the bus use acknowledge signal.

In FIG. 7, bus control registers BCR1 and BCR2 are provided to correspond to the area control unit. A wait state control register WCR is provided to correspond to the wait control unit. An individual memory control register MCR is provided to correspond to the memory control unit. Letters RTCSR designate a refresh timing control/status register. Letters RTCNT designate a refresh timer counter. Letters RTCOR designate a refresh time constant register. By reading out one bit of the BCR1, the input value of the aforementioned terminal MD5 can be read out to discriminate whether the software is in the master mode or in the slave mode.

Figure 8:
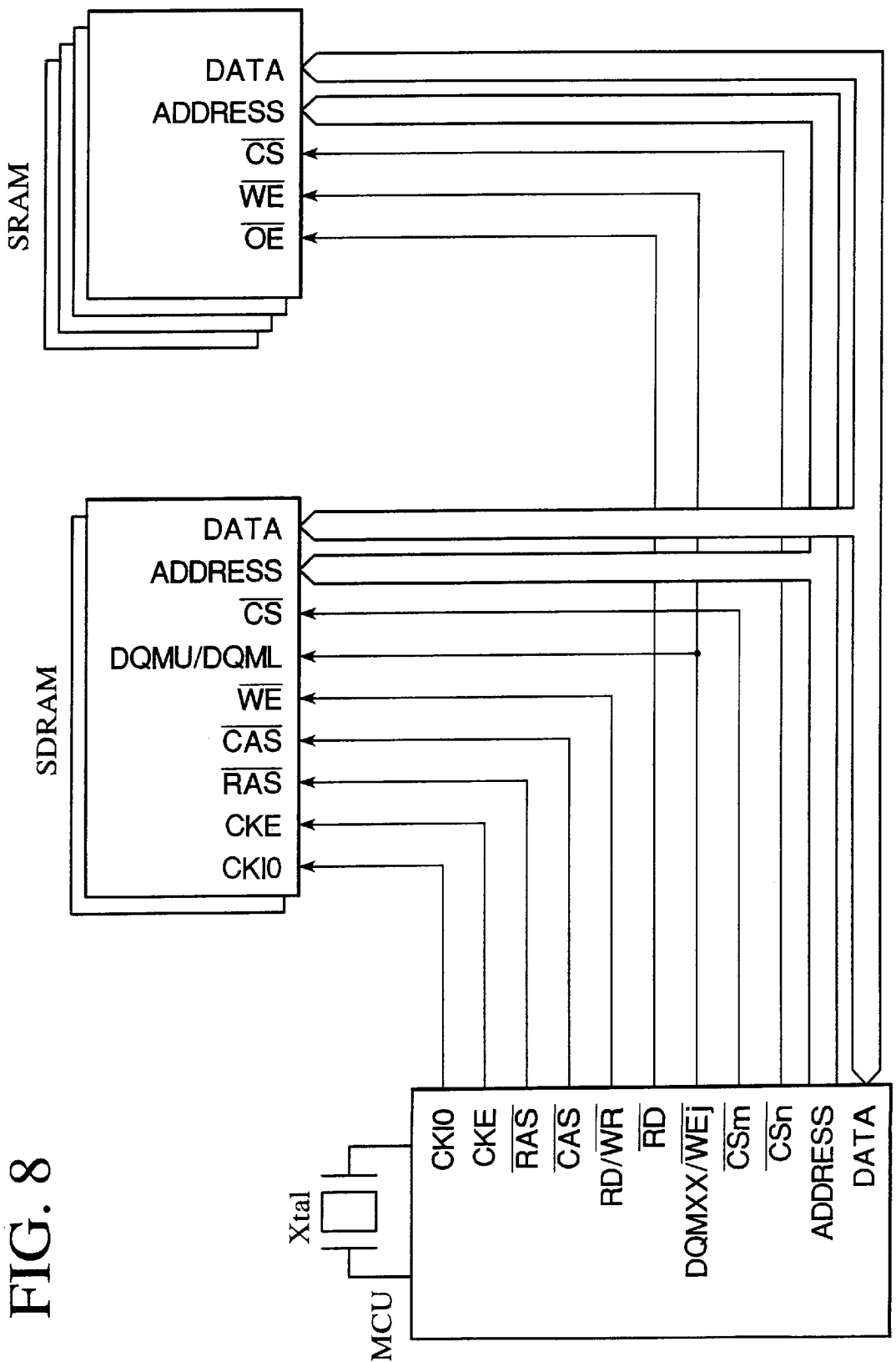
FIG. 8 is a block diagram showing an example of connection between the bus state controller BSC to be packaged in the single-chip microcomputer according to the present invention and a synchronous dynamic type RAM through an external bus interface OBIF.

FIG. 8 is a block diagram for explaining an example of connection between the bus state controller BSC and the synchronous dynamic type RAM (as will be shortly referred to as the "SDRAM") by the external bus interface OBIF. In FIG. 8, there is also shown an example of connection of the static type RAM (as will be shortly referred to as the "SRAM") as a basic memory.

Figure 9:
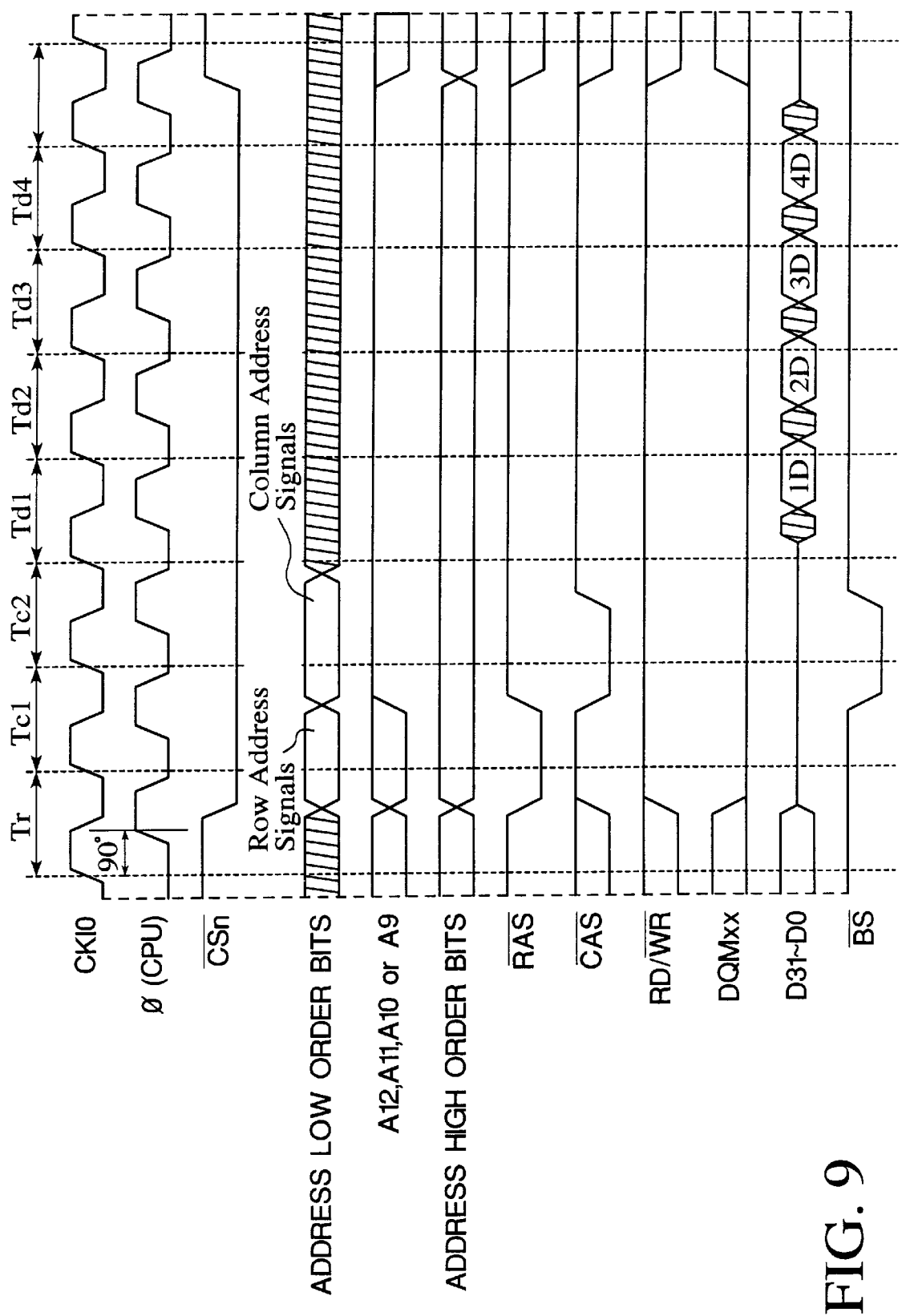
FIG. 9 is a bus cycle waveform diagram for explaining a burst read operation of the SDRAM of FIG. 8.

FIG. 9 is a bus cycle waveform chart for explaining the burst read operation of the aforementioned SDRAM. Incidentally, the clock enable signal CKE is raised to the high level, although not shown in FIG. 9, and the SDRAM is fed with the clock CKIO. The central processing unit CPU has its clock delayed by 90 degrees from that clock CKIO. In other words, the SDRAM has its clock advanced in phase by 90 degrees, as viewed from the side of the central processing unit CPU. In order to produce the clocks in such phase relation, in the aforementioned clock generator, a fundamental clock having a frequency four times as high as that of the clock is produced by a frequency doubler and is divided to have a quarter frequency thereby to produce the system clock and to produce such a clock CKIO for the SDRAM as has its phase shifted by 90 degrees. Letters /BS designates such a strobe signal for monitoring the bus cycle as is not connected with the SDRAM.

In the first cycle Tr, the signal /CSn, corresponding to the space to which the SDRAM is assigned, is set to the low level, and the row address strobe signal /RAS is set to the low level so that the row address is fetched. In the next cycle Tc1, the column address strobe signal ICAS is set to the low level so that the column address is fetched. In synchronism with this, the strobe signal /BS is also set to the low level. Thus, in response to the signals /CSn, /RAS and /CAS and the address signals outputted in synchronism with the rising edge of the clock from the central processing unit CPU, the SDRAM fetches the aforementioned individual signals in synchronism with the rising edge of the clock CKIO so that a sufficient operation margin can be retained by the aforementioned shift of phase of 90 degrees. In short, the SDRAM can fetch the signals from the outside with the sufficient setup time and hold time.

In the third cycle Tc2, the signals /CAS and /BS are reset to the high level. In the fourth and later four cycles Td1 to Td4, moreover, the data D31 to D0 are continuously read out of the SDRAM. By this burst read, data of 4×4=16 bytes can be read out.

Figure 10:
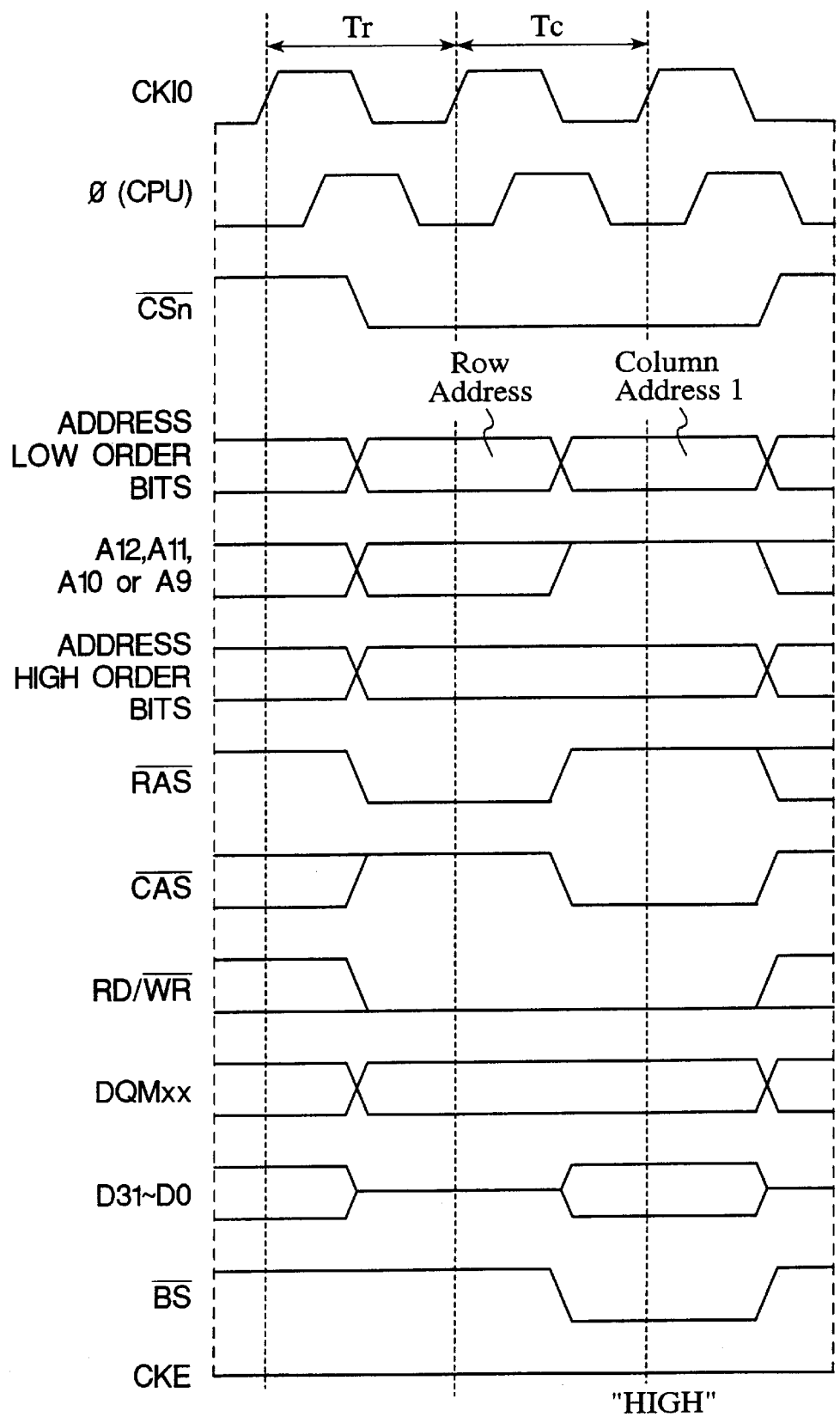
FIG. 10 is a bus cycle waveform diagram for explaining a single-write operation of the SDRAM of FIG. 8.

FIG. 10 is a bus cycle waveform diagram for explaining the single write operation of the aforementioned SDRAM. In the first cycle Tr, the signal /CSn corresponding to the space, to which the SDRAM is assigned, is set to the low level, and the row address strobe signal /RAS is set to the low level so that the row address is fetched. Moreover, the signal RD*/WR for instructing the write operation is set to the low level. In the next cycle Tc1, the column address strobe signal /CAS is set to the low level so that the column address is fetched. In synchronism with this, the strobe signal /BS is also set to the low level so that the data D31 to D0 are fetched to write the selected memory cell. Thus, the write of 4 bytes is carried out in the two cycles.

Figure 11:
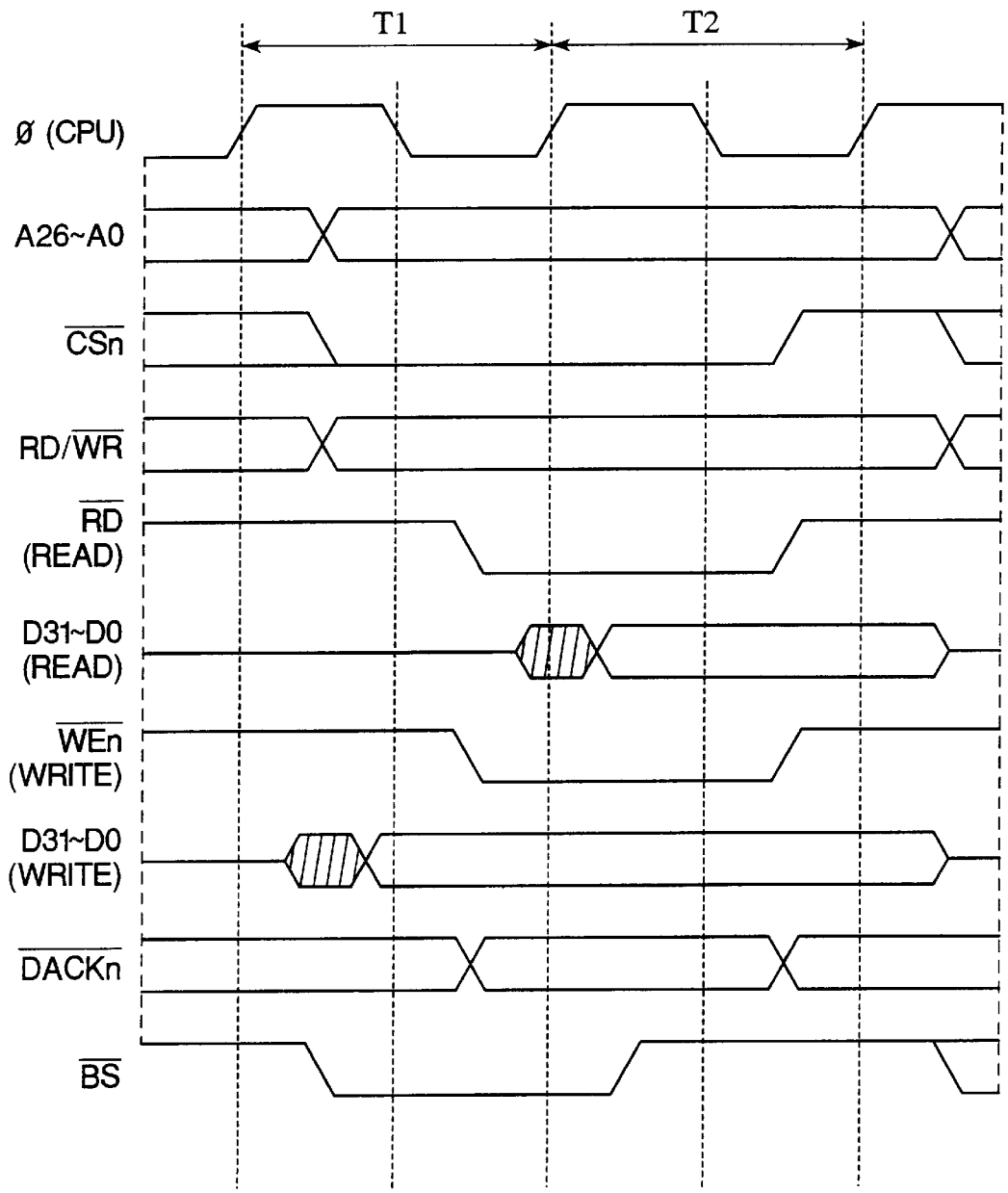
FIG. 11 is a waveform diagram for explaining a basic bus cycle in the single-chip microcomputer according to the present invention.

FIG. 11 is a waveform chart for explaining the basic bus cycle of the single-chip microcomputer according to the present invention. This single-chip microcomputer performs the memory access of the aforementioned SRAM or ROM, for example, in that fundamental bus cycle. In this fundamental bus cycle, the memory accesses are carried out in the two states T1 and T2. FIG. 11 shows the case of the reading operation by the signal /RD and the case of the write operation by the signal /WEn.

Figure 12:
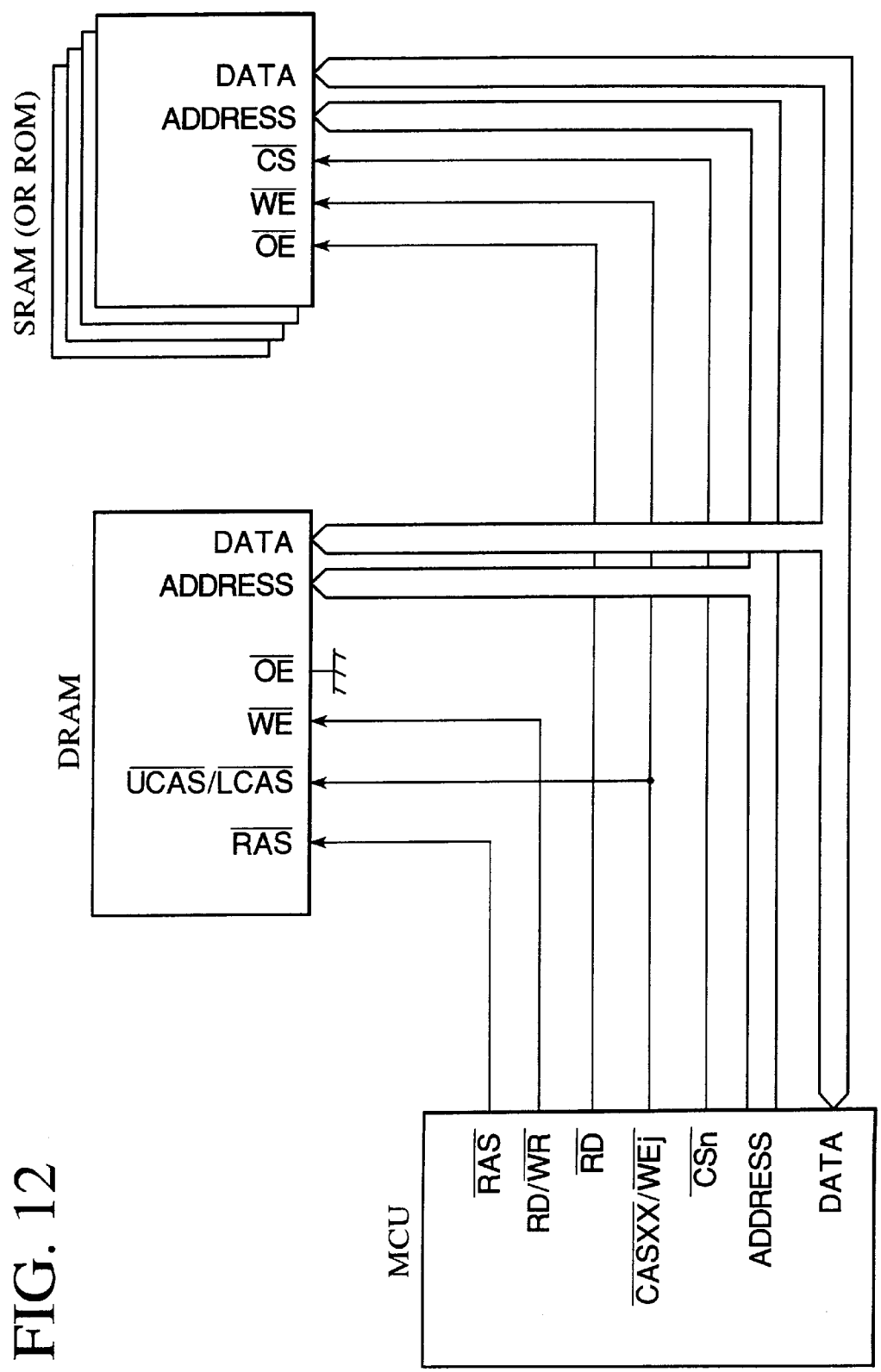
FIG. 12 is a block diagram showing an example of connection between the bus state controller BSC to be packaged in the single-chip microcomputer according to the present invention and a dynamic type RAM through the external bus interface OBIF.

FIG. 12 is a block diagram for explaining the connection between the bus state controller BSC and the dynamic type RAM (which will be shortly referred to as the "DRAM") by the external bus interface OBIF. The DRAM, as shown, has a construction of ×16 bits and can be accessed by the high order byte and the low order byte according to the two-CAS method (/UCAS*/LCAS).

Figure 13:
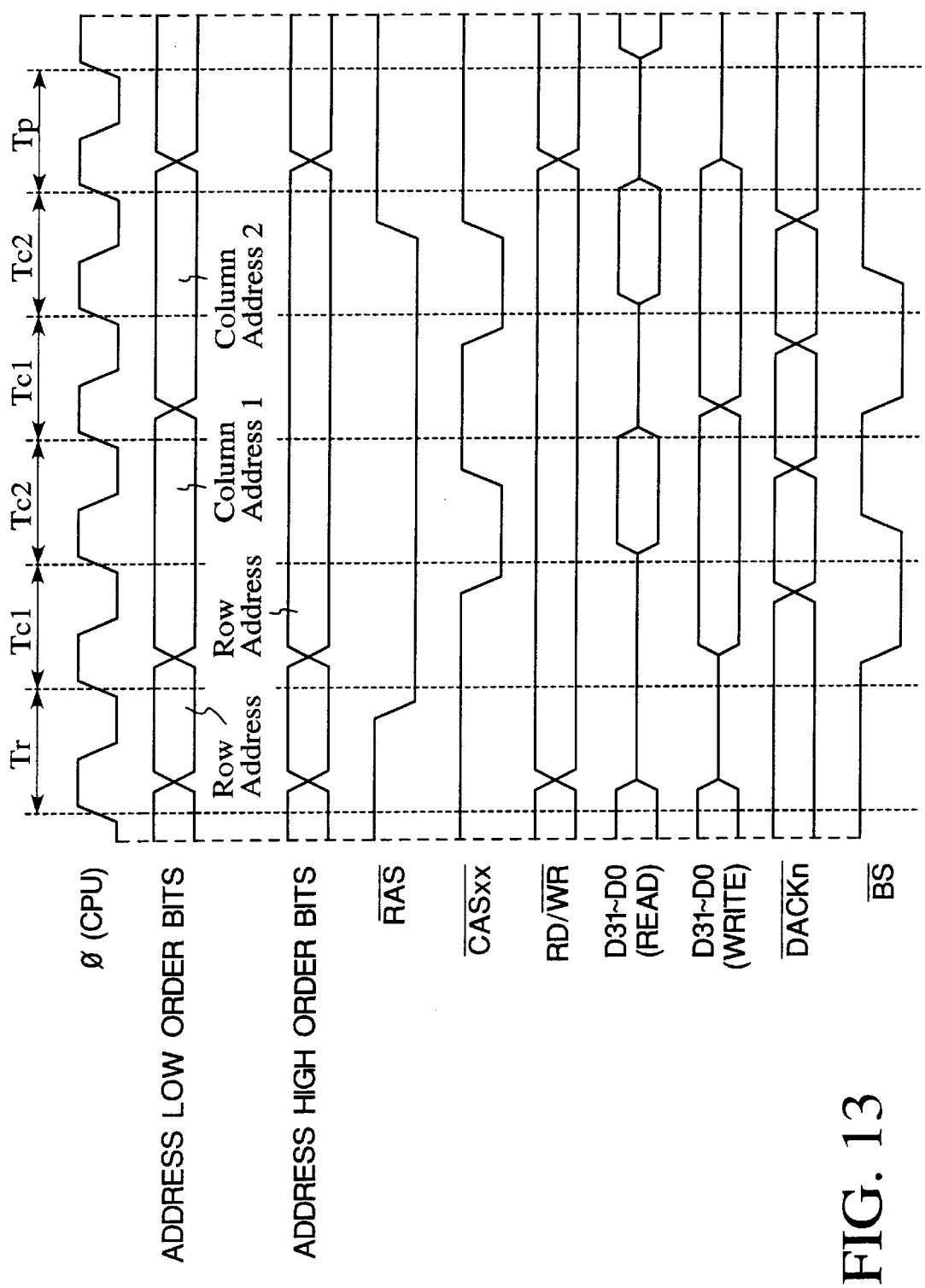
FIG. 13 is a bus cycle waveform diagram for explaining a high-speed page mode of the DRAM of FIG. 12.

FIG. 13 is a bus cycle waveform chart for explaining the high-speed page mode of the aforementioned DRAM. In the high-speed page mode, the row address is fixed, that is, the word lines are held in the selected state, and the data are continuously read or written by inputting column addresses sequentially in synchronism with the column address strobe signal /CAS. In this case, by the hit signal Hit coming from the row address comparator in the aforementioned break controller UBC, the high-speed page mode can be invited while omitting the resetting operation of the row line. Similar operations can also be carried out in the SDRAM.

Figure 14:
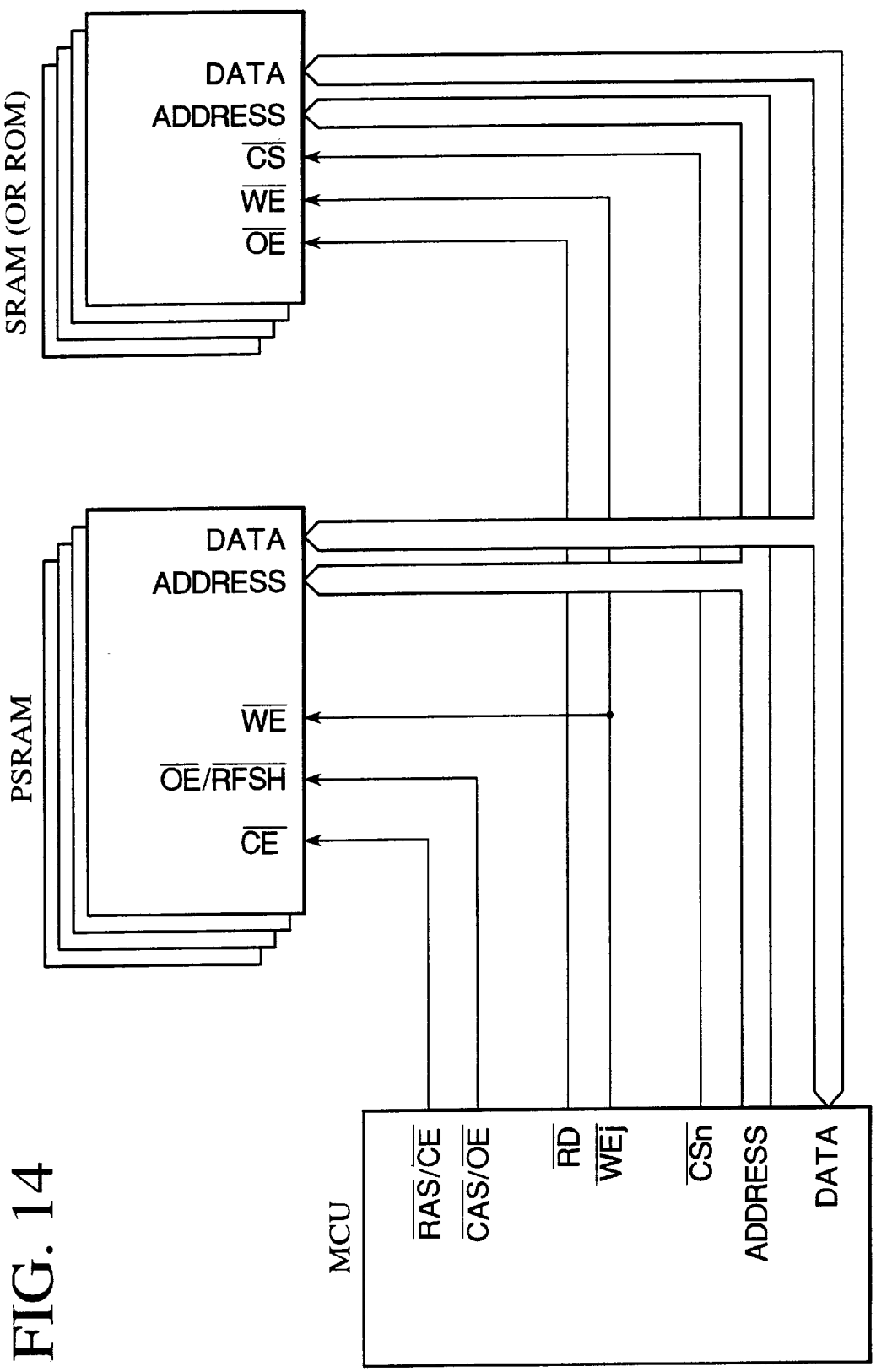
FIG. 14 is a block diagram showing an example of connection between the bus state controller BSC to be packaged in the single-chip microcomputer according to the present invention and a pseudo-static type RAM through the external bus interface OBIF.

FIG. 14 is a block diagram for explaining an example of connection between the bus state controller BSC and the pseudo-static type RAM (as will be shortly referred to as the "PSRAM") by the external bus interface OBIF. The output/ RAS*/CE at the single-chip microcomputer MCU is connected with the chip enable terminal /CE of the PSRAM, and the output /CAS*/OE at the side of the MPU is connected with the output enable*refresh control terminal /OE*/RFSH of the PSRAM. The write enable terminal /WE of the PSRAM is connected as in the SRAM with the terminal /WEj of the MCU. Moreover, the chip select terminal /CS of the SRAM is fed with the terminal /CSn of the MCU. Specifically, the PSRAM is assigned by the aforementioned space division to the space CS3, and the SRAM at this time is assigned to the remaining spaces.

Figure 15:
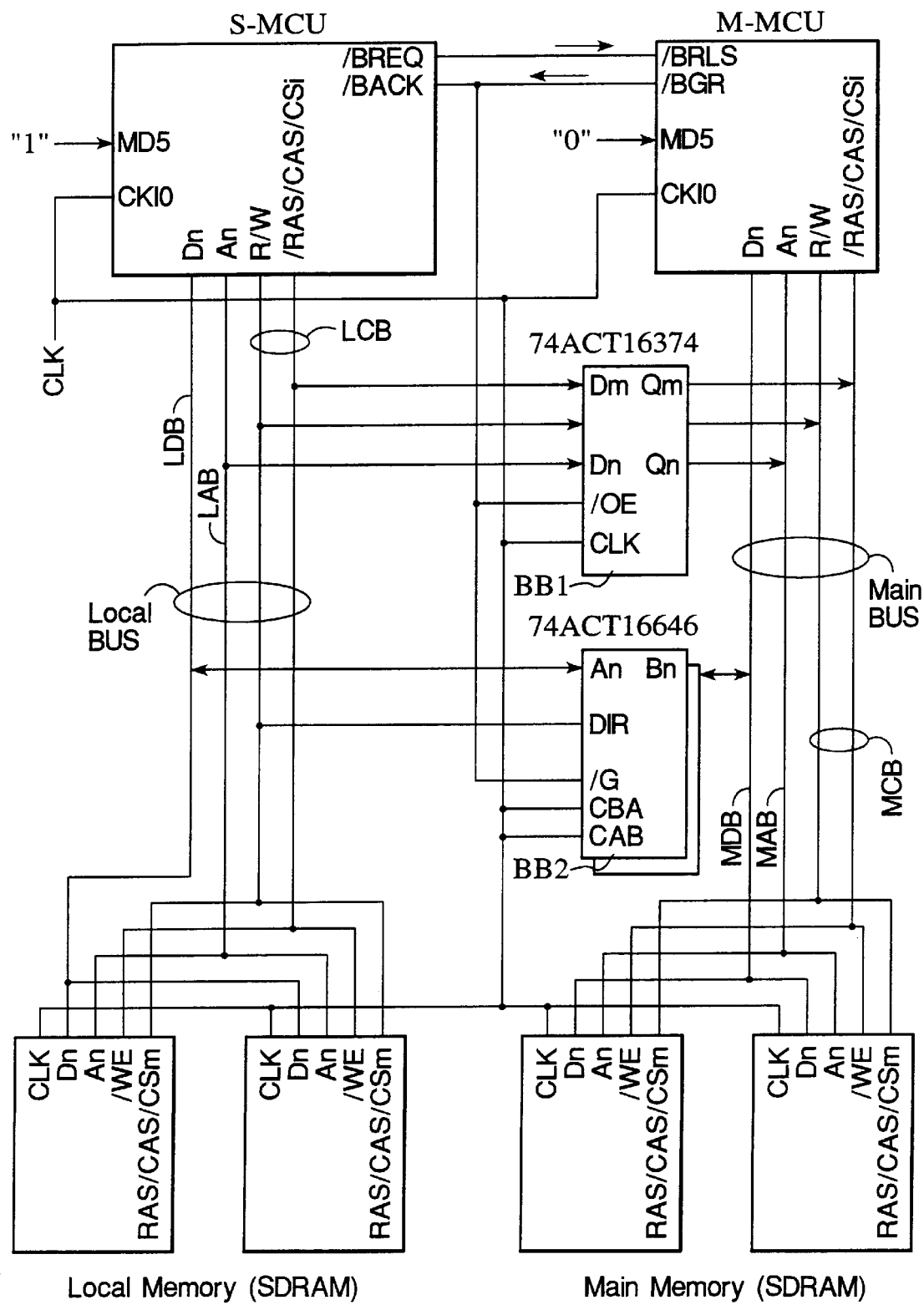
FIG. 15 is a block diagram showing one embodiment of the case in which a multi-processor connection is made by using the single-chip microcomputer according to the present invention.

FIG. 15 is a block diagram showing one embodiment of the case of the multi-processor connection using the single-chip microcomputer MCU according to the present invention. The single-chip microcomputer MCU of this embodiment can be set to the master mode and the slave mode by inputting the low/high level to the mode setting terminal MD5. By making use of this function, the multi-processor system can be constructed while bringing one of the two single-chip microcomputers into the master mode and the other into the slave mode.

What is fed with the high level ("1") at its terminal MD5 is the single-chip microcomputer S-MCU in the slave mode. On the other hand, what is fed with the low level ("0") at its terminal MD5 is the single-chip microcomputer M-MCU in the master mode. The master-side M-MCU is connected through the main bus with a peripheral LSI such as the main memory.

Specifically, in an ordinary microcomputer system, the main bus is constructed of a memory control unit for accessing a high-speed memory such as a main memory or an extension memory, a DRAM or SDRAM as the main memory, a ROM stored with a basic control program, and a keyboard controller connected at its leading end with a keyboard. Moreover, the main bus is connected with a display adapter, which in turn is connected at its leading end with a display unit such as the CRT or LCD. The main bus is further connected with a parallel port, a serial port such as mouse, a floppy disc drive, and a buffer controller for conversion into a hard disc interface through the main bus. On the other hand, the bus from the aforementioned memory control unit is connected with an extended RAM and a main memory. FIG. 15 is so simplified that only the SDRAM is shown as the main memory.

The slave side S-MCU is equipped with a local bus, although not especially limitative thereto. This local bus is equipped with a local peripheral LSI such as a local-memory, if necessary. This local peripheral LSI may be omitted. Through the bus buffers BB1 and BB2, moreover, the address bus LAB and data bus LDB in the local bus at the side of the S-MCU and the control bus LCB for the control signals (R/W, /RAS, /CAS, /CSi) are connected with the corresponding address bus MAB and data bus MDB at the side of the main bus and the control bus MCB for the control signals (R/W, /RAS, /CAS, /CSi). According to the aforementioned mode settings, moreover, the terminal to be used as /BREQ at the S-MCU side is connected with the terminal to be used as /BRLS of the M-MCU, and the terminal to be used as /BGR at the M-MCU side is connected with the terminal to be used as /BACK of the S-MCU.

The signal /BGR outputted from the M-MCU is inputted to the output enable terminal /OE and the gate terminal /G of the aforementioned bus buffer BB2, too. As a result, when the S-MCU receives a use acknowledgment of the main bus, the bus buffer BB2 is activated to feed the address signal of the slave side S-MCU to the main bus so that the peripheral LSI or the like on the main bus can be accessed.

At this time, the clock CKIO to be outputted from the M-MCU and inputted to the S-MCU has its phase advanced by 90 degrees from the internal clock of the S-MCU, as when the aforementioned SDRAM is accessed, it is possible to enlarge the operation margin of the transmission of the signals to be fed to the main bus through the aforementioned bus buffers BB1 and BB2. In short, thanks to the aforementioned setting of the phase difference, the setup time and the hold time of the signals to be transmitted through the latched bus buffers BB1 and BB2 can be sufficiently retained as when the SDRAM is accessed.

In this embodiment, one single-chip microcomputer can be selectively used in the master mode or in the slave mode by setting the modes, and the same terminals are switched for the master and slave uses so that the number of terminals can be reduced.

Figure 16:
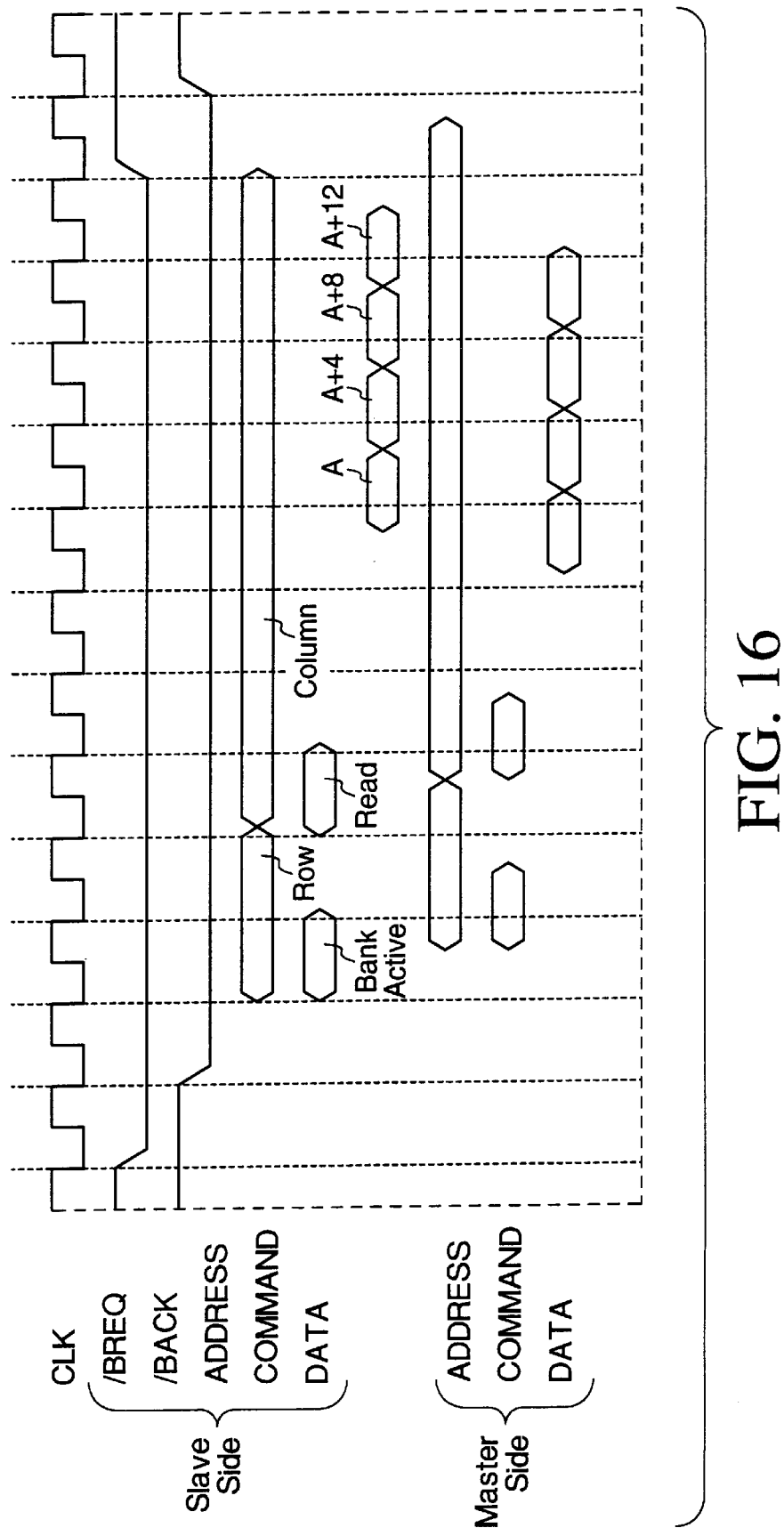
FIG. 16 is a timing chart for explaining the case in which the SDRAM on a main bus is to be accessed from the S-MCU of FIG. 15.

FIG. 16 is a timing chart showing the case in which the SDRAM on the main bus is to be accessed from the S-MCU. When the signal /BREQ is outputted from the slave side whereas the bus use acknowledge signal /BGR is outputted from the main side to set the signal /BACK to the low level, a row address (ROW) and a column address (COLUMN) are outputted as in case the aforementioned SDRAM is accessed. At the master side, the address and the command are transmitted with a delay (of one clock) through the latched bus buffers BB1 and BB2 so that the read data is also transmitted with a delay through the latched bus buffer BB2 to the slave side.

Figure 17:
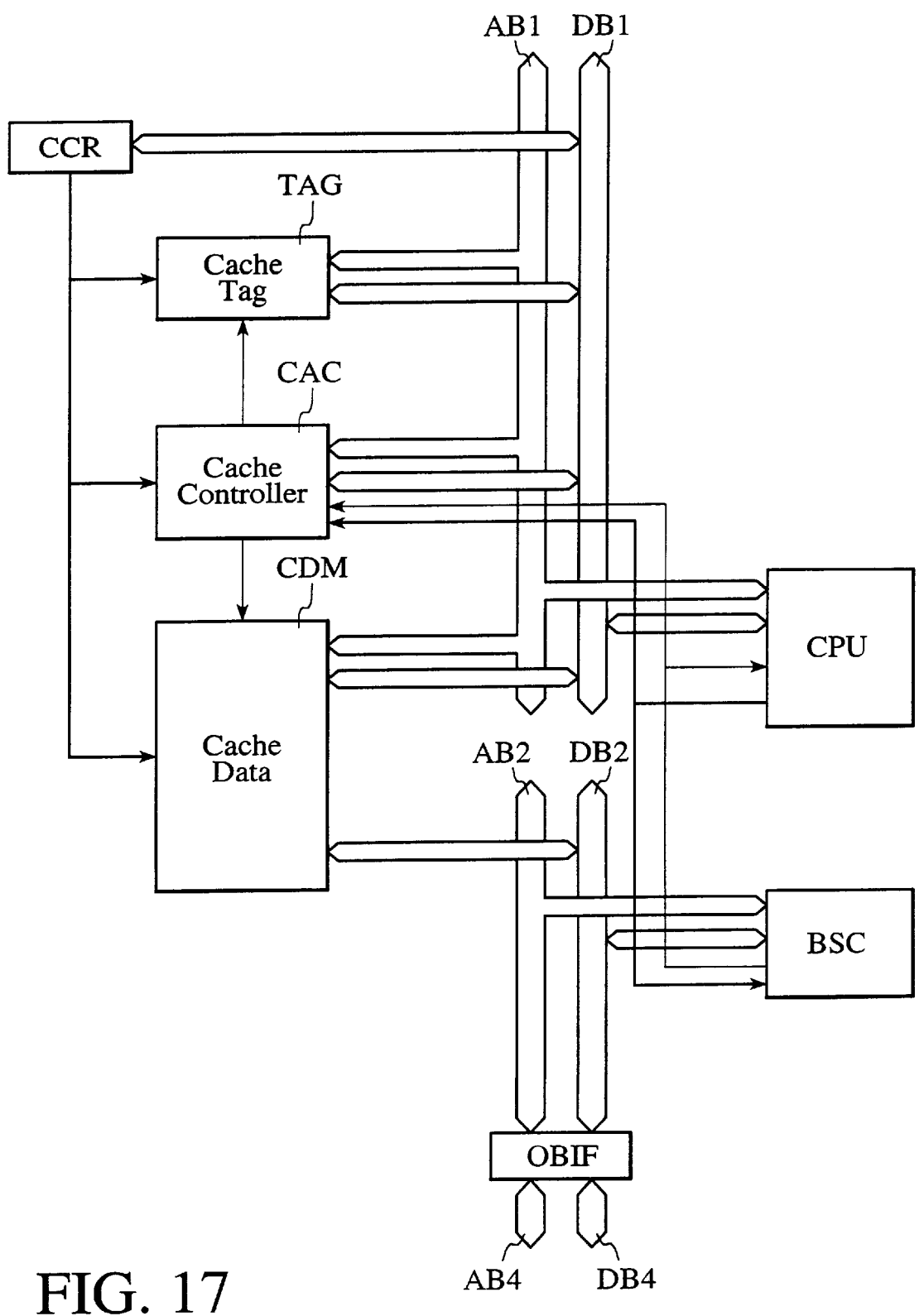
FIG. 17 is a block diagram showing one embodiment of a cache memory to be packaged in the single-chip microcomputer according to the present invention.

FIG. 17 is a block diagram showing one embodiment of the cache memory to be packaged in the single-chip microcomputer according to the present invention. FIG. 17 also shows the central processing unit CPU and the bus state controller. The cache memory of this embodiment executes the outputting of data from the address input by 1.5 cycles. The data replace algorithm is exemplified by the LRU (i.e., Least Recently Used) method.

The cache memory has its circuit constructed roughly of a cache tag (i.e., address array), a cache data (i.e., data array) and a cache controller. The cache tag stores a portion of the address called the "address tag", and the cache data stores the data corresponding to the address tag stored in the cache tag. As a result, when a portion of the address stored in the cache tag matches the corresponding address coming from the central processing unit CPU, the hit signal is outputted from the cache tag so that the data read out of the cache data being selected in parallel is fetched by the central processing unit CPU. If a miss hit occurs, an external main memory is accessed through the aforementioned break controller UBC and external bus interface.

In FIG. 17, the cache control register CCR has control bits for cache enabling, instruction fill inhibiting, data fill inhibiting, two-way mode and way specifying operations, and is used for setting the operation modes.

Figure 20:
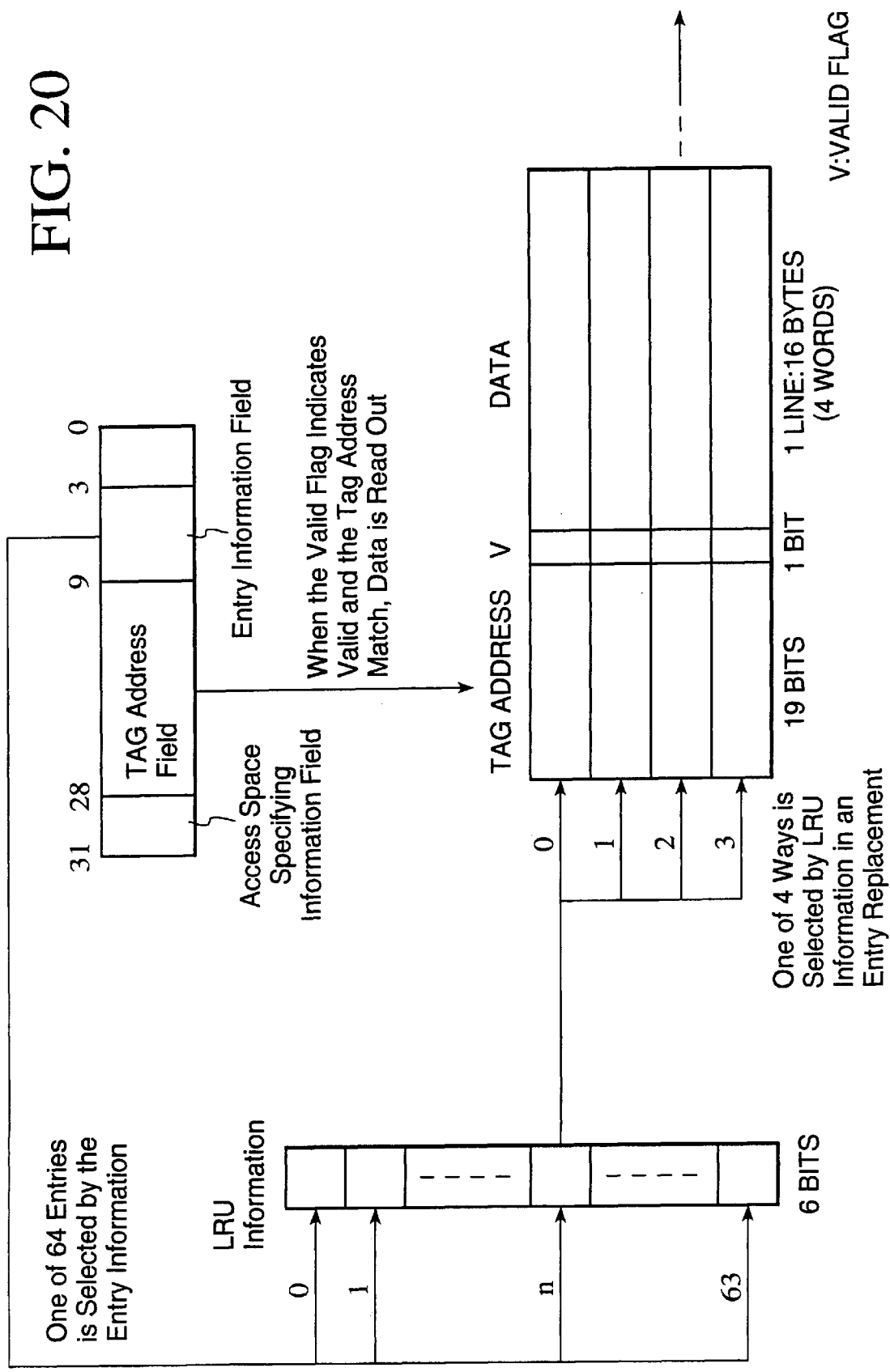
FIG. 20 is an operation conception diagram for explaining the cache memory according to the present invention.

FIG. 20 is a operation conception diagram showing the cache memory according to the present invention. The address signal is constructed of 32 bits A31 to A0. The 16 bytes corresponding to the 4 bits of the addresses A3 to A0 make one line. This line is a cluster of data related to one associative address. The 6 bits of the address signals A9 to A4 make an entry information region so that one of sixty four entries is selected according to the values of the address signals A9 to A4. The 19 bits of the address signals A28 to A10 make a tag address region, so that the tag address data corresponding to the address signals A28 to A10 are written in the cache tag. The 3 bits of the address signals A31 to A29 make an access space specifying region and are used for specifying the access space.

The LRU information is provided to correspond to the sixty four entries 0 to 63. The LRU information is constructed of 6 bits. At the entry replacement, the replacement of the entries is decided by the LRU replace algorithm. The LRU information is used for deciding the replacement, and the information relating to the past accesses is expressed by 6 bits. Although there are sixty four combinations to be expressed by 6 bits, twenty four combinations can be expressed by using an initial value 0. When the cache memory is used in two ways, the lowest order bit of the LRU information is so combined that it may be used for deciding the replacement. In short, two of four ways are used as the internal RAM, what is used for the replacement due to the miss hit is the way 3, if the lowest order bit is at 0, and the way 2, if the same is at 1. The LRU information for the four-way mode is rewritten by the twenty four combinations satisfying the conditions described above.

When the tag address read out of the aforementioned cache tag and the address signals of 19 bits A28 to A10 outputted from the central processing unit CPU match so that a valid bit is at 1, a hit signal is outputted to read out the data of 16 bytes from the cache data. The four bytes (i.e., 32 bits) of those 16 bytes are specified by the addresses of 2 bits A3 and A2 and read out to the central processing unit CPU.

Figure 18:
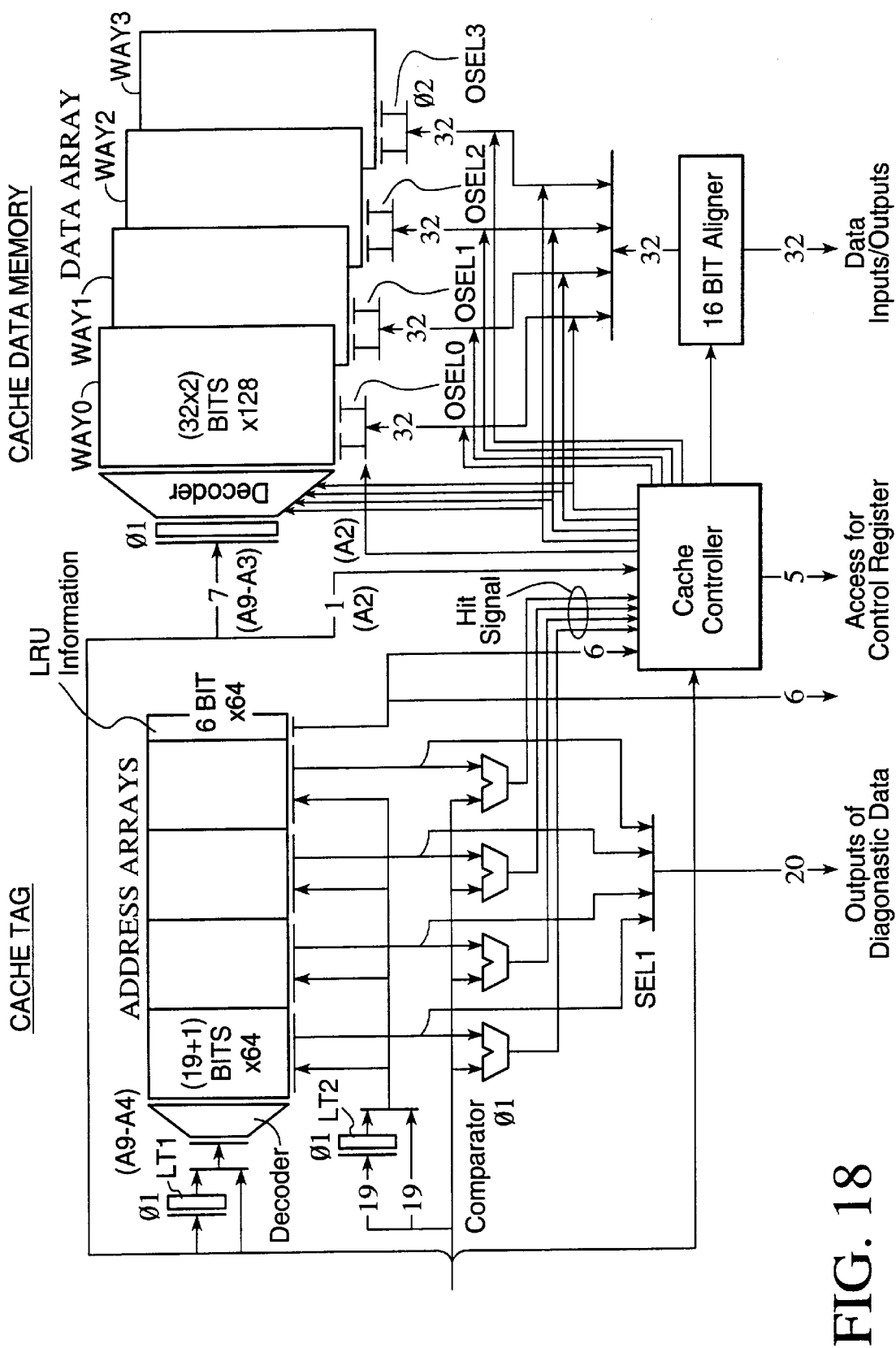
FIG. 18 is a block diagram showing one embodiment of the cache memory according to the present invention.

FIG. 18 is a block diagram showing one embodiment of the cache memory according to the present invention. The aforementioned cache tag is constructed of a decoder, an address array and four comparators. Four address arrays are provided to correspond to the four ways and are fed with the addresses A9 to A4 so that one of the sixty four entries is selected. Each entry is made to store address signals of 19 bits corresponding to the address tag and a valid bit (V) of 1 bit. As a result, the address array corresponding to one way is given a memory capacity of (19+1) bits×64. A memory unit for the LRU information of 6×64 bits is provided commonly for the four ways.

The latch circuits LT1 and LT2 for latching the address signals in response to a pulse signal φ1 are used to latch the addresses at the time of a miss hit because the central processing unit CPU outputs the address signals by its pipe line operations. The address tag read out of the address array and the corresponding address signals of 19 bits A28 to A10 of the address inputs are inputted to the comparators.

The hit signals of the four comparators provided to correspond to the four ways are fed to the cache controller. Moreover, the LRU information corresponding to the selected one of the sixty four entries is fed to the cache controller. If no hit signal is outputted from the four ways, one way to be used for the replacement is determined by the aforementioned LRU information. The address tag read out of the address array is outputted as the diagnostic data by the selector Sell.

The address signals of 7 bits A9 to A3 of the aforementioned address inputs are inputted to the decoder of the data array. This data array has 32 bits×2×128. The address signals A9 to A4 correspond to the aforementioned sixty four entries, and the address signal A3 is made to select either the high order data of 32×2 bits of one line (of 32×4) or the low order data of 32×2 bits. By thus elongating the construction of the data array, the number of later-described complementary data lines is reduced to simplify the output of the unit data of 32 bits.

In this embodiment, the hit signal is inputted from the cache controller to the decoder of the aforementioned data array, although not especially limitative thereto. As a result, in the decoder of the cache data memory, only such one of the four ways as corresponds to the hit signal is caused to select the word lines thereby to contemplate the lower power dissipation of the cache data memory. In short, only the word line drive for the way corresponding to the hit signal is activated. Moreover, only the sense amplifier of the way corresponding to the hit signal is operated.

In addition to this, since the current to be consumed by the sense amplifier of the cache data memory is relatively high, the hit signal from the cache controller may be used only for controlling the sense amplifier. Specifically, the decoder of the data array may bring the word lines of the four ways for the high speed reading operations into the selected state to cause the reading operation of the memory cells to precede so that it may operate the sense amplifier while awaiting the hit signal from the cache controller, thereby to speed up the reading operation from the data array. The data of 32×2 bits read out of the way corresponding to the hit signal are fed through the selector, which is selected by the address signal A2 outputted through the cache controller.

The four comparators of the aforementioned address tag are operated by the timing signal $\phi 1$, whereas the output selectors osel1 to osel3 are operated by the timing signal $\phi 2$ delayed by one half cycle from the timing signal $\phi 1$. Thus, there would arise no operational problem even if the word line selection of the data array and the control of the sense amplifier might be effected by the aforementioned hit signal. An aligner disposed at the output portion is used when the output data of 32 bits outputted from the data array are to be outputted as the data at the unit of 8 bits or 16 bits.

Of the aforementioned four ways of the cache data memory, the ways 0 and 1 can be used as the internal RAM. In this mode, the hit signals of the address tags corresponding to the ways 0 and 1 are invalidated. The accesses of the ways 0 and 1 in this mode are carried out by the forced read/write functions of the data array. Specifically, in these forced read/write functions, the ways are selected by the select signals in place of the hit signals are selected by the cache controller to read/write the data.

When the two ways 0 and 1 are used as the internal RAM, as described above, the write of the LRU information of 6 bits is accomplished as for the four ways, but the selection of the replace way is accomplished by referring to only the lowest order bit of the LRU information of 6 bits to select the way 3, if at 0, and the way 2 if at 1. By thus sharing a predetermined bit of the LRU information between the 2-way mode and the 4-way mode, the replace algorithm can be simplified.

Figure 19:
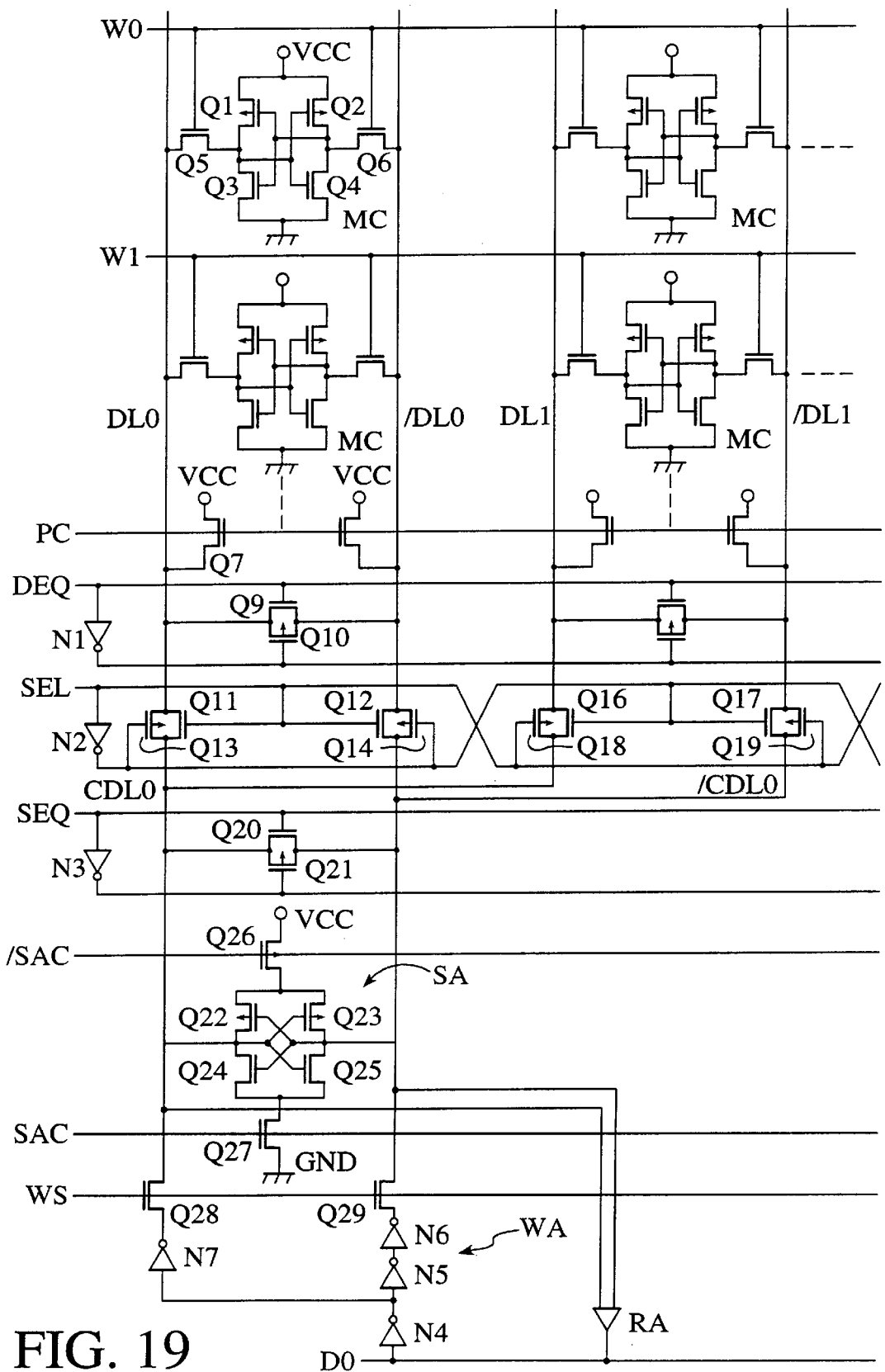
FIG. 19 is a block diagram showing one embodiment of the cache memory to be packaged in the single-chip microcomputer according to the present invention.

FIG. 19 is a circuit diagram showing one embodiment of the data array of the aforementioned cache data memory. In FIG. 19, there are representatively shown two pairs of complementary data lines, two word lines, four memory cells at their intersections, their output selections, and a sense amplifier. In FIG. 19, P-channel type MOSFETs are differentiated from N-channel type MOSFETs by adding arrows to their channel portions.

The aforementioned memory cell is constructed into a latch circuit by intersectionally connecting the inputs and outputs of two CMOS inverter circuits which are composed of P-channel type MOSFETs Q1 and Q2 and N-channel type MOSFETs Q3 and Q4. Between the paired input/output nodes of the latch circuit and the complementary data lines DL0 and /DL0, there are connected N-channel type transfer gate MOSFETs Q5 and Q6. These transfer gate MOSFETs Q5 and Q6 have their gates connected with the word line W0. The remaining memory cells are constructed of CMOS static type memory cells similar to the aforementioned one.

The complementary data lines DL0 and /DL0 are equipped with N-channel type precharge MOSFETs Q7 and Q8. These MOSFETs Q7 and Q8 have their gates fed with a precharge signal PC. Between the complementary data lines DL0 and /DL0, moreover, there is connected an equalizing CMOS switch. This CMOS switch is composed of an N-channel type MOSFET Q9 and a P-channel type MOSFET Q10 which are connected in parallel. The N-channel type MOSFET Q9 has its gate fed with a data line equalizing signal DEQ, and the P-channel type MOSFET Q10 has its gate fed with the inverted signal DEQ which is inverted by an inverter circuit N1. The aforementioned equalizing MOSFETs may be composed exclusively of N-channel type MOSFETs or P-channel type MOSFETs.

The aforementioned two pairs of complementary data lines DL0 and /DL0, and DL1 and /DL1 are connected through the CMOS switch with one sense amplifier. Specifically, the data line DL0 and the data line DL1 are connected with the common data line CDL0, respectively, through an N-channel type MOSFET Q11 and a P-channel type MOSFET Q13, which are connected in parallel, and through an N-channel type MOSFET Q16 and a P-channel type MOSFET Q18 which are likewise connected in parallel. The data line /DL0 and the data line /DL1 are connected with the common data line /CDL0, respectively, through an N-channel type MOSFET Q12 and a P-channel type MOSFET Q14, which are connected in parallel, and through an N-channel type MOSFET Q17 and a P-channel type MOSFET Q19 which are likewise connected in parallel. These CMOS switches are intersectionally fed with a select signal SEL so that one of the pairs of the complementary data lines DL0 and /DL0, and DL1 and /DL1 is selected. The select signal SEL is produced from the aforementioned address signal A2, for example.

The common data lines CDL0 and /CDL0 are connected with the input of a sense amplifier SA constructed of a CMOS latch circuit. This sense amplifier SA is constructed into a latch circuit by intersectionally connecting the inputs and outputs of two CMOS inverter circuits which are composed of P-channel type MOSFETs Q22 and Q23 and N-channel type MOSFETs Q24 and Q25. Moreover, the aforementioned P-channel type MOSFETs Q22 and Q23 have their sources fed with an operation voltage VCC through a P-channel type switch MOSFET Q26, and the aforementioned N-channel type MOSFETs Q24 and Q25 have their sources fed with the earth potential (GND) of the circuit through an N-channel type switch MOSFET Q27. The P-channel type MOSFET Q26 has its gate fed with a sense amplifier operation signal /SAC, and the N-channel type MOSFET Q27 has its gate fed with a sense amplifier operation signal SAC.

The common data lines CDL0 and /CDL0 serving as the input of the sense amplifier are equipped in parallel with equalizing N-channel type MOSFET Q20 and P-channel type MOSFET Q21. The N-channel type MOSFET Q20 has its gate fed with the sense amplifier equalize signal SEQ, and the P-channel type MOSFET Q21 has its gate fed with the inverted signal SEQ which is inverted by an inverter circuit N3. Since the sense amplifier SA of this embodiment is constructed of a latch circuit having a high sensitivity and a positive feedback loop, the input levels are equalized by the aforementioned equalize MOSFETs Q20 and Q21 before the start of the operation by the aforementioned signals /SAC and SAC. If the potential difference between the common data lines CDL0 and /CDL0 is given a predetermined potential according to the stored information coming from the selected memory cell, it is amplified by the signals /SAC and SAC to amplify the common data lines CDL0 and /CDL0 to the high/low levels. The signals thus amplified are outputted to a read-out circuit RA. Incidentally, the aforementioned equalizing MOSFETs may be composed exclusively of N-channel type MOSFETs or P-channel type MOSFETs.

In case the sense amplifier SA having the aforementioned CMOS latch shape is used, when the potentials of the common data lines CDL0 and /CDL0 are set to the high/low levels by the aforementioned amplifying operations, no steady DC current flows in the CMOS latch circuit so that the power dissipation can be reduced. If, moreover, the aforementioned sense amplifier operation signals SAC and /SAC are produced by the high signal, as described above, only the sense amplifier corresponding to one of the four ways operates so that the current to be consumed by the sense amplifier can be drastically reduced to about one quarter.

The aforementioned common data lines CDL0 and /CDL0 are connected with a write amplifier WA through N-channel type MOSFETs Q28 and Q29 which are switched by the write select signal WS. The write amplifier WA is constructed of inverter circuits N4 to N7. Of these, the CMOS inverter circuit N4 made receptive of the input data D0 has its output signal turned into a complementary write signal through the drive inverter circuit N7, the drive inverter circuit N5 and the drive inverter circuit N6. This complementary write signal is transmitted to the common data lines CDL0 and /CDL0 through the aforementioned switch MOSFETs Q28 and Q29.

As described above, the data array of one way is equipped with thirty two sets of one sense amplifier and one write amplifier for the aforementioned two sets of complementary data lines. As a result, the memory array unit is composed of 32×2 complementary data lines and 128 word lines to input/output the data of 32 bits.

Figure 21:
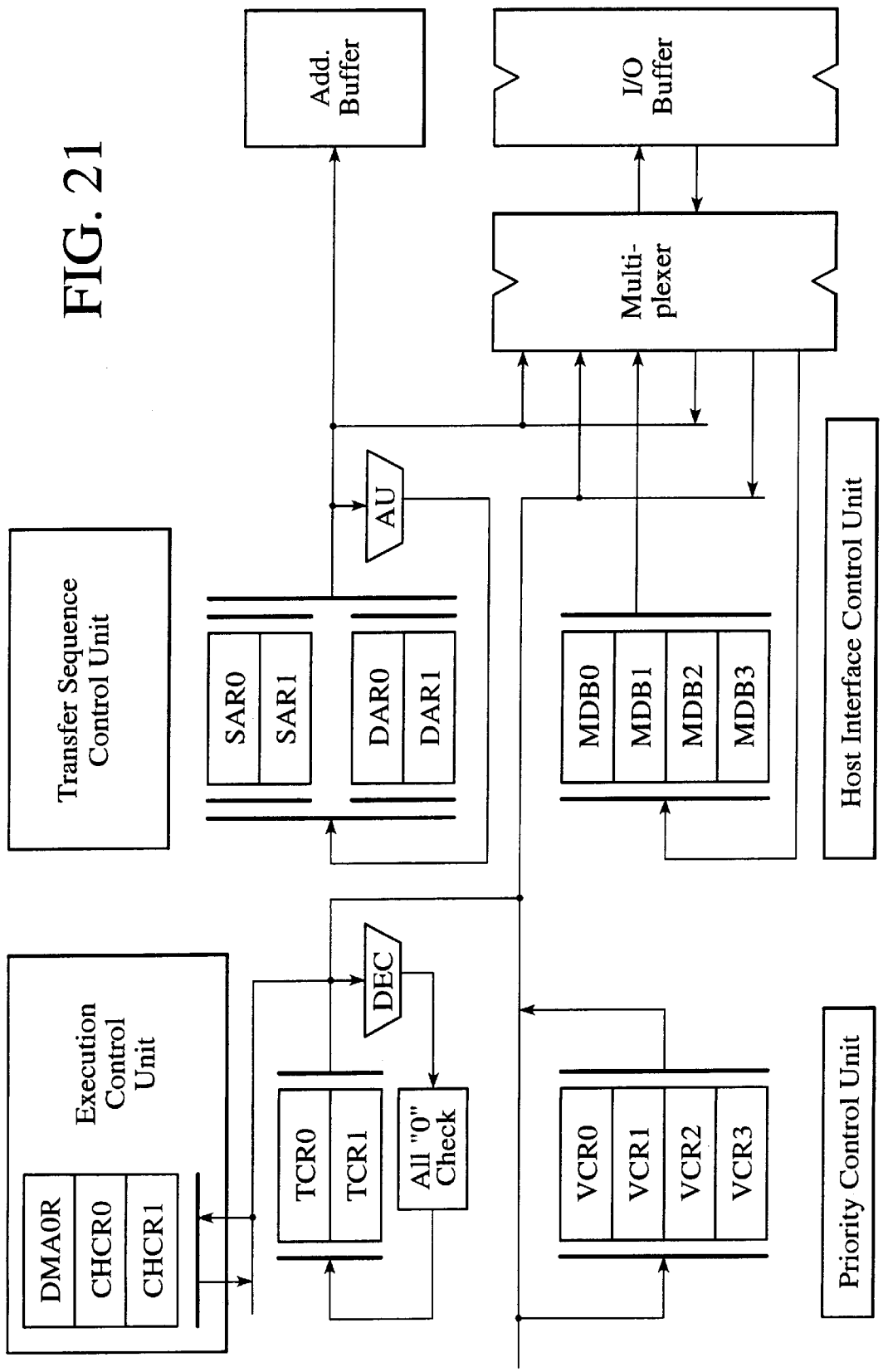
FIG. 21 is a block diagram showing one embodiment of the direct memory access control DMAC to be packaged in the single-chip microcomputer according to the present invention.

FIG. 21 is a block diagram showing one embodiment of the aforementioned direct memory access controller DMAC to be packaged in the single-chip microcomputer according to the present invention. This embodiment is given two channels, i.e., the channel 0 (CH0) and the channel 1 (CH1). Two circuit blocks are provided for each of the channels CH0 and CH1. The numerals 0 and 1 attached to the letters of the individual circuit blocks correspond to the aforementioned channels CH0 and CH1.

The circuits to be provided to correspond to the aforementioned two channels CH0 and CH1 are as follows. Circuits SAR0 and SAR1 are source address registers. Each of these source address registers SAR0 and SAR1 has 32 bits and is set with the start address of the destination of DMA transfer. These source address registers SAR0 and SAR1 are always caused to hold the following transfer address value in accordance with the address computing conditions which are separately set during the operation or after the end of the transfer.

Circuits DAR0 and DAR1 are destination address registers, each of which has 32 bits and is set with the start address of the destination of DMA transfer. These source address registers DAR0 and DAR1 are always caused to hold the following transfer address value in accordance with the address computing conditions which are separately set during the operation or after the end of the transfer.

Circuits TCR0 and TCR1 are transfer count registers, each of which has 32 bits and is set with the number of DMA transfers. These transfer count registers DCR0 and DCR1 are caused to hold the number of the remaining transfers during the operation or after the end of the transfer. This number is the twenty fourth power of 2 (i.e., the maximum transfer number) at the setting time of all "0". Circuits VCR0 and VCR1, and VCR2 and VCR3 are vector registers, two of which correspond to the channels CH0 and CH1. Each of the vector registers VCR0 to VCR3 is composed of 8 bits and is set with the interrupt vector address of the DMAC. This setting is carried out by the central processing unit CPU, which fetches the vector at the time of occurrence of interruption.

Circuit blocks shared between the channels CH0 and CH1 are as follows. A circuit DMAOR is a DMA operation register, and circuits CHCR0 and CHCR1 are channel control registers provided to correspond to the operation register DMAOR. A circuit AU is an address arithmetic unit, and a circuit DEC is a decrementer with an all "0" detector. Moreover, circuits MDB0 to MDB3 are four-stage buffers for transferring 128 bits. By these data buffers MDB0 to MDB4, there are accomplished the data transfers corresponding to one line of the cache memory so that the data transfers of 4 cycle×32 bits are accomplished by the burst read for the SDRAM. In addition to the circuits enumerated, there are provided DMA request/select registers 0 and 1, a transfer sequence control circuit, a host interface and a priority control circuit.

By matching the number of the unit data bytes of one line of the cache memory, the read data byte number by the burst read of the SDRAM, and the number of the unit data transfer byte number of the data buffer of the DMAC, the data transfers between the SDRAM by the DMAC and another memory or a peripheral LSI can be efficiently accomplished.

Figure 22:
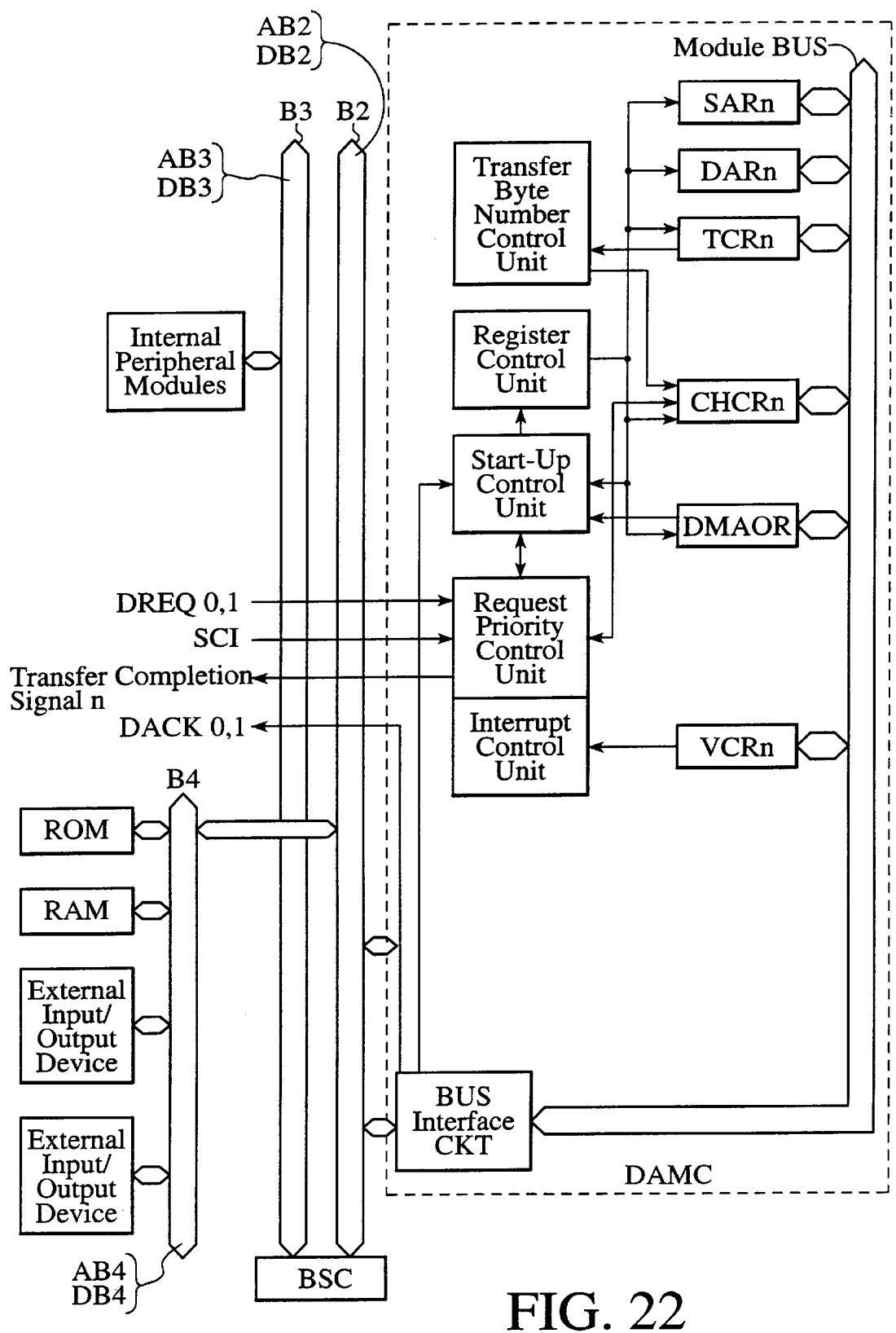
FIG. 22 is a schematic block diagram showing one embodiment of the DMAC according to the present invention and its peripheral circuits.

FIG. 22 is a schematic block diagram showing one embodiment of the DMAC and its peripheral portion according to the present invention. The DMAC according to the present invention is connected with the internal bus B2 (AB2, DB2) of the single-chip microcomputer according to the present invention. The DMAC executes the data transfers between the external memories (ROM, RAM) or the external input/output devices, which are connected with the external bus B4 (AB4, DB4) through the aforementioned external bus interface OBIF, and the internal peripheral modules which are connected with the cache memory or the internal bus B3 (AB3, DB3), although shown not in FIG. 22 but in FIG. 1.

The address mode is divided into a dual address mode and a single address mode. In the dual address mode, the access to the transfer source and destination is divided into twice bus cycles. In the first bus cycle, the transfer source address is outputted. In the next bus cycle, the transfer destination address is outputted. In short, in the address mode, one DMA transfer is executed in the two bus cycles.

In the single address mode, on the other hand, the transfer source address is outputted to the transfer source, e.g., an external memory so that the transfer destination, e.g., an external I/O device is accessed by the signal /DACK simultaneously as the transfer source is addressed. In short, one DMA transfer is executed in one bus cycle.

The bus mode (or transfer mode) is divided into a cycle steal mode and a burst mode. In the cycle steal mode, after the end of DMA transfer of one word, the bus right is released and transferred to another bus master (e.g., CPU). In the burst mode, when a bus right is acquired, the DMA transfer is continued till the transfer ending condition is satisfied. In case, however, the level of the terminal /DREQ is sampled in the external request mode, the DMA transfer is executed according to the level of the terminal /DREQ.

A transfer request is divided into an external request, an internal request from an internal peripheral module, and an auto-request. The external request can start the channel CH0 by the terminal /DREQ0 and the channel CH1 by the terminal /DREQ1. In the sampling of the terminals /DREQ0 and /DREQ1, the fall edge and level can be selected as the select conditions. The internal request from the internal peripheral module is divided into the receive data full of the internal SCI0 and the send data line empty of the internal SCI. These requests are automatically cleared by starting the DMA transfer cycle. For the auto-request, the transfer operation is started by setting the DE bits of the channel control registers DHCRn (0, 1) of the DMAC.

In case a plurality of channel transfer requests are simultaneously made for the DMAC, the transfer channel is determined in accordance with the priority order. This priority order is divided into a priority order fixed mode and an alternate mode. In the priority order fixed mode, the priority order between the individual channels is unchanged. Two channels of 1 or 0 can be fixed to the priority order. In the alternate mode, the priority order is alternated between the channels CH0 and CH1, and the timing for changing the priority order is determined when one transfer unit (byte or word) of the channel CH0 or CH1 is ended by the round robin scheduling.

Figure 23:
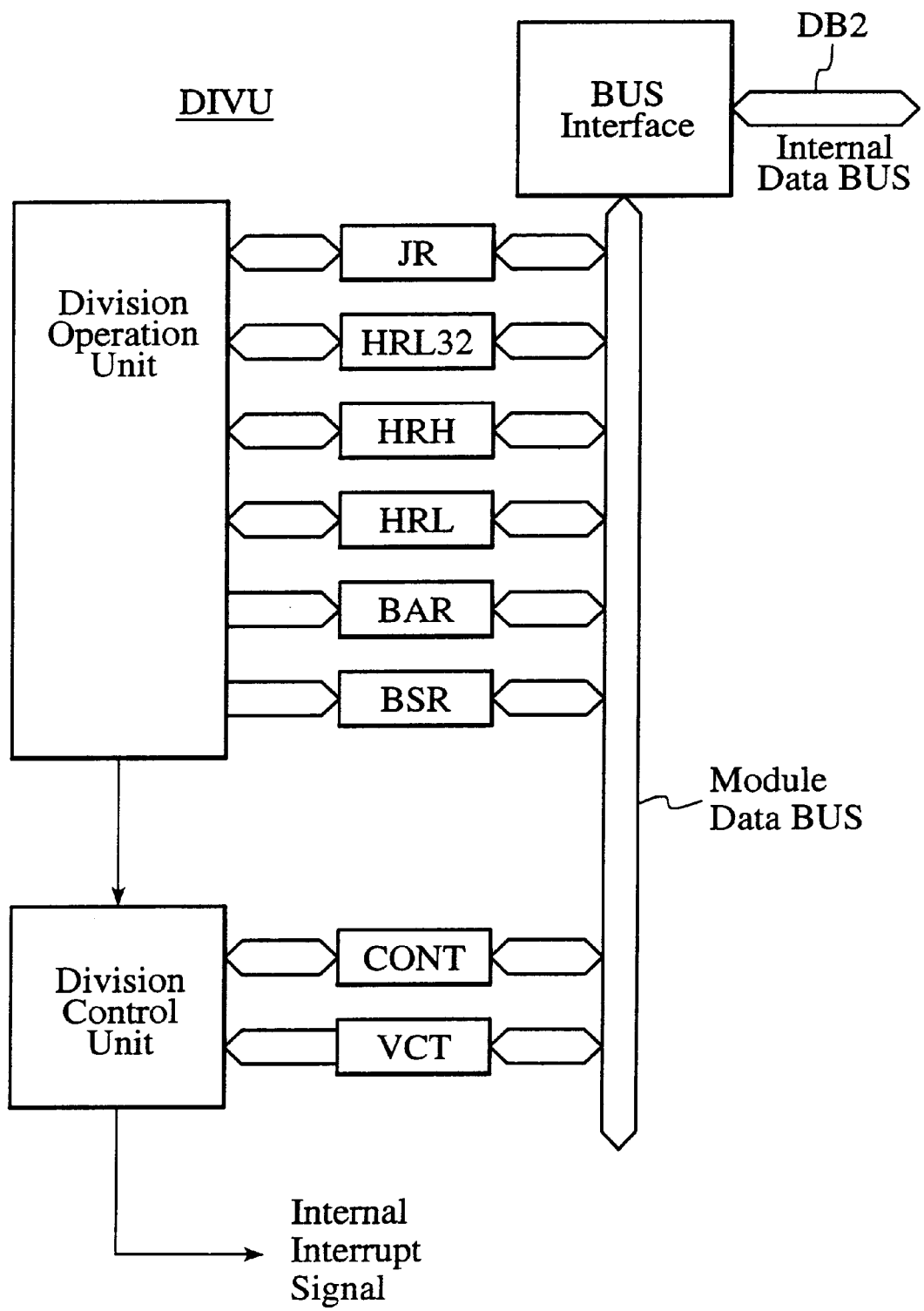
FIG. 23 is a block diagram showing one embodiment of a divider unit DIVU to be packaged in the single-chip microcomputer according to the present invention.

FIG. 23 is a block diagram showing one embodiment of a divider unit DIVU. The divider unit DIVU of this embodiment performs a division of coded 64 bits 32 bits or 32 bits 32 bits to determine a quotient of 32 bits and a residue of 32 bits. In the operation, an interruption can be specified for the central processing unit CPU if an overflow or an underflow occurs.

In FIG. 23: letters JR designate a divisor register; letters HRL a dividend register L for 32 bits; letters HRH a high order dividend register H for 32 bits; and letters HRL a low order dividend register L for 32 bits, these two being able together to input a dividend of 64 bits. Letters BAR designate a residue register, and letters BSR designate a quotient register. Letters CONT designate a control register, and letters VCT designate a interrupt vector register.

The divider unit DIVU of this embodiment starts divisions, when set with the aforementioned dividend and divisor from the central processing unit CPU, to set the BSR with a quotient and the BAR with a residue at about 37 cycles after the start, and automatically ends the operations. If an overflow or underflow occurs, an internal interrupt signal is produced by a designation.

The aforementioned divider unit DIVU performs divisions over about 38 cycles, for example, while being isolated from the internal bus B2 (AB2, DB2) by the bus interface, as shown in FIG. 1. Thus, the central processing unit CPU or the like can perform the data processing or the like using the internal bus B2 (AB2, DB2) in parallel.

Figure 24:
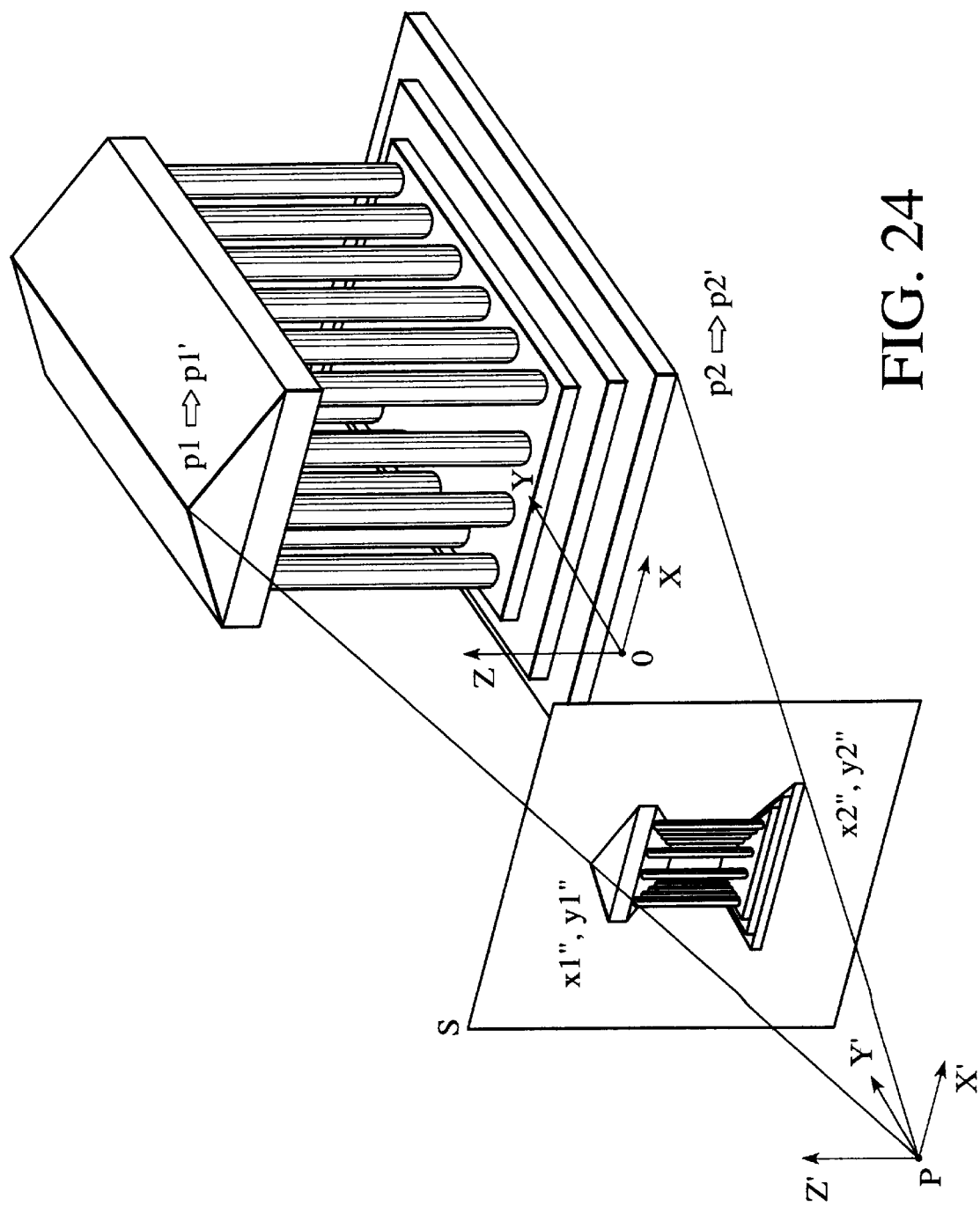
FIG. 24 is an explanatory view for explaining the concept of a three-dimensional object transformation processing to display a three-dimensional object on a two-dimensional display panel.

FIG. 24 is an explanatory view for explaining the concept of a three-dimensional object transformation processing to display a three-dimensional object on a two-dimensional display panel. FIG. 24 shows an example of displaying an ancient Greek shrine on a two-dimensional panel.

Points p1 and p2 specifying the shrine have coordinates (x1, y1, z1) and (x2, y2, z2) with respect to X, Y and Z axes of the origin point 0 of the shrine. The data processing to be executed at first is transform the intrinsic coordinates of the points p1 and p2 specifying the shrine into coordinates corresponding to new X', Y' and Z' axes taking a point of view P as the origin point. This processing is the coordinate transformation processing. In short, the coordinates of the individual points p1 and p2 specifying the shrine are so transformed into relative coordinates as to correspond to what position and what angle the shrine is to be viewed.

$$[x1', y1', z1', 1] = [x1, y1, z1, 1] \begin{matrix} T00 & T01 & T02 & T03 \\ T10 & T11 & T12 & T13 \\ T20 & T21 & T22 & T23 \\ T30 & T31 & T32 & T33 \end{matrix} \quad \text{[Equation 1]}$$

In Equation 1, (x1', y1', z1') express the transformed coordinates of the point p1 of the shrine, and (x1, y1, z1) express the coordinates corresponding to the intrinsic origin point of the shrine. From the determinant of Equation 1, the coordinate x1' can be determined from the multiply and accumulate operation of x1'=x1 ET00+y1 ET10+z1 ET20+1 ET30. Likewise, the coordinates y1' and z1' can be respectively determined from the multiply and accumulate operations of y1'=x1 ET01+y1 ET11+z1 ET21+1 ET31 and z1'=x1 ET02+y1 ET12+z1 ET22+1 ET32.

After the coordinate transformation point p1 has been transformed into the coordinate p1', as described above, the coordinates (x1", y1") of an intersection between the straight lines joining the point P and the individual coordinate p1' and a display panel S are used as the point in the display panel. Hence, the coordinates (x1", y1") are determined from the ratio of the distances of the two-dimensional panel S and the relative coordinate p1' of the shrine with respect to the origin point P. Hence, the perspective transformation to determine the coordinates on the display panel is executed by the division processing.

It is then decided whether or not each of the coordinates on the two-dimensional panel thus determined is located inside or outside the panel. If two points are in the panel S, they are expressed by a straight line joining them. When one or two points go out of the panel, whether or not the line passes through the panel S is determined depending upon which of either the four vertical and horizontal panels or the four obliquely vertical panels around the panel S the points are located in, and a straight line is drawn to correspond to the point outside of the panel S. This is called the clip (or clipping) processing. In this clipping, it is decided whether or not the point is located in the totally eight panels around the aforementioned panel S. Hence, the clipping is executed by repeating the comparison of magnitudes between the point (x1", y1") determined by the divisions and the boundary address of X and Y breaking the panel. The divisions to be accomplished by the digital circuit are executed by repeating subtractions. Thus, the divisions necessarily take a long time. Specifically, in case the aforementioned transformation processing, perspective transformation processing and clipping processing are sequentially executed as in the prior art, what is drawn by the microcomputer of the prior art is motion pictures of animation at best if sixty motion pictures are to be drawn for one second. In case a stereoscopic image is to be drawn, a curved plane is expressed by a combination of polygons so that the density of video signals to be expressed is determined in proportion to the number of polygons which can be drawn for 1/60 secs. The number of polygons to be drawn for 1/60 secs by a high-speed microcomputer of the prior art operating with a high-frequency clock signal of 28.7 MHz is 500 to 900 at most, if the aforementioned clipping processing is omitted. A planar motion picture as good as an animation picture can be drawn with about 500 polygons.

Figure 25:
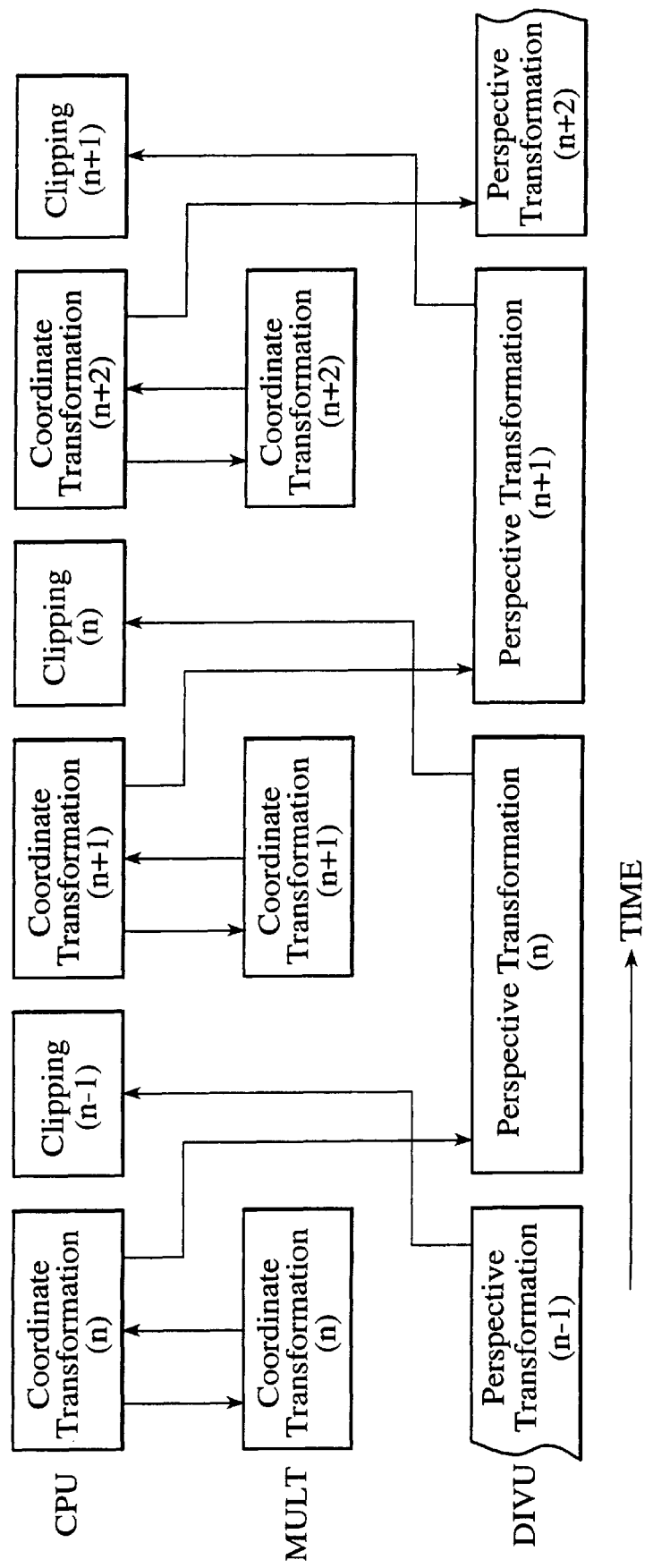
FIG. 25 is a signal processing diagram for explaining a three-dimensional image transformation processing method using the single-chip microcomputer according to the present invention.

FIG. 25 is a signal processing diagram for explaining the three-dimensional image processing method using the single-chip microcomputer according to the present invention. In FIG. 25, the three-dimensional image processing is divided into the coordinate transformation processing, the perspective transformation processing and the clipping processing, and the relations between the individual circuit blocks for these processings are shown in a time series manner.

In this embodiment, the perspective transformation processing taking the longest time in the image processing is carried out in parallel with the coordinate transformation processing and the clipping processing. If, however, one point is noted as to the processing order, the parallel processings cannot be effected. Hence, the clipping processing is delayed in the following manner.

The central processing unit CPU and the multiplier unit MULT perform the coordinate transformation processing in response to a multiply and accumulate operation command (as will also be shortly called the "MAC command"). This multiply and accumulate command is fetched and decoded by the central processing unit CPU and is transmitted to the multiplier unit MULT. This multiplier unit MULT executes the multiplying operation and has its register (i.e., MAC register) adds and latches the data which is multiplied by the former data. As a result, the multiply and accumulate arithmetic operations of the aforementioned determinant for the coordinate transformations. While an n-th point is subjected to the coordinate transformation by the central processing unit CPU and the multiplier unit MULT, the divider unit DIVU performs the perspective transformation processing of the coordinate (n−1) processed just before, in parallel.

The central processing unit CPU accesses the divider unit DIVU, when the n-th coordinate transformation processing ends, to fetch the result and instructs the perspective transformation processing of the n-th coordinate having been transformed. As a result, the divider unit DIVU fetches the aforementioned n-th coordinate data and starts its dividing operation. In parallel with the perspective transformation processing of the n-th point by the divider unit DIVU, the central processing unit CPU clips the (n−1)th point having ended the perspective transformation processing. Since this clipping processing compares the magnitudes of the data, as described before, it is carried out by the comparing function which is owned by the central processing unit CPU.

When this (n−1)th point is clipped, the central processing unit CPU and the multiplier unit MULT subject the (n+1)th point to the coordinate transformation processing. From now on, similar operations are repeated to perform the perspective transformation processing by the divider unit DIVU in parallel with the coordinate transformation processing by the central processing unit CPU and the multiplier unit MULT and the clipping processing by the central processing unit CPU, so that the perspective transformation processing taking the longest time can be equivalently eliminated. The divider unit DIVU disposed in the single-chip microcomputer of this embodiment takes about 38 cycles for one division. In the aforementioned coordinate transformations, on the contrary, each of the points x, y and z is subjected to four multiplications and accumulations, which are operated in the pipeline manner. On the other hand, the clipping processing performs the eight magnitude comparisons and takes a time as long as that of the aforementioned divisions.

This embodiment performs the multiply and accumulate operations by the fixed point. In case the fixed point method is thus adopted, the precision is not warranted, but the normalization necessary for the floating point method can be omitted to accelerate the aforementioned multiplying and dividing speeds. This precision can be ensured by software. In short, it is no exaggeration to say that no dividing operation in the microcomputer other than the perspective transformation processing in the three-dimensional image processing is necessary. In the single-chip microcomputer of this embodiment, therefore, the system is so constructed as to imagine the three-dimensional image processing which is most frequently used.

Since this embodiment adopts the method in which the single-chip microcomputer is operated at the aforementioned value 28.7 MHz and in which the three-dimensional image processing is executed by carrying out the perspective transformation processing in parallel with the coordinate transformation and the clipping processing, the number of polygons to be drawn for $\frac{1}{60}$ secs. can be drastically increased to about 2,400. This numerical value implies the ability of drawing motion pictures close to the real ones on the panel.

The aforementioned numeral value (i.e., about 2,400) implies the case having no clipping processing. In the three-dimensional arithmetic processing method of this embodiment, the perspective transformation processing takes a far longer time than the coordinate transformation processing even if the clipping processing is included. As a result, most of the clipping processing can be assigned to the differential time period so that the processing ability is just slightly lowered as compared with the case of no clipping processing. In the prior art in which the coordinate transformation, the perspective transformation processing and the clipping processing are executed in the recited order, on the contrary, the number of polygons to be processed is reduced without fail for the time period required for the clipping processing. As a result, the difference in the processing ability between the three-dimensional image processing method according to the present invention and the three-dimensional image processing method using the microcomputer of the prior art is the more increased, if compared while incorporating the clipping processing.

In the three-dimensional image processing method according to the present invention, in the aforementioned single-chip microcomputer shown in FIG. 1, the divider unit may be connected with the first internal bus shared with the multiplier unit. Moreover, the bus construction should not be limited to the aforementioned one, in which the bus is divided, but may be constructed of one bus. Alternatively, the divider unit may be provided as an external LSI. In these ways, the microcomputer system to be used for the aforementioned three-dimensional image processing can take a variety of modes of embodiment. Moreover, the multiplier unit and the divider unit may be of the floating point type.

When the single-chip microcomputer according to the present invention is used in a home game machine, it is estimated that the program capacity will increase, according to the development of the graphic processing, to as high as several megabytes. This capacity cannot be satisfied by the packaged ROM/RAM or the packaged cache memory, even if the program is limited to instructions or data of high access frequencies. As a result, the speeds of external memories and interfaces will exert high influences upon the performance.

In the single-chip microcomputer according to the present invention, therefore, the synchronous DRAM and the 4-way set associative type cache are combined, as described above, to shorten the average access time. Moreover, the packaged cache memory can function as a RAM, as described hereinbefore.

The present invention will be described in more detail in the following.

The 4-way set associative means the cache mapping system in which four entries to be latched in the cache memory are present for a certain address. In a direct mapping, an entry to be latched for an address is uniquely determined. In a full-associative, all the entries can be latched. In the set associative, there are entries to be latched in the same number of ways. In the recited order of the direct mapping, the set associative, and the full-associative, the probability that the entry having a high probability of being accessed in the near future is expelled out of the cache is lowered by replacing the cache memory. Although the address array of the full-associative cache has to be exemplified by an associative memory, the direct mapping and set associative address arrays can be realized by combining an ordinary memory and a comparator.

The home game machine or the portable data communication device has a lower price than that of a personal computer or a workstation. Therefore, the single-chip microcomputer used in the home game machine or the like is required to have not only a cheaper chip but also a cheaper peripheral circuit to be attached. In order to reduce the cost and shorten the average access time (for the CPU to acquire its desired data), the cache memory is packaged, as described hereinbefore.

When the central processing unit CPU has its clock frequency set to the aforementioned value 28.7 MHz, the time period required for one cycle is 35 ns. In the high-speed page mode of the DRAM having a RAS access time of 60 ns, a continuous accessing cannot be performed for each cycle. If the DRAM is made to have a construction of 2-way interleaves to be alternately accessed in the high-speed page mode, the cycle can be elongated to 70 ns. However, it is difficult to design the timing for the data buffer to avoid the conflict of data to be alternately read out of the two ways. If the delay in the data buffer is considered, on the other hand, it is really impossible to perform the continuous accesses for each cycle.

If, therefore, the single-chip microcomputer is equipped with an external data bus having a size of 64 bits, the data bus can be directly connected to the main memory of two-bank construction so that no data buffer is required. On the other hand, the pin number increases to raise the package cost. Moreover, the chip area may be increased by the limit to the gap between the bonding pads. For this reason, it is troublesome to shorten the average access time by using the DRAM of the high-speed page mode. If the SRAM is used, the continuous accesses for each cycle can be accomplished but fail to match the cost. In order to shorten the average access time at a low cost, it is most appropriate to adopt the internal cache memory, as in the foregoing embodiment.

The validity of the internal cache memory is examined by the simulations on the cache miss ratio and the average access time. In order to minimize the drive of buses to reduce the power dissipation, the single-chip microcomputer according to the present invention does not adopt the structure, in which the access to the internal cache memory and the access to the main memory are started in parallel, but starts the access to the main memory after a cache miss has been found out. Since the accesses to both the internal cache memory and the main memory are not simultaneously started, the time of the cache retrieval becomes the overhead at a cache miss time. This overhead leads to an elongation of the average access time of the aforementioned central processing unit CPU. With a high cache miss ratio, the average access time of the central processing unit CPU may be increased more by the influence of the overhead than that of the case having no cache memory.

Figure 26:
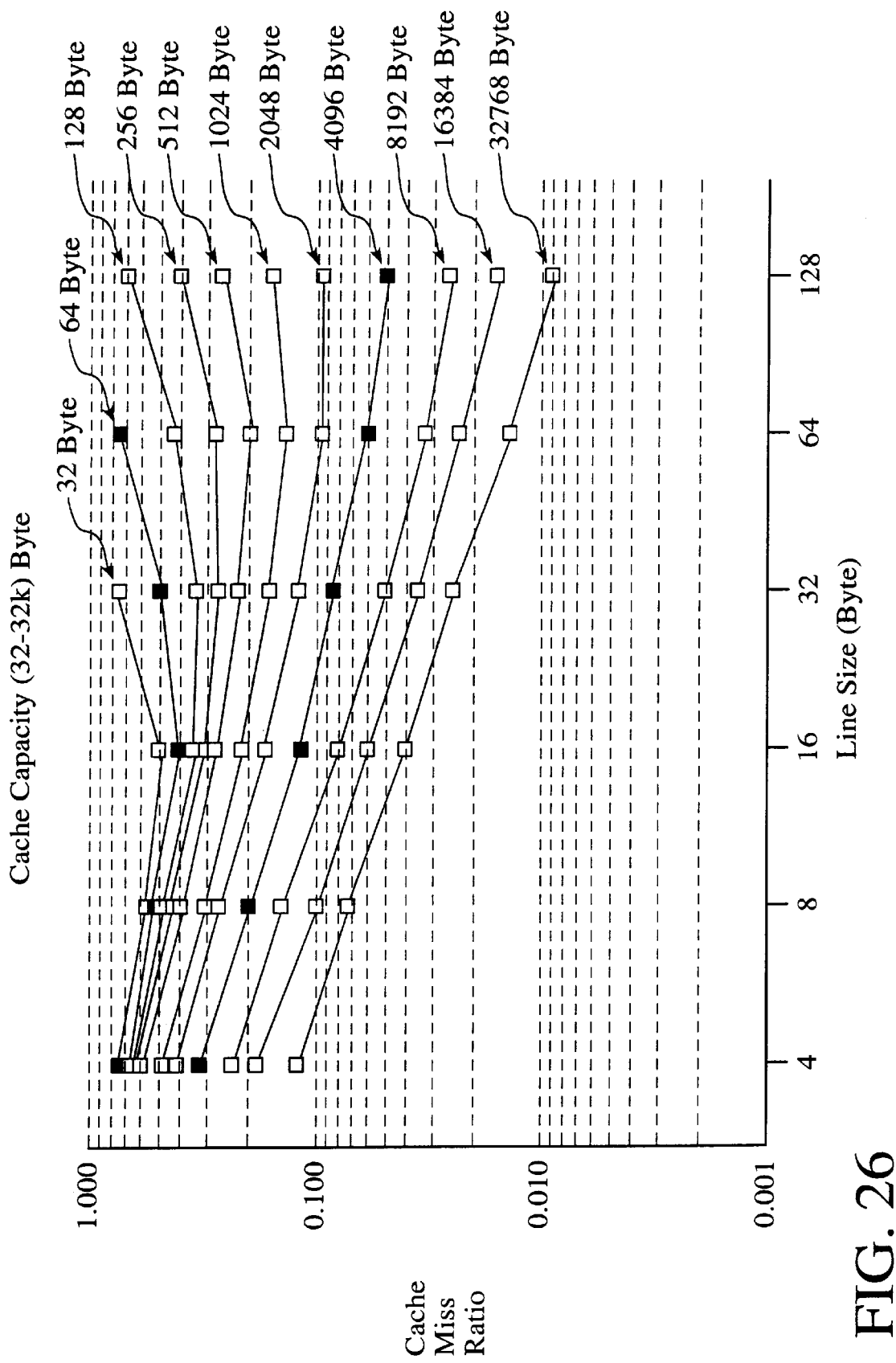
FIG. 26 is a characteristic diagram for explaining one example of the relations between a cache miss ratio of an instruction/data mixed type cache and a line size.
Figure 27:
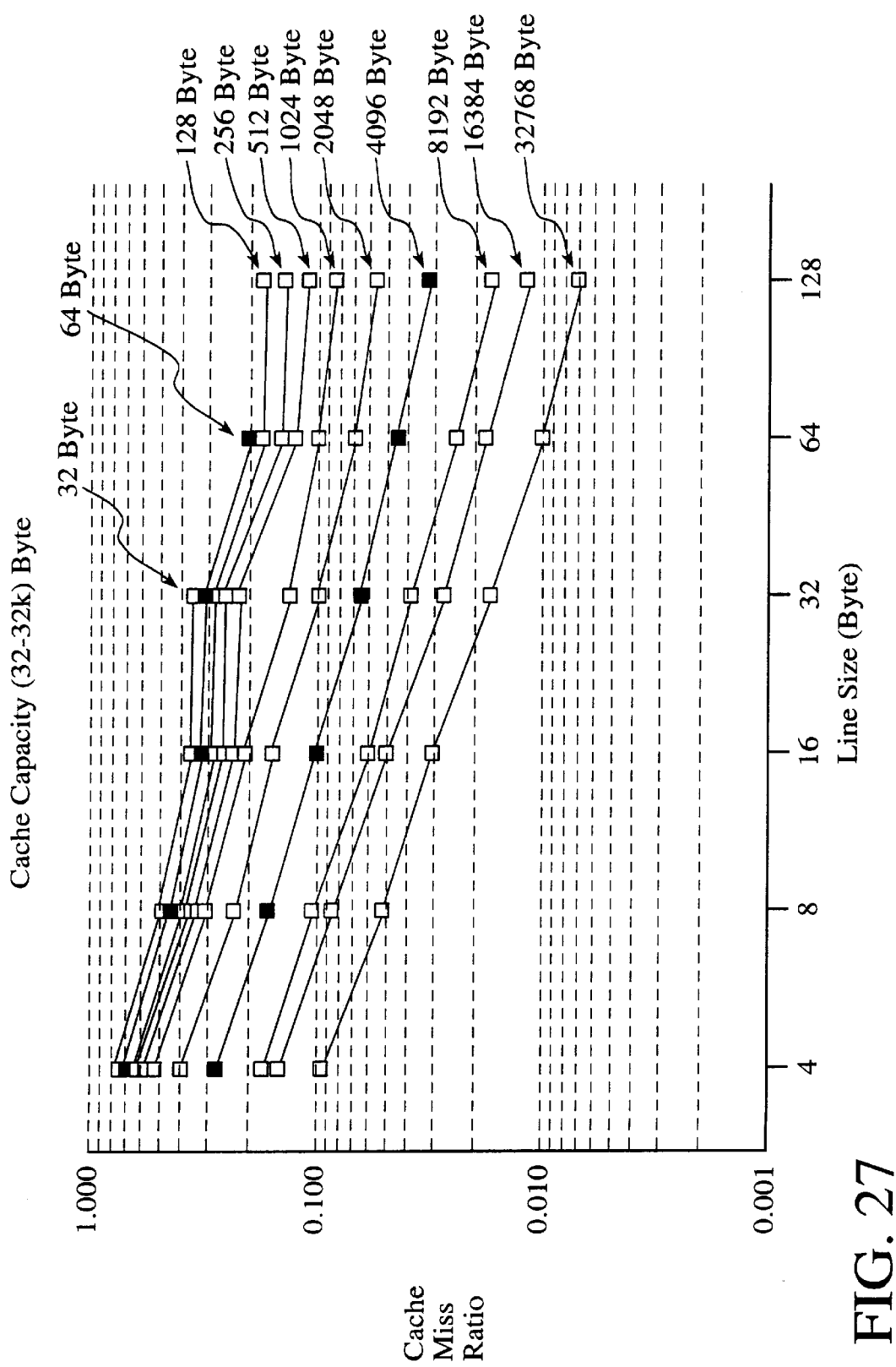
FIG. 27 is a characteristic diagram for explaining another example of the relations between a cache miss ratio of an instruction/data mixed type cache and a line size.
Figure 28:
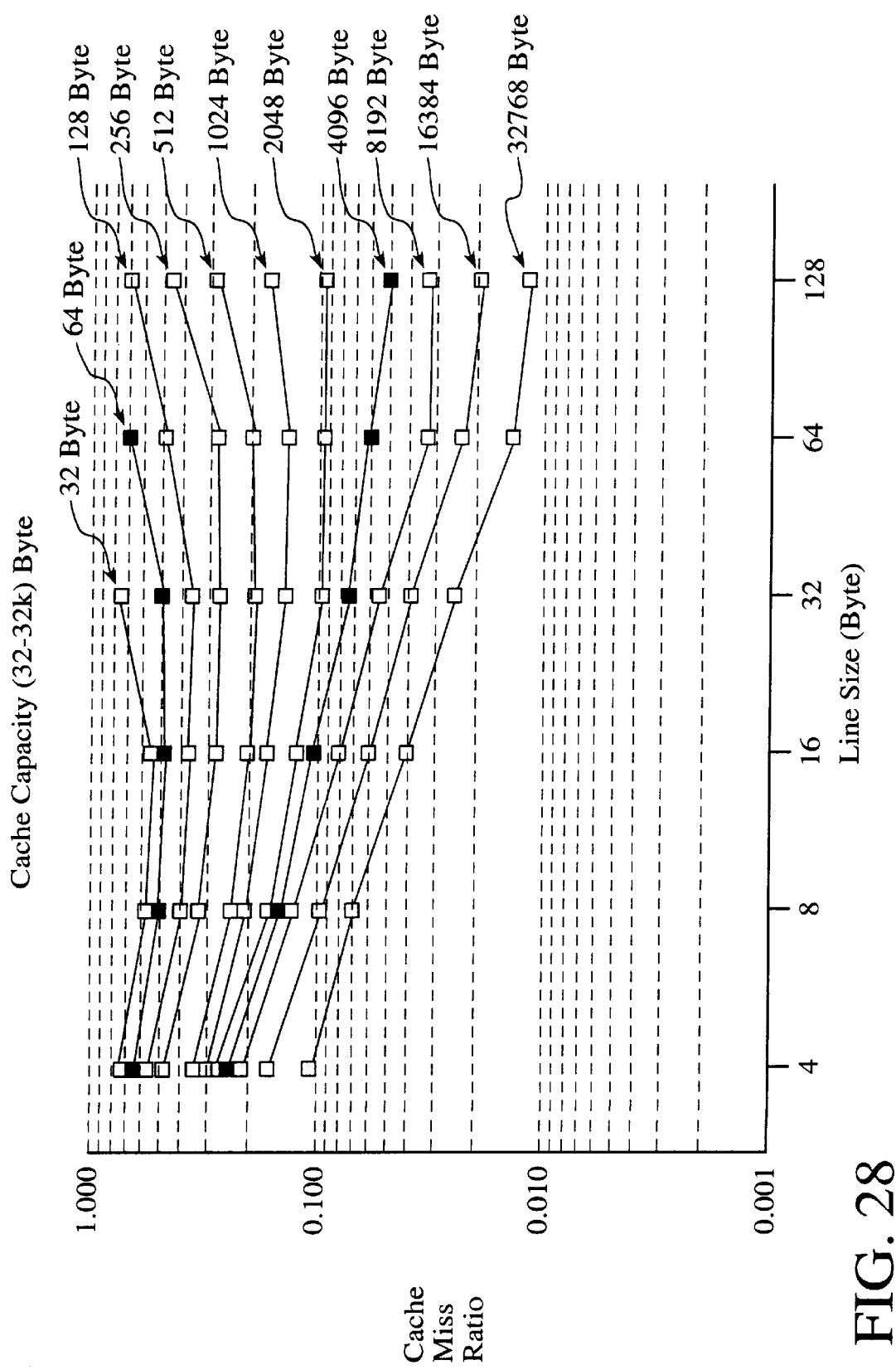
FIG. 28 is a characteristic diagram for explaining still another example of the relations between a cache miss ratio of an instruction/data mixed type cache and a line size.

Because of absence of the trace data of game programs, the data relating to the miss ratio refers to the values of the following Reference: Smith A. J., "Line (Block) Size Choice for CPU Cache Memories", IEEE Trans. on Computers, Vol.36, No. 9, September 1987, pp. 1063–1075. FIGS. 26 to 28 are characteristic diagrams plotting the relations of the cache miss ratios of an instruction/data unified cache memory to the line size of the cache memory in case the memory capacity of the cache memory is changed. In FIGS. 26 to 28, the memory capacity of the cache memory (i.e., the cache memory) is changed from 32 bytes to 32 Kbytes, and the line size of the cache memory is changed from 4 bytes to 128 bytes.

Here, the line size means the unit at which the data is stored in the cache memory, and is called the "block size", too. In order to write the in-line data partially, effective data have to be stored in all lines in case no valid bit is prepared at the unit of the byte, word or long word in the line. A replacement at a cache miss time has to be carried out at the unit of line. As a result, the time period required for the replacement is elongated if the line size is enlarged.

In the single-chip microcomputer according to the present invention, the access to an internal cache memory takes one cycle, and an access to an external memory takes two cycles (in case the line size of the cache memory has a 4 bytes), as has been described hereinbefore. When the cache miss ration exceeds 50%, the average access time exceeds two cycles so that it is rather elongated.

From the limit to the chip size, the chip occupation area to be assigned to the cache memory is set to that which can be formed with the cache memory having a memory capacity of about 4 Kbytes. If the memory capacity of the cache memory is at 4 Kbytes (i.e., 4,096 bytes), as shown in FIGS. 26 to 28, the cache miss ratio is 33% or less, even if the line size is as small as 4 bytes. Thus, it can be found that the cache memory exhibits its effect.

As in the single-chip microcomputer according to the present invention, the architecture of the RISC microcontroller having a fixed length instruction of 16 bits is estimated to have a smaller object code size than that of the RISC processor having a fixed length instruction of 32 bits. For a small code size, the number of bytes to be fetched is reduced, if instructions of the same number are to be executed, so that the cache miss ratio of the cache memory is lowered. This is because the number of instructions to be stored in the cache memories having the same capacity is more for the instructions having the fixed length of 16 bits than for the instructions having the fixed length of 32 bits.

Even if, however, the RISC architecture of 32 bits were changed to that of 16 bits, the code size would not be one half. This is because the maximum to be incorporated as the immediate data into the instructions is reduced. In order to set a large constant, it is necessary to use a plurality of instructions. Since the number of bits becomes short as an instruction code, one instruction may be two instructions so as to change a three-operand address into a two-operand address. Because of shortage of the register specifying bits, moreover, the number of registers has to be reduced from 32 to 16, and it is thought to add an instruction for saving and retrieving the registers. In other words, three operands cannot be specified, it is thought to add an instruction to copy the values of registers before the operation instruction.

In order to inspect this, therefore, the object code sizes produced for the single-chip microcomputer according to the present invention were examined. The Dhrystone benchmark had 968 bytes; the SPECint benchmark had 33,042 bytes; and the eqntott of the SPECint had 6,992 bytes. These values are 1,680 bytes, 51,440 bytes and 10,832 bytes, respectively, in the case of the ordinary RISC processor having a fixed length of 32 bits, so that they are larger by 55 to 74% than those of the aforementioned fixed length of 16 bits. In other words, the object code size of the instruction having the fixed length of 16 bits is smaller by 30 to 40% than that of the ordinary instruction having the fixed length of 32 bits.

According to the Reference: Bunda J. and Athas W., "16-Bits vs. 32-Bits Instructions for Pipelined Microprocessors", ISCA'20 Proceedings, May 16–19, 1993, pp. 237–246, if the DLX or the 32-bit RISC architecture is changed to a 16-bit one, the object code size is reduced to ⅔, and the number of instructions to be executed is increased by 15%, but the quantity of instructions to be transferred is decreased by 35%. It is also reported that the improvement in the performance by the 16-bit one is more effective in case a low-speed memory is connected. The construction of the cache memory to be packaged in the single-chip microcomputer according to the present invention adopts the instruction/data unified type 4-way set associative method. The line size is set to 16 bytes while considering the direct connection to the synchronous DRAM. The access path between the CPU and the cache memory is restricted to one, but there is not adopted the Harvard architecture using different access paths for the instruction and the data. With one access path, as in the foregoing embodiment, the instruction fetch and the data access cannot be processed at the common clock, but this problem can be avoided by arranging an instruction accompanied by a data access at a proper address.

Figure 29:
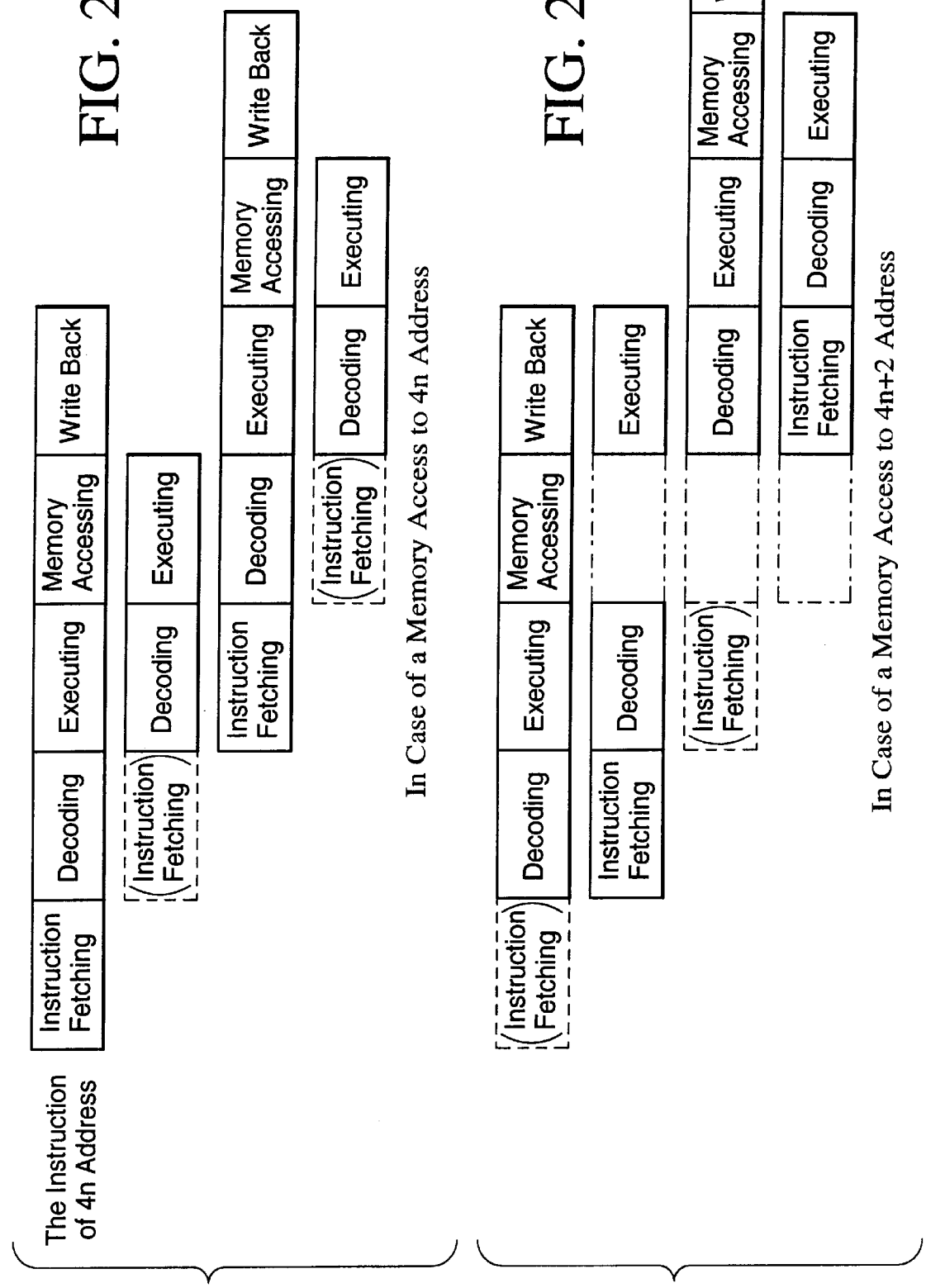
FIG. 29(A) is a diagram for explaining an access to a memory in case a memory accessing is located at a 4n-th address.
FIG. 29(B) is a diagram for explaining an access to a memory in case a memory accessing is located at a (4n+2)-th address.

Specifically, since the instruction has a fixed length of 16 bits, it can be fetched once for two instruction in case the memory is to be accessed at the unit of 32 bits. FIG. 29(A) is an explanatory diagram for explaining an access to a memory in case a memory access instruction is at a 4n-th address. FIG. 29(B) is an explanatory diagram for explaining an access to a memory in case a memory access instruction is at a (4n+2)th address. If an instruction accompanied by a load and store from an external program memory such as the ROM of FIG. 22 is placed at an even word boundary (e.g., at the 4n-th address), the instruction fetch and the data access will not conflict even with one access path, as shown in FIG. 29(A). By thus making one access path, the degree of freedom of the construction of the cache memory can be enhanced. In short, it is possible to realize any of the instruction/data unified type cache memory, the instruction/data separate type cache memory, and the cache memory exclusively for the instruction or the data.

Incidentally, FIGS. 29(A) and 29(B) show the pipeline stages of the single-chip microcomputer according to the present invention. The pipeline stages are constructed of five: the instruction fetching stage; the instruction decoding stage; the instruction executing stage; the memory accessing stage; and the write back stage. The instruction fetchings, as enclosed by broken lines, indicate the instruction fetching stages, which are not executed or need not be executed, and the portions, as enclosed by single-dotted lines, indicate the stall (or vacancy) of the pipelines so that the instructions cannot be processed.

In FIG. 29(A), the address for latching an instruction is set to such a proper value as to avoid a conflict with the memory accessing. The instruction fetching is carried out at the unit of 32 bits. If the instruction accompanied by a memory accessing is placed at the 4n-th address, the memory accessing does not overlap the instruction fetch of a (4n+6)th address, as shown in FIG. 29(A). In case, on the other hand, the instruction is placed at the (4n+2)th address, the memory accessing will overlap the instruction fetch of the (4n+6)th address, as shown in FIG. 29(B), so that the pipe line stalls. The execution of the instructions at and after the (4n+6)th address is delayed by one cycle.

The comparisons between the instruction/data unified type cache memory and the instruction/data separate type cache memory are as follows. This is because the cache memory for only the instruction and the cache memory for only the data can be realized by changing the replacing logic of the instruction/data unified cache.

The cache miss ratio of the instruction/data unified cache memory having a capacity of 4 Kbytes is 12%, as shown in FIG. 26, when the line size is at 16 bytes. In the case of the separate type in which caches of 2 Kbytes are individually prepared for the instruction and the data, the cache miss ratio of the instruction is 15%, and the cache miss ratio of the data is 12%, as shown in FIGS. 27 and 28. Moreover, the instruction fetching is more frequent than the data accessing so that it exerts high influences upon the CPI (i.e., Cycles Per Instruction). The cache miss ratio of the instruction is desired to be minimized. Thus, the instruction/data unified cache memory is adopted as the cache memory.

The four-way set associative is determined while considering the cache miss ratio, the power dissipation, and the tradeoff of the chip area. In the direct mapping method, a thrashing occurs frequently depending upon the program, if the cache capacity is small, and the cache misses may probably continue. In the thrashing, the cache misses continuously occur to increase the data transfer between the main memory and the cache memory. The thrashing could be avoided by adjusting the address for latching the instruction and the data, but a tuning at an assembler level would be required. This is not suited for the present trend in which the developing method of writing individual programs in the C language and linking the programs becomes the main stream. On the other hand, the full-associative cache memory has problems in the increased chip area and in the high power dissipation.

Thus, the set associative method was examined, and the result is as follows. In case the cache has a capacity of 4 Kbytes, the cache miss ratio is drastically decreased if the way number is increased up to four ways. On the contrary, the difference between the four ways and the eight ways is as small as 0.2%. In order to further reduce the cache miss ratio, it was also examined to use the LRU in the line replacing-algorithm. For the eight ways, however, the LRU information of 28 bits has to be prepared for each entry. As much as 5% of the entire cache memory is occupied by the LRU information so that the occupation raises the cost. Incidentally, in the case of four ways, as in this embodiment, the LRU information can be reduced to 6 bits, so that the chip area to be occupied for the LRU information can be reduced to as small as 1% of the chip area of the entire cache memory.

The interface circuit with the synchronous DRAM is incorporated into the single-chip microcomputer according to the present invention, to shorten the time period for replacing the lines at the time of a cache miss. This line replacement for eight cycles in the existing DRAM takes six cycles in case the synchronous DRAM is used.

Figure 30:
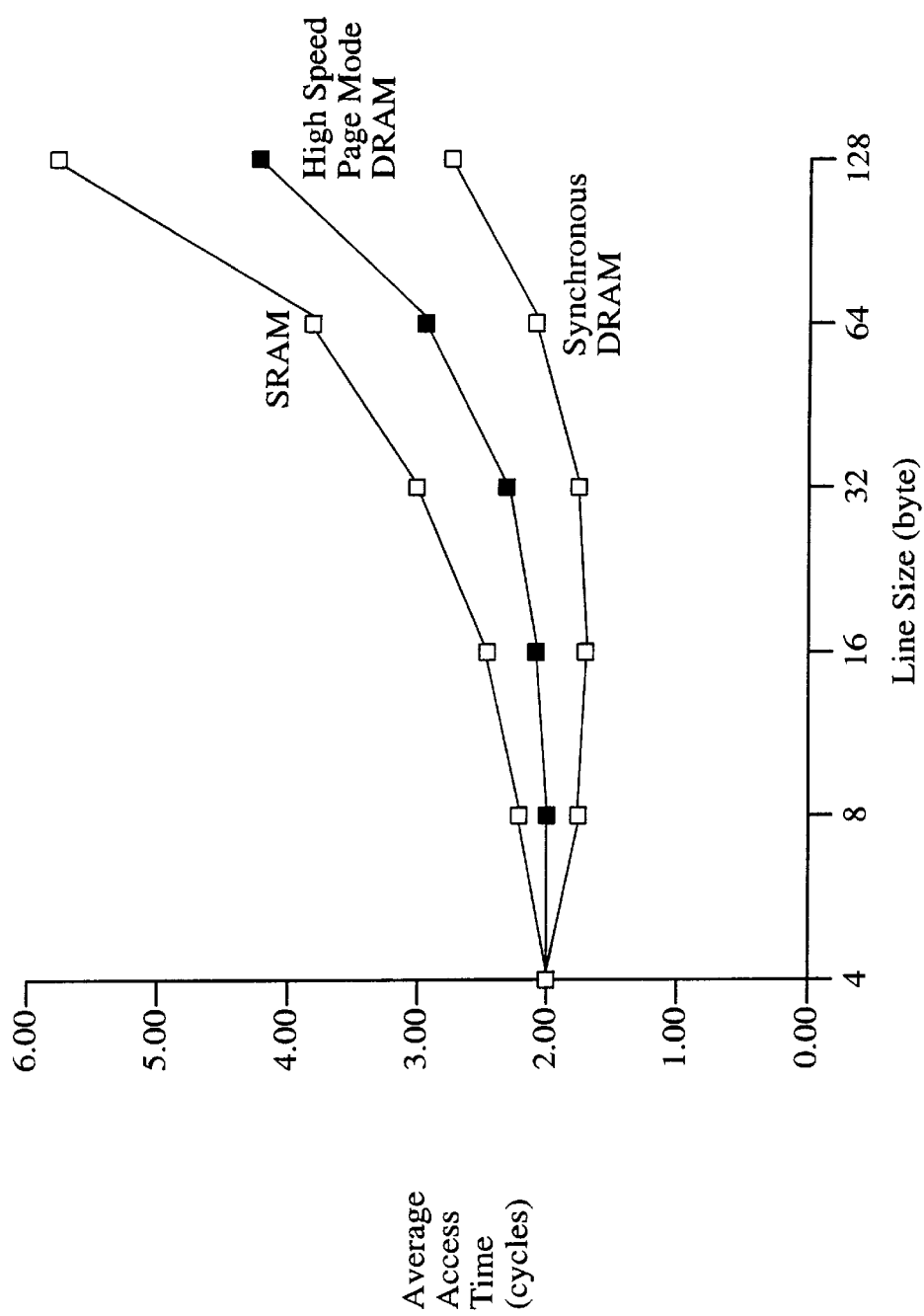
FIG. 30 is a characteristic diagram for explaining the relations between an average access time and the line size.

As shown in FIG. 30, an excessive line size will lead to an increase in the average access time of the CPU. If the line size is enlarged to some extent, the cache miss ratio of the cache memory is lowered to shorten the average access time. If the line size is excessively enlarged, the time period for the data transfer from an external memory is elongated to invite an increase in the average access time. In FIG. 30: the CPU has an operation frequency of 28.7 MHz; the SRAM has an access time of 60 ns; and the DRAM has an access time of 70 ns. In the example, as shown, the DRAM has a cycle time of 45 ns in the high-speed page mode, and the synchronous DRAM has a maximum operation frequency of 66 MHz.

If the cache memories have an equal capacity, their cache miss ratios are the lower for the larger line sizes of some extent. This is because the replacement is conducted at the line unit at the time of a cache miss so that a similar effect as in the pre-fetch of the cache memory can be expected. Therefore, the line size had better be increased till it is so enlarged that the entry number becomes short. Even if, however, the line size is enlarged to lower the cache miss ratio, it is not always directly connected to a shortening of the average access time. This is because the time period for replacing the lines once the cache miss occurs is the longer for the larger line size.

The single-chip microcomputer according to the present invention interrupts execution of an instruction till the replacement of lines is ended. This is because a complicated control is necessary for accessing a cache during the line replacement. In order to reduce the CPI, it is desirable to replace the lines for a time period as short as possible. For this, there is required a method having a high speed for transferring a considerable data (or block data) corresponding to the line size, and examinations were made upon the DRAM, the synchronous DRAM and the DRAM conforming to Rambus in the high-speed page mode.

Of these, the synchronous DRAM and the DRAM conforming to Rambus adopt the method, in which one line is wholly read out to a buffer in a chip and is then sequentially transferred in synchronism with a clock input. The second and later data can be transferred without being restricted by the internal action of the memory. The DRAM conforming to Rambus can transfer data in the highest cycle of 2 ns. However, the Rambus DRAM has a signal level different from that of the existing CMOS chip. The signal pins cannot be directly connected to the RAM or the peripheral I/O, as shown in FIG. 22. The signal level of the input/output interface of the single-chip microcomputer according to the present invention could be adapted to the DRAM conforming to Rambus, but a problem of losing the versatility occurs at present.

In the single-chip microcomputer according to the present invention, the cache memory is accessed at the unit of 32 bits. Even if the DRAM conforming to Rambus is operated by a higher clock than the operation frequency of the CPU to fetch the data, this data cannot be written directly in the cache memory. This makes a buffer necessary in the chip to raise the cost. The DRAM in the high-speed page mode cannot have its block transfer speed improved so much because the cycle time of the CAS signal for selecting a column address raises a bottleneck.

The synchronous DRAM has a data transfer speed of 16 ns/cycle at the maximum but its signal level at the same LVTTL as that of a memory having a supply voltage of +3.3 V. The signal pins other than that for the control signal can be directly connected with peripheral circuits. Since only the rising edge of the clock is used, the restriction on the clock is loose.

From the examinations thus far described, the interface with the synchronous DRAM is incorporated into the single-chip microcomputer according to the present invention. The synchronous DRAM can omit the cycle for the row address in the case of the bank active state corresponding to the RAS access of the high-speed page mode DRAM. A first access time can be shortened. Moreover, the inside is divided into two banks, each of which can be made active for each independent row address. In case an instruction is arranged at a low order address in the memory whereas a data is arranged at a high order address, a probability of shortening the access time can be enhanced even if the accesses of the instructions and the data are unified. This is the reason why the synchronous DRAM interface is adopted.

As a result that the use of the synchronous DRAM is considered, the line size of the cache memory takes 16 bytes, and the average access time is determined to 1.72 cycles from FIG. 30.

In order to simplify the control of the cache memory, the single-chip microcomputer according to the present invention adopts the write through method for writing the data. This is because it is said that the copy back method has a higher miss ration than the write through method.

In the write through method, however, an overhead occurs at the time of writing the main memory. This is because the existing synchronous DRAM has an equal block size at the read time and at the write time. Even in case data of one word (or 4 bytes) is to be written, a writing operation of one line (or 16 bytes) has to be done. This means that three useless cycles occurs at each write. The synchronous DRAM can forcibly start a next accessing midway of a block accessing, but the interface has a complicated circuit.

The aforementioned synchronous DRAM connected with the single-chip microcomputer according to the present invention, as shown in FIG. 8, is given the block-read/single-write function, by which the reading operation is carried out at the block unit whereas the writing operation can be carried out at the word unit.

The single-chip microcomputer according to the present invention is directed to applications of not only the home game machine but also the portable type data communication device. Since this device is premised by the battery drive because it is transported outdoors, it is necessary to minimize the electric power to be consumed by the micro-controller. It is also necessary to suppress heat liberation so that the micro-controller may be packaged in a plastic package at a low price.

Figure 31:
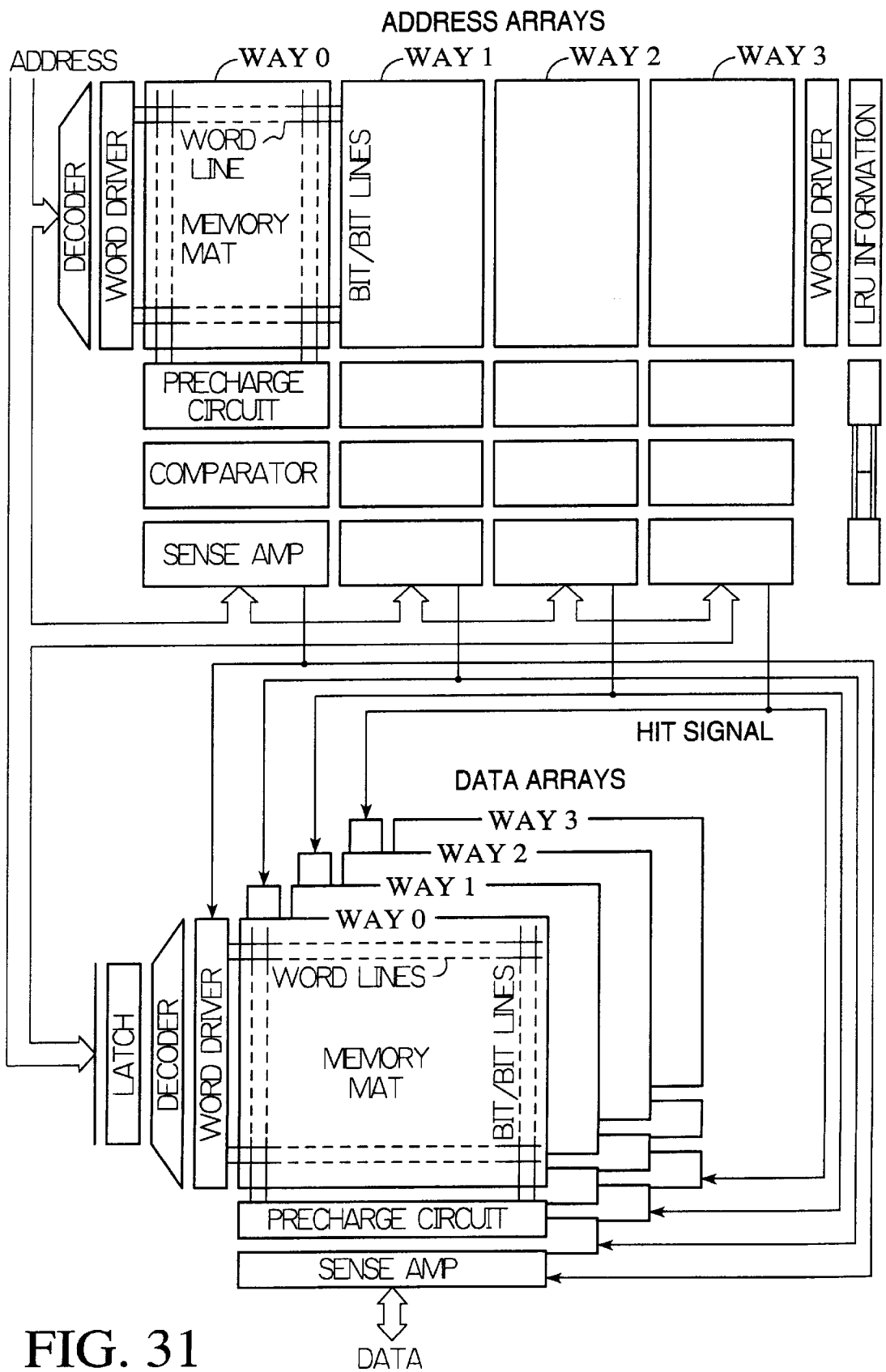
FIG. 31 is a block diagram showing one embodiment of the cache memory according to the present invention.

In order to reduce the power dissipation in the cache memory, as shown in FIGS. 18 and 31, there is provided a structure, the address array and the data array are operated with a displacement of one half cycle so that only the sense amplifier of the hit way of the data array of four ways is activated on the basis of the comparison result of the address array. FIG. 31 corresponds to FIG. 18.

Figure 32:
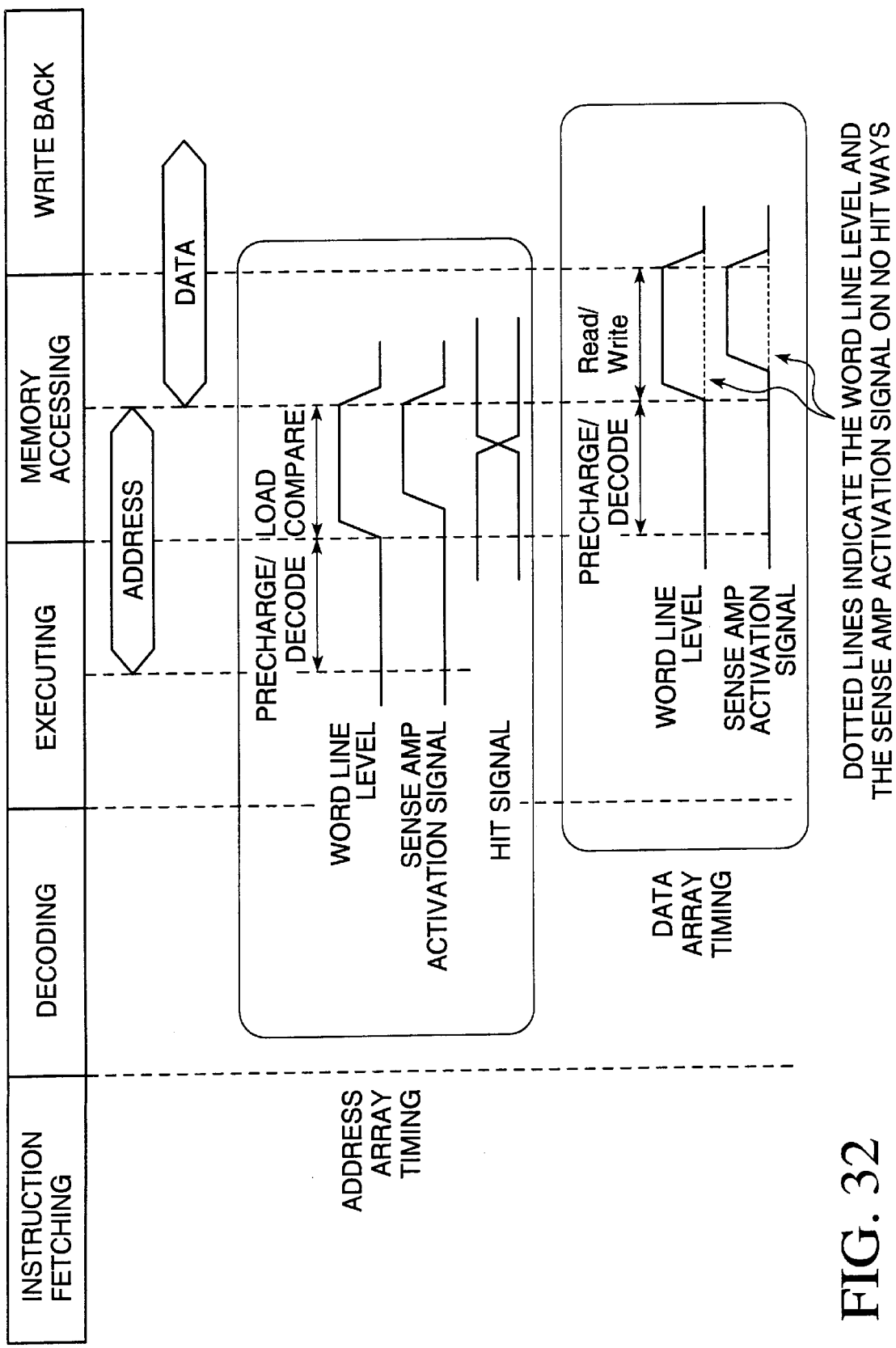
FIG. 32 is a diagram for explaining the operations of the cache memory of FIG. 31.

FIG. 32 is an operation timing chart of the cache memory according to the present invention. In order to reduce the power dissipation of the entire chip, the control of word lines is devised to reduce the consumption of current due to the charge/discharge of bit lines. The data lines are pre-charged for one half cycle. In the next half cycle, the data is read out. In short, the drive of the word lines according to the decoded result of the address, the read-out of the memory cells to the data lines (bit, /bit lines), and the drive of the sense amplifier are simultaneously carried out.

Even if the sense amplifier on no hit way is not activated, the charge/discharge of the data lines cannot be avoided if the word line on the way is raised. Therefore, only the word line on the hit way is raised. For this, the hit way has to be fixed before the timing for driving the word lines. It is known by the simulations that the hit way can be fixed before the word line drive. Thanks to this construction, it is possible to drastically reduce the consumption of the current consumed by the charge/discharge of the data lines.

As in the foregoing embodiment of FIG. 19, moreover, the current mirror differential type sense amplifier is replaced by a cross couple type sense amplifier to eliminate the through current of the sense amplifier. The cross couple type sense amplifier is difficult to time its drive. This is because a malfunction may occur unless the sense operation is started after the potential difference between the data lines grows significant. Therefore, the current mirror differential type is used in the prior art. In the present invention, the adoption of the cross couple type can be achieved by adjusting the timing generation circuit line finely.

In case the cache memory is included in MCU, it is a problem how to realize the trace function of an in-circuit emulator. The debugging by the tracing can be supported by accurately indicating the bus accesses before and after the instant when the problem arises.

If the cache memory is packaged, only a memory access having missed to the cache memory is outputted to the external bus so that the correct data cannot be obtained.

In order to make the tracing possible when the cache memory is accessed, therefore, the single-chip microcomputer according to the present invention is provided with a mode in which the address and data at the cache hit time are outputted for one cycle. In the using case in a single processor, the memory access is not executed at the time of a cache hit on the cache memory. Specifically, at the tracing time, the address and data are not outputted to leave the external bus empty. By making use of this, the trace data are outputted.

In case, on the other hand, the data is to be transferred at a high bus using ration by using the DMA controller, the multi-processor system may have a conflict between the output of the trace data and the DMA transfer or the memory access from another processor. In the worst case in which the DMA controller occupies the bus by the dual address transfer, the trace data is outputted by awaiting the interval between the read and the write, so that the CPU performance is identical to that of the case in which a memory slower by two times than the actually connected memory is connected in place of the cache.

In case a system using the microcontroller is to be developed, the support for the program debugging takes an important position. In the present programming, the programming language leaves the assembler language and comes close to the C-language and further to an object oriented language such as the C++ language in connection with a portion of applications while introducing the object-orientation. In this situation, the interruption of the program execution at the unit of statement and the referring function of symbolic variables are indispensable for improving the working efficiency of the programmer.

The microcontroller to be packaged in a device has its final dubugging executed on the ROM unlike the personal computer or workstation which is loaded with the OS or application programs on the RAM. The programs on the RAM can be easily interrupted in a precise manner by replacing the instruction of an address to be specified for the execution interruption by a break instruction. This interrupting method is identical even if the cache memory is packaged. The ROM cannot replace the instructions.

In order to support the accurate interruption of execution, the single-chip microcomputer according to the present invention is equipped, as shown in FIG. 1, with the user break controller UBC for detecting an instruction fetch address to cause a break interruption immediately before the instruction of a specified address. The user break controller UBC is additionally given a function to cause a break interruption in dependence upon the address of the data access and the value of the data. Thanks to this package in the chip, the break interruption can be correctly caused even in case the cache memory is hit so that no external access is accomplished.

The address bus and the data bus in the chip are wired in most of the modules. These buses have an electrostatic capacity is of an order of several pF. If individual thirty two address buses and data buses are driven to the opposite polarity for each cycle, the current to be consumed by the charge/discharge exceeds 60 mA, and the delay increases as the electrostatic capacity rises.

In the single-chip microcomputer according to the present invention, therefore, the internal bus is divided, as in the foregoing embodiment of FIG. 1, and the driving methods are devised in every buses to reduce the current to be charged/discharged. The internal bus in the chip is divided into three kinds, as shown in FIG. 1.

Figure 33:
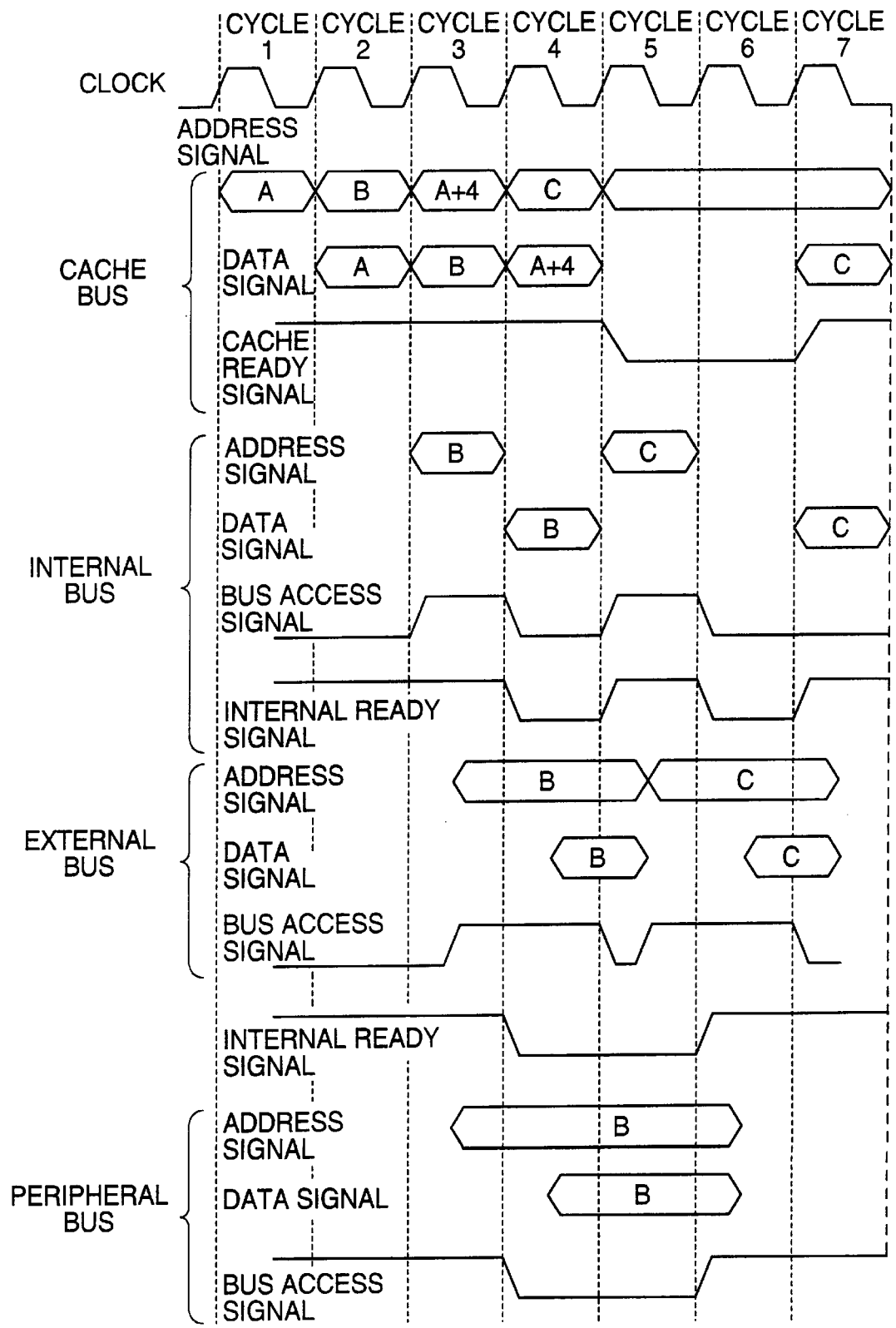
FIG. 33 is a timing chart for explaining the individual bus cycles in the single-chip microcomputer according to the present invention.

FIG. 33 is a timing chart for explaining the individual bus cycles in the single-chip microcomputer according to the present invention. The individual signals of the cache buses AB1 and DB1 (i.e., the aforementioned first internal bus of FIG. 1) and the internal buses AB2 and DB2 (i.e., the aforementioned second internal bus of FIG. 1) will change in synchronism with the high-level period of the clock, whereas the individual signals of the external buses AB4 and DB4 (i.e., the aforementioned fourth bus of FIG. 1) connected with the outside of the chip will change in synchronism with the low-level period of the clock.

In case the CPU accesses the data or instruction on the memory, it outputs an address signal to the cache address bus AB1 in synchronism with a clock signal (Clock) and raises the (not-shown) access signal for indicating execution of the address to the high level. In response to this, the cache memory retrieves internal cache memories. In the next cycle, the cache memory outputs the data read out of the cache data memory to the cache data bus DB1 in synchronism with the clock signal and raises the ready signal to the high level to inform the CPU of the end of the data access. This is indicated in FIG. 33 by the access at an address A and the access at an address (A+4).

In case no data is present in the cache memory, the CPU accesses the data outside of the cache through the internal bus (AB2, DB2). This address corresponds to that to the address C, as shown in FIG. 33. Specifically, the CPU outputs the address signal C to the cache address bus AB1 at cycle 4 to raise the not-shown access signal to the high level. Because no data is present in the cache memory, this cache memory lowers the ready signal to the low level at cycle 5 to inform the CPU of the fact that the data is not prepared, and raises the bus access signal of the internal bus (AB2, DB2) to the high level.

The external bus interface (as designated at OBIF in FIG. 1) decodes the value of the internal address bus (AB2) in response to the high level of the aforementioned access signal and decides whether it is an access to the inside or outside of the chip. Since the address signal C has an address outside of the chip, it is instantly superposed on the external address bus (AB4) to raise the external bus access signal to the high level.

Since the preparation for reading the data is not ended in the next cycle, the internal ready signal is set to the low level to inform the cache memory of the fact that the data is not prepared. The external bus interface OBIF outputs the read data to the internal data bus (AB2, DB2) at the cycle 6, in which the read is ended, and raises the internal ready signal to the high level to inform the cache memory of the read end. The cache memory writes the data of the internal bus (AB2, DB2) therein and outputs it to the cache data bus (DB1). At the same time, the cache memory raises the cache ready signal to the high level to inform the CPU of the read end. During the time period (i.e., the cycles 5 and 6) in which the cache ready signal is at the low level, the CPU interrupts updating of the address bus AB1.

Since the end of the external data write need not be awaited in the data writing operation, the cache memory outputs the address signal B to the internal address bus (AB2) through the aforementioned break controller UBC, as indicated by the access at the address B, to hold at the high level the cache ready signal, which is fed to the CPU when the bus access signal is to be raised to the high level. As a result, the CPU continues its execution without awaiting the write ends of the external buses AB4 and DB4.

In case the CPU is going to access the peripheral modules to be connected with the peripheral bus (e.g., the third internal bus of FIG. 1) such as the free running timer FRT, the serial communication interface SCI and the watch-dog timer WDT, the address signal B to be outputted from the cache address bus AB1 through the cache memory to the internal address bus AB2 acts as the address signal B for those peripheral modules. This address signal B is outputted through the bus state controller BSC to the peripheral address bus AB3. Simultaneously with this, the bus access signal is raised to the high level.

After the data output of the peripheral data bus DB3 from the peripheral modules or the write end of the data of the peripheral data bus DB3 in the peripheral modules, the external bus interface OBIF raises the internal bus ready signal to the high level to inform the end of the access. Simultaneously with this, in the data reading case, the read data on the peripheral data bus DB3 is outputted from the bus state controller BSC to the internal data bus DB2.

Figure 34:
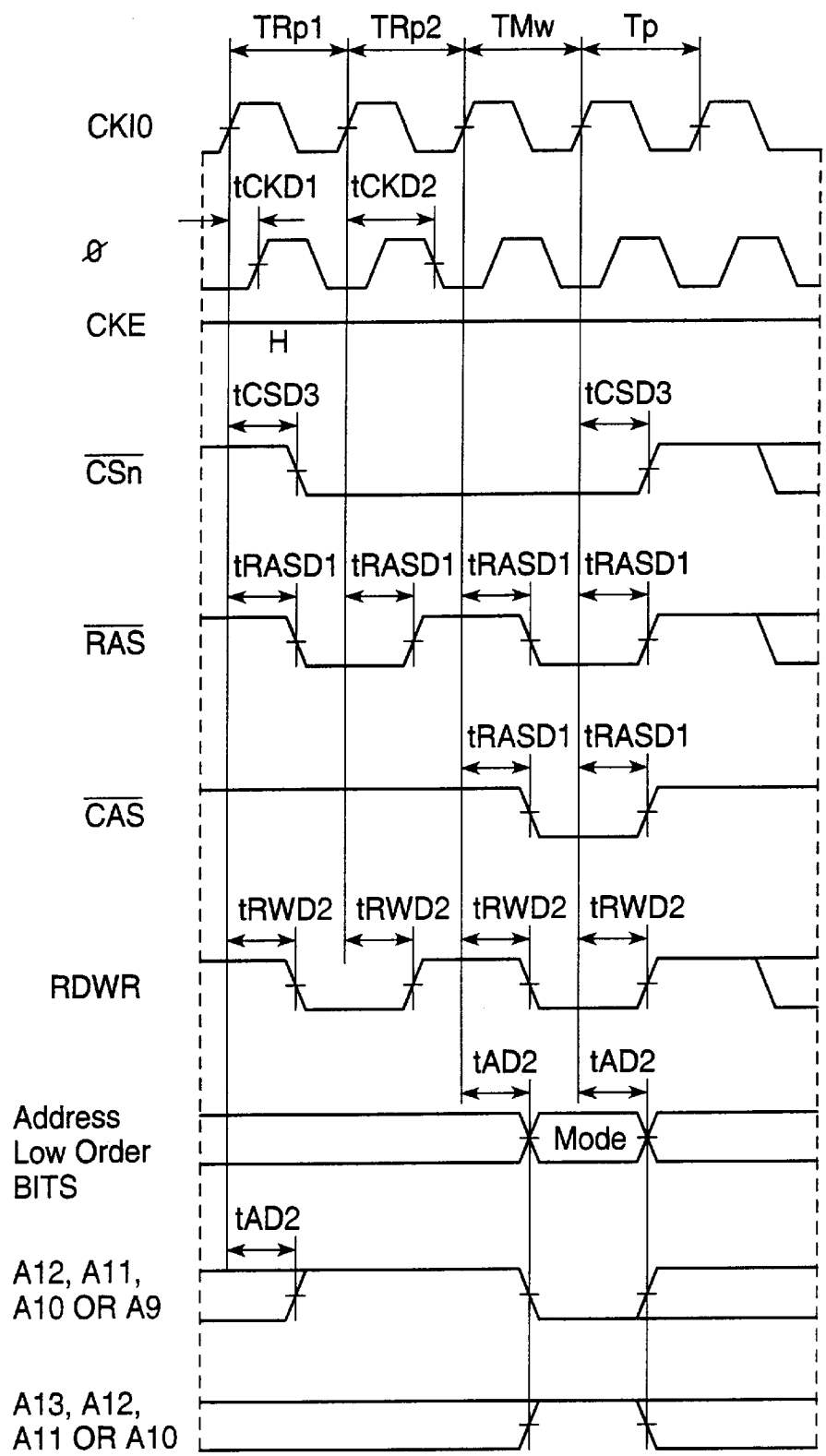
FIG. 34 is a timing chart for explaining a mode setting operation of the SDRAM.

FIG. 34 is a timing chart for explaining the mode writing operation of the synchronous DRAM. In the single-chip microcomputer according to the present invention, the mode setting for the synchronous DRAM is realized in the following manner, although not especially limitative thereto.

In the address space of the CPU, if addresses FFFF8000 to FFFFB000 of the addresses FFF8000 to FFFFFFFF assigned for the packaged peripheral modules are accessed (e.g., written or read), they are outputted as they are to the external buses AB4 and DB4. Simultaneously with this, the individual control signals /CS3, /RAS, /CAS and /WE connected with the synchronous DRAM are held at the low level for one clock cycle.

When the signals of those four control lines are at the low level, the synchronous DRAM fetches the value of the address bus AB4 in synchronism with the rising edge of the clock and writes it as it is in the internal mode setting register. As a result, a desired mode setting can be easily accomplished by accessing a suitable one of the aforementioned addresses FFFF8000 to FFFFB000. The control signal at the aforementioned timing is produced by the aforementioned memory control signal generator MCTG shown in FIG. 7. Specifically, this production can be realized by providing the area control unit or the like of the bus state controller BSC with a suitable address decoder and by establishing a sequence state for lowering the signals of the aforementioned four memory control lines to the low level under the aforementioned address decoding conditions.

Figure 35:
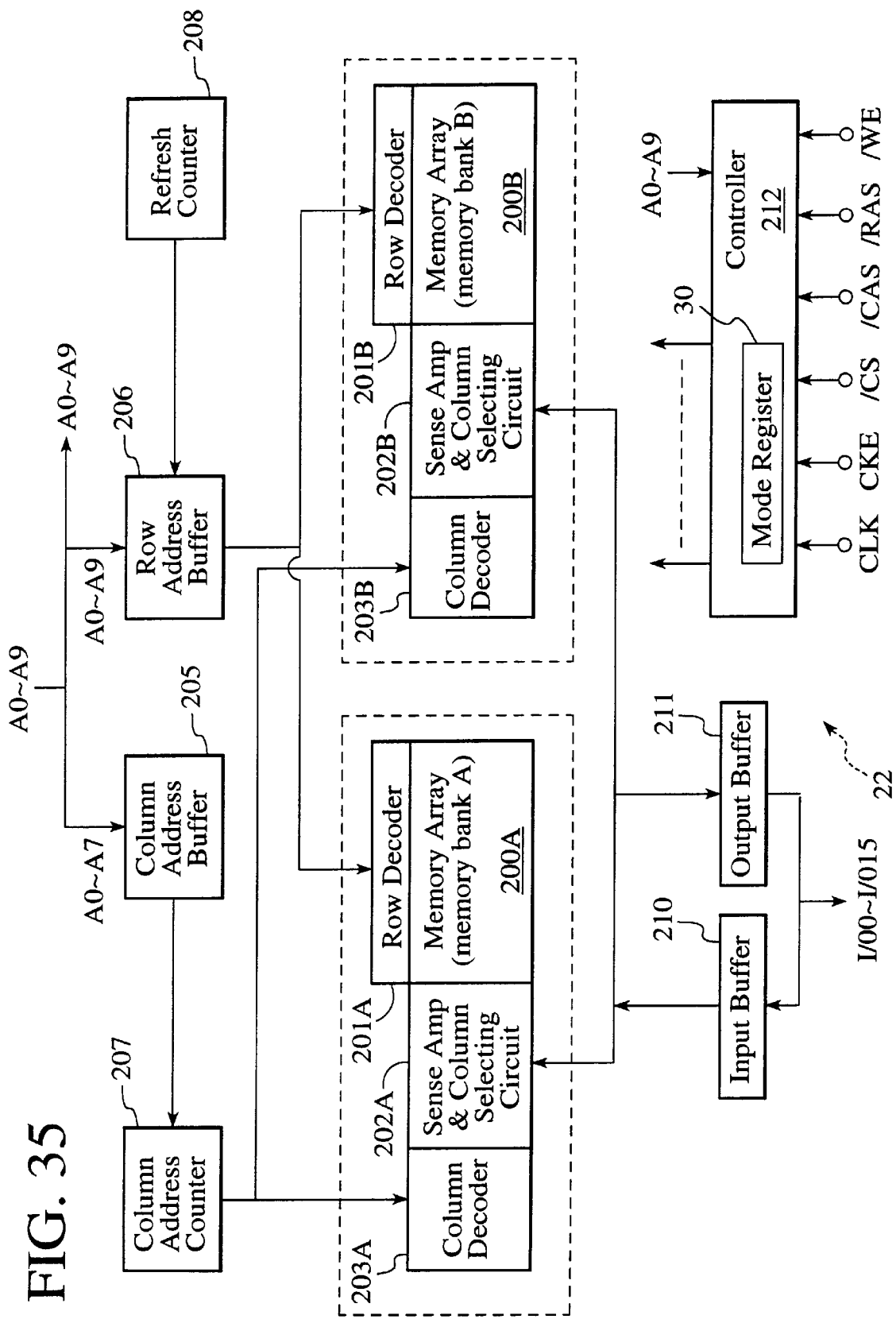
FIG. 35 is a block diagram showing one embodiment of the SDRAM.

FIG. 35 is a block diagram showing one embodiment of the aforementioned Synchronous DRAM (as will be shortly referred to as the "SDRAM"). The shown SDRAM is formed over one semiconductor substrate of single-crystalline silicon by the well-known semiconductor integrated circuit manufacturing technique, although not especially limitative thereto.

The SDRAM of this embodiment is equipped with a memory array 200A constituting a memory bank A (BANKA) and a memory array 200B constituting a memory bank (BANKB). These memory arrays 200A and 200B are individually composed of matrix-arranged dynamic type memory cells. As shown, the memory cells arranged in a common column have their select terminals coupled to the (not-shown) word line of each column, and the memory cells arranged in a common row have their data input/output terminals coupled to the (not-shown), complementary data line of each row. The memory array 200A has its one not-shown word line drive to the select level according to the decoded result of the row address signal by a row decoder 201A. The not-shown complementary data lines of the memory array 200A are coupled to a sense amplifier & column selecting circuit 202A. The sense amplifier in the sense amplifier & column selecting circuit 202A is an amplifier for detecting a minute potential difference, which appears on each complementary data line by reading the data from the memory cells, and amplifies the potential difference. The column selecting circuit (or column switch circuit) in the sense amplifier & column selecting circuit 202A is a switch circuit for selecting and connecting the complementary data lines individually with a complementary common data line 204. The column switch circuit is selectively operated according to the decoded result of the column address signal by a column decoder 203A. At the side of the memory array 200B, there are likewise provided a row decoder 201B, a sense amplifier & column selecting circuit 202B and a column decoder 203B. The aforementioned complementary common data lien 204 is connected with the output terminal of an input buffer 210 and the input terminal of an output buffer 211. The input terminal of the input buffer 210 and the output terminal of the output buffer 211 are connected with data input/output terminals I/00 to I/015 of 16 bits.

The row address signals and the column address signals, which are fed in the address multiplex manner from the address input terminals A0 to A9, are individually fetched by and latched in a column address buffer 205 and a row address buffer 206. In the refreshing mode, the row address buffer 206 fetches the refresh address signal, which is outputted from a refresh counter 208, as the row address signal. The output of the column address buffer 205 is fed as the preset data of a column address counter 207. In accordance with an operation mode specified by a later-described command, the column address counter 207 outputs the values, which are sequentially incremented from either the column address signal as the aforementioned preset data or the column address signal, to the column decoders 203A and 203B.

The controller 212 is fed with both external control signals such as the clock signal CLK, the clock enable signal CKE, the chip select signal /CS, the column address strobe signal /CAS (in which the symbol "/" indicates that the signal having it is a row enable signal), the row address strobe signal /RAS or the write enable signal /WE and the control data coming from the address input terminals A0 to A9, although not especially limitative thereto, to produce the internal timing signals for controlling the operation mode of the SDRAM and the operations of the aforementioned circuit blocks on the basis of the changes in and timings of the levels of those signals. Thus, the controller 212 is equipped with a (not-shown) control logic and a mode register 30.

The clock signal CLK is used as the master clock of the SDRAM, and the remaining external input signals are made significant in synchronism with the rising edge of the clock signal CLK. The chip select signal /CS instructs the start of the command input cycle with its low level. When the chip select signal /CS is at the high level (i.e., in the chip unselected state), the remaining inputs have no significance. However, the internal operations such as the later-described selected state of the memory bank or the burst operation are not influenced by the change to the chip unselected state. The individual signals /RAS, /CAS and /WE are given functions different from those of the corresponding signals in the ordinary DRAM and are made significant when the later-described command cycle is defined.

The clock enable signal CKE is a signal indicating the validity of a next clock signal. The rising edge of the next clock signal CLK is valid, if the signal CKE is at the high level, but invalid if the same is at the low level. In the read mode, although not shown, the controller 212 is fed with the external control signals for controlling the output enabling operations of the output buffer 211 so that the output buffer 211 is brought into the high output impedance state if the external control signal is at the high level, for example.

The aforementioned row address signal is defined by the levels of the terminals A0 to A8 in the later-described row address strobe and bank active command cycle synchronized with the rising edge of the clock signal CLK.

The input from the terminal A9 can be deemed as the bank selecting signal in the aforementioned row address strobe and bank active command cycle. Specifically, the memory bank BANKA is selected when the input of the terminal A9 is at the low level, and the memory bank BANKB is selected when the input of the terminal A9 is at the high level. The control of selecting the memory banks can be accomplished by the processings such as the activation of only the row decoder at the side of the selected memory bank, the unselection of all the column switch circuits at the side of the unselected memory bank, or the connection of only the side of the selected memory bank with the input buffer 210 and the output buffer 211, although not especially limitative thereto.

The input of the terminal A8 in the later-described pre-charge command cycle indicates the mode of the pre-charge operation of the complementary data lines. The high level of the input indicates that the object to be pre-charged is the two memory banks, and the low level of the same indicates that one memory bank indicated by the input A9 is an object to be pre-charged.

The aforementioned column address signal is defined by the levels of the terminals A0 to A7 in the read or write command (e.g., the later described column address and read command, or column address and write command) cycle synchronized with the rising edge of the clock signal CLK. Moreover, the column address thus defined is used as the start address of the burst access.

Here will be described the main operation modes of the SDRAM to be instructed by the commands.

(1) Mode Register Set Command (Mo):

This is a command for setting the aforementioned mode register 30 and is set by the low level of the signals /CS, /RAS, /CAS and /WE. The data to be set (i.e., the register set data) are fed through the terminals A0 to A9. The data to be set in the aforementioned register is one for specifying the burst length, the CAS latency and the write mode, although not especially limitative thereto. The burst length to be set (as is expressed in terms of the word number) is 1 word, 2 words, 4 words, 8 words and a full page (e.g., 256 words, as corresponds to the addresses of one line); the CAS latency to be set is 1 cycle, 2 cycles and 3 cycles; and the write mode to be set is a burst write mode and a single write mode.

The aforementioned CAS latency indicates what cycles of the clock signal CLK are to be consumed from the rise of the signal /CAS to the outputting operation of the output buffer 211 in the reading operation, as instructed by the later-described column address read command. An internal operation time is required for reading the data till the read data is fixed and is set according to the working frequency of the clock signal CLK. In other words, the CAS latency is set to a relatively high value, in case the clock signal CLK used has a high frequency, and to a relatively low value in case the clock signal CLK used has a low frequency.

(2) Row Address Strobe Bank Active Command (Ac):

This is a command for validating the specification of the row address strobe and the selection of the memory banks by the terminal A9 and is instructed by the low level of the signals /CS and /RAS and the high level of the signals /CAS and /WE. At this time, the addresses fed to the terminals A0 to A8 are fetched as the row address signals, and the signal fed to the terminal A9 is fetched as the memory bank selecting signal. The fetching operations are carried out in synchronism with the rising edge of the clock signal CLK, as described above. When this command is specified, for example, the word line in the memory bank specified by the command is selected so that the memory cells connected with the word line are connected with the respectively corresponding data lines.

(3) Column Address Read Command (Re):

This is a command necessary for starting the burst read operation and instructing the column address strobe and is specified by the low level of the signals /CS and /CAS and the high level of the signals /RAS and /WE. At this time, the column addresses fed to the terminals A0 to A7 are fetched as the column address signals. The column address signals thus fetched are fed as the burst start addresses to the column address counter 207. In the burst read operation instructed by the command, the memory banks and the word lines in the selected memory bank are selected before hand in the row address strobe and bank active command cycle so that the memory cells on the selected word line are sequentially selected and continuously read out in accordance with the address signal outputted from the column address counter 207 in synchronism with the clock signal CLK. The number of data to be continuously read out is specified by the aforementioned burst length. The data read from the output buffer 211 is started while awaiting the cycle number of the clock signal CLK specified by the aforementioned CAS latency.

(4) Column Address Write Command (Wr):

This is a command necessary for starting the burst writing operation, when the burst write mode is set as the mode of the writing operation in the mode register 30, and a command necessary for starting the single writing operation when the single write mode is set as the mode of the writing operation in the mode register 30. Moreover, this command specifies the column address strobe in the single write mode and in the burst write mode. This command is specified by the low level of the signals /CS, /CAS and /WE and the high level of the signal /RAS so that the addresses fed to the terminals A0 to A7 at this time are fetched as the column address signals. The column address signals thus fetched are fed as the burst start addresses in the burst write mode to the column address counter 207. The procedure of the burst writing operation thus instructed is accomplished like the burst reading operation. However, the writing operation has no CAS latency so that the fetching of the write data is started from the column address write command cycle.

(5) Pre-Charge Command (Pr):

This is a command for starting the pre-charging operation of the memory bank selected by the terminals A8 and A9 and is specified by the low level of the signals /CS, /RAS and /WE and the high level of the signal /CAS.

(6) Auto Refresh Command:

This is a command necessary for starting the auto refreshing and is specified by the low level of the signals /CS, /RAS and /CAS and the high level of the signals /WE and CKE.

(7) Burst Stop In Full Page Command:

This is a command necessary for interrupting the burst operation in the full page for all the memory banks and is ignored in the burst operations in other than the full page. This command is specified by the low level of the signals /CS and /WE and the high level of the signals /RAS and /CAS.

(8) No Operation Command (Nop):

This is a command for instructing that no substantial operation should be performed and is specified by the low level of the signal /CS and the high level of the signals /RAS, /CAS and /WE.

If, in the SDRAM, while the bursting operation is being performed in one memory bank, the other memory bank is specified to feed the row address strobe bank active command, the operation of the row address line in the other memory bank can be accomplished without influencing the operation of the one memory bank being performed. For example, the SDRAM is equipped with register means for latching therein the data, address and control signal fed from the outside, and the content latched in the register means, especially, the address and control signal are latched in each of the memory banks, although not especially limitative thereto. Alternatively, the data of one word line in the memory block selected by the row address strobe bank active command cycle is latched for the reading operation in the not-shown latch circuit in advance before the operation of the column line.

As a result, so long as the data do not conflict at the data input/output terminals I/00 to I/015, during the execution of the command the processing of which has not been ended yet, the internal operation can be started in advance in response to the pre-charge command row address strobe bank active command for the memory bank which is different from the memory bank to be processed by the command being executed.

The SDRAM 22 can cause a large-capacity memory similar to the DRAM to operate at a high speed equivalent to that of the SRAM because the data, address and control signal can be inputted and outputted in synchronism with the clock signal CLK. Moreover, the SDRAM is enabled to switch the selected states of the column lines sequentially by its packaged column address counter 207 to read or write a plurality of data continuously, by specifying how many data are to be accessed for one selected word line, with the burst length, as could be understood.

Figure 36:
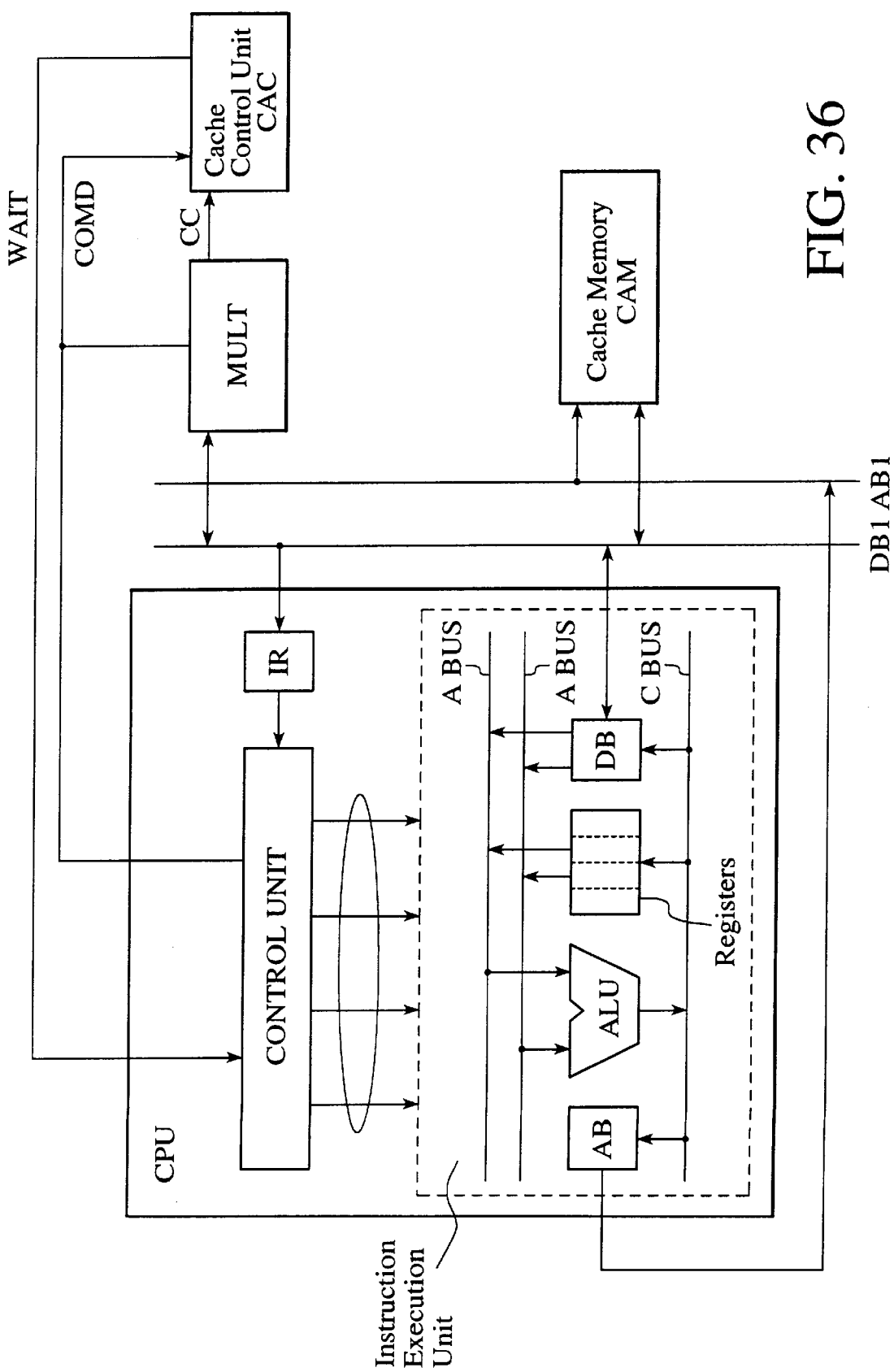
FIG. 36 is a block diagram for explaining multiply and accumulate arithmetic operations.

FIG. 36 is a block diagram for explaining one example of the multiply and accumulate arithmetic operations for the aforementioned three-dimensional image processings. These multiply and accumulate operations are carried out in the following manner by the CPU, the arithmetic unit (i.e., multiplier unit) MULT, the cache memory CAM (or TAG, CDM) and the cache control unit CAC.

In FIG. 36, the CPU is constructed of: an instruction register IR for temporarily latching the instruction code which is read out of the cache memory through the data bus (or cache bus) DBI; a control unit for producing a control signal for an instruction execution unit by decoding the instruction code read out; and the instruction execution unit for executing the arithmetic operations. In the instruction execution unit, an address buffer AB, an arithmetic logic unit ALU, internal registers, and a data input/output buffer DB are connected with internal buses A, B and C.

The CPU reads out the instruction code latched in the cache memory CAM through the data bus DBI and fetches it into the instruction register IR. The instruction code thus fetched is decoded by the control unit to output the control signal for the inside of the CPU. The instruction execution unit is controlled by that control signal to execute the desired operation.

In this embodiment, the multiplier unit MULT is connected through the data bus DB1, the command control line COMD and the wait control line WAIT with the CPU, and the cache memory control unit CAC is connected with the multiplier unit MULT by the internal status signal CC.

The multiplier unit MULT is fed with the command control signal from the control unit of the CPU so that its internal status is transmitted by the status signal CC to the cache memory control unit CAC. In case a next operation starting command is issued during the operation of the multiplier unit MULT by the status signal CC and the command control signal COMD, the wait signal WAIT for causing the bus cycle to wait is produced. This wait signal WAIT is inputted to the control unit of the CPU.

Figure 37:
FIG. 37 is a diagram for explaining the multiply and accumulate arithmetic operations for coordinate transformations of a three-dimensional image processing.

FIG. 37 is an explanatory diagram for explaining the multiply and accumulate instruction (i.e., MAC instruction). In FIG. 37, the multiply and accumulate operations corresponding to the determinant of Equation 1 are exemplified in the aforementioned three-dimensional image processings. In the aforementioned five pipeline stages of FIG. 37: letters IF or if designate an instruction fetching stage; letters ID a decode stage; letters EX an operation or execution stage; letters MA a memory access stage; letters WB a write-back stage; and letters mm the state in which the multiplier unit MULT is operating.

In order to clear the content of the multiply and accumulate register in the multiplier unit MULT, the instruction CLRMAC is executed. By this instruction, the content of the multiply and accumulate register of the multiplier unit is cleared. Subsequently, the first MAC (i.e., multiply and accumulate instruction) is executed. This multiply and accumulate instruction MAC is ended through the eight stages of if - ID - EX - MA - MA - mm - mm - mm. The second MA executes not only the memory reading operation but also the start of the operation of the multiplier unit MULT.

The stage ID of the instruction next to the MAC instruction is stalled after one slot. As a result, the stage ID of the second MAC instruction is stalled after one slot. In case the MAC instructions come in series, as in this embodiment, the second MAC of the instructions MAC has its bus cycle elongated, if it conflicts with the stage mm produced by the preceding multiply instruction (or the instruction MAC), till the stage mm ends (as indicated M . . . A in FIG. 37), so that the elongated stage MA makes one slot. In FIG. 37, the portions, as enclosed by broken lines, indicate that the aforementioned stages mm and MA conflict each other.

The control unit of the CPU fetches the instructions sequentially in the order of stages if - ID - EX - MA to produce addresses of the cache memories having data to be multiplied. The control unit then outputs the memory addresses to the address buffer AB1 through the address buffer AB and the data from the cache memory cAM to the data bus DB1. The data outputted onto the data bus DB1 and to be operated are fetched not by the CPU but by the multiplier unit MULT in response to the signal COMD coming from the CPU so that they are operated over three slots and stored in the multiply and accumulate registers.

After this, in response to the successive MAC instructions, the multiplier unit MULT performs the multiply and accumulate operations to execute totally four multiplications corresponding to the aforementioned determinant and to accumulate the multiplied result to the former one and latch the accumulated result. At last, in response to the instruction STS, the arithmetic result described is written back to make a coordinate transformation corresponding to one relative coordinate.

Figure 38:
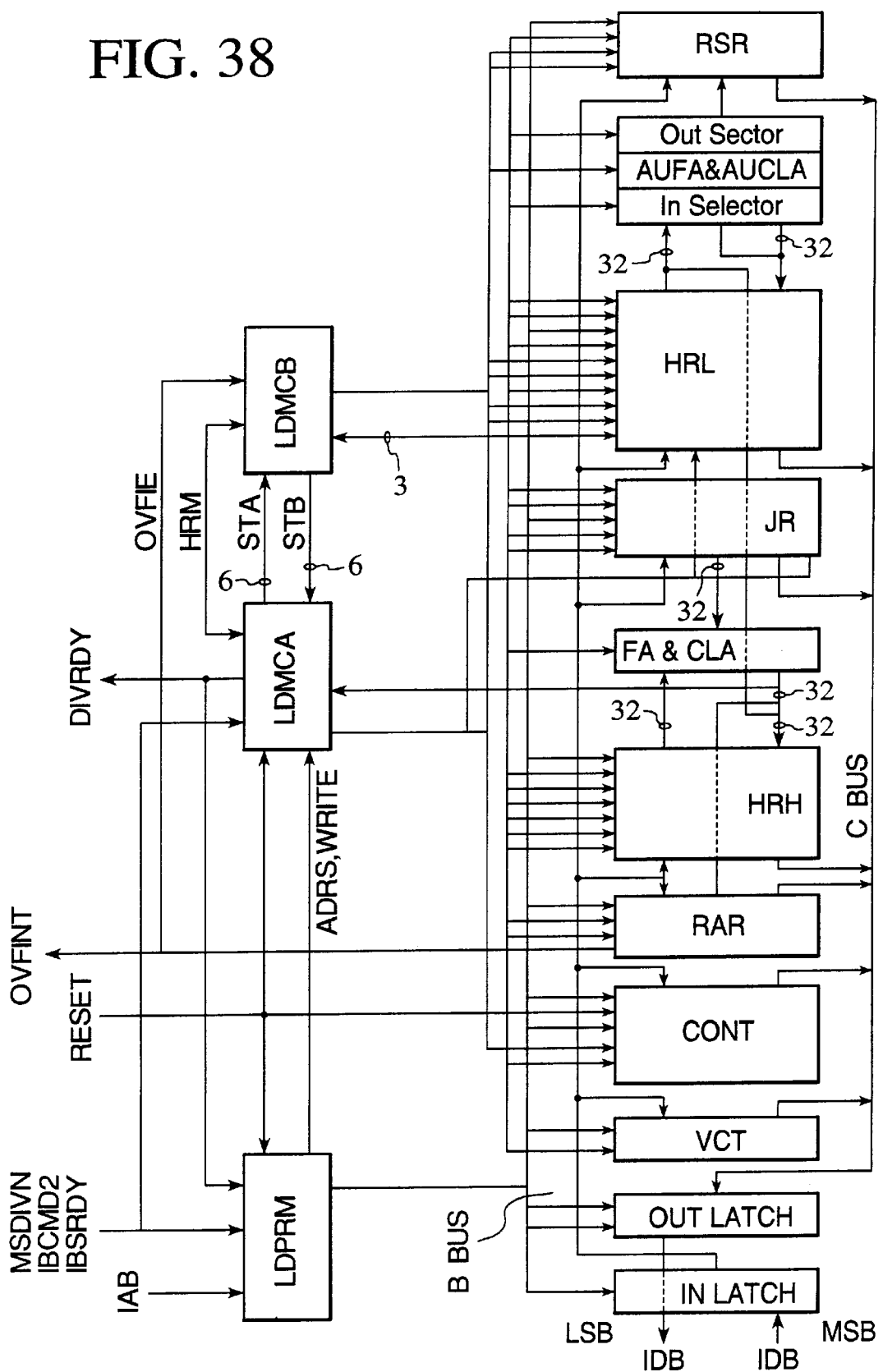
FIG. 38 is a block diagram showing one embodiment of the divider unit according to the present invention.

FIG. 38 is a block diagram showing one embodiment of the divider unit DIVU. In FIG. 38, letters JR designate a divisor register having a size of 32 bits for latching the divisor but given no special function. Letters HRL designate a dividend low order and quotient latching register for latching 32 bits of the low order of the dividend and 32 bits of the quotient at the end of the operation. Letters HRL designate a temporary register for storing an intermediate result. Letters HRH designate a register for latching 32 bits of the high order of the dividend. In the case of a division of 32 32, the MSB value of the register HRL is copied in all the bits of the register HRH so as to extend the code of the dividend. At the end of the operation, the remainder of the result is latched. The register HRL is also used as a temporary register for latching the intermediate result during the operation.

Letters CONT designate a control register of 32 bits, of which the 2nd to 31st bits cannot be written but only "0" can be read. The valid bits are the two low order bits 1 and 0. The bit 0 is a flag for the overflow OVF. If an overflow or underflow occurs, the bit 0 is set with a predetermined value. The bit 1 is a flag for deciding whether or not an interruption is to be inhibited, when the bit 0 is set with the predetermined value. The bits 1 and 0 are effected by writing the value "0" from the bus master. While the overflow interruption is inhibited (or OFF), the MAX value is set as the quotient, if the overflow occurs, but the MIN value is set if the underflow occurs. While the overflow interruption is ON, the operated result is set as it is as the quotient if the overflow or underflow occurs.

Letters VCT designate a register for latching an interrupt vector address. While the bit 1 of the control register CONT is at "1", this register VCT outputs the latched interrupt vector address if the overflow occurs. The initial value is at "0" for the high order of 16 bits and at an indefinite value for the low order of 16 bits.

Letters RAR designate a remainder long latch register of 32 bits for latching the remainder at the end of the operation. The difference of the register RAR from the register HRH is that the register RAR is not used as the temporary register for latching the intermediate result during the operation so that it can latch its value till the next operation ends or till it is written by the bus master.

Letters RSR designate a quotient long latch register of 32 bits for latching the quotient at the end of the operation. The difference of the register RSR from the register HLH is that the register RSR is not used as the temporary register for latching the intermediate result during the operation so that it can latch its value till the next operation ends or till it is written by the bus master.

Letters FA&CLA designate a full adder and carry look ahead for checking the adder or subtractor of 32 bits, and the presence or zero of carry. Letters AUFA&AUCLA designate a one adder for executing the one subtraction by inverting the value with the selectors disposed across the adder. Letters LDMCA designate a status control unit constructed of a logic circuit for controlling the write from the bus master to the aforementioned packaged resisters of the divider unit, the controlling the operation cycle during the operation of the divider unit, and checking the zero of the arithmetic result.

Letters LDMCB designate an overflow processing unit or a control logic unit for processing when an overflow occurs in the dividing operation. Letters LDPRM designate an I/O control unit or a control logic unit for effecting the interface between the divider unit DIVU and the peripheral modules.

Figure 39:
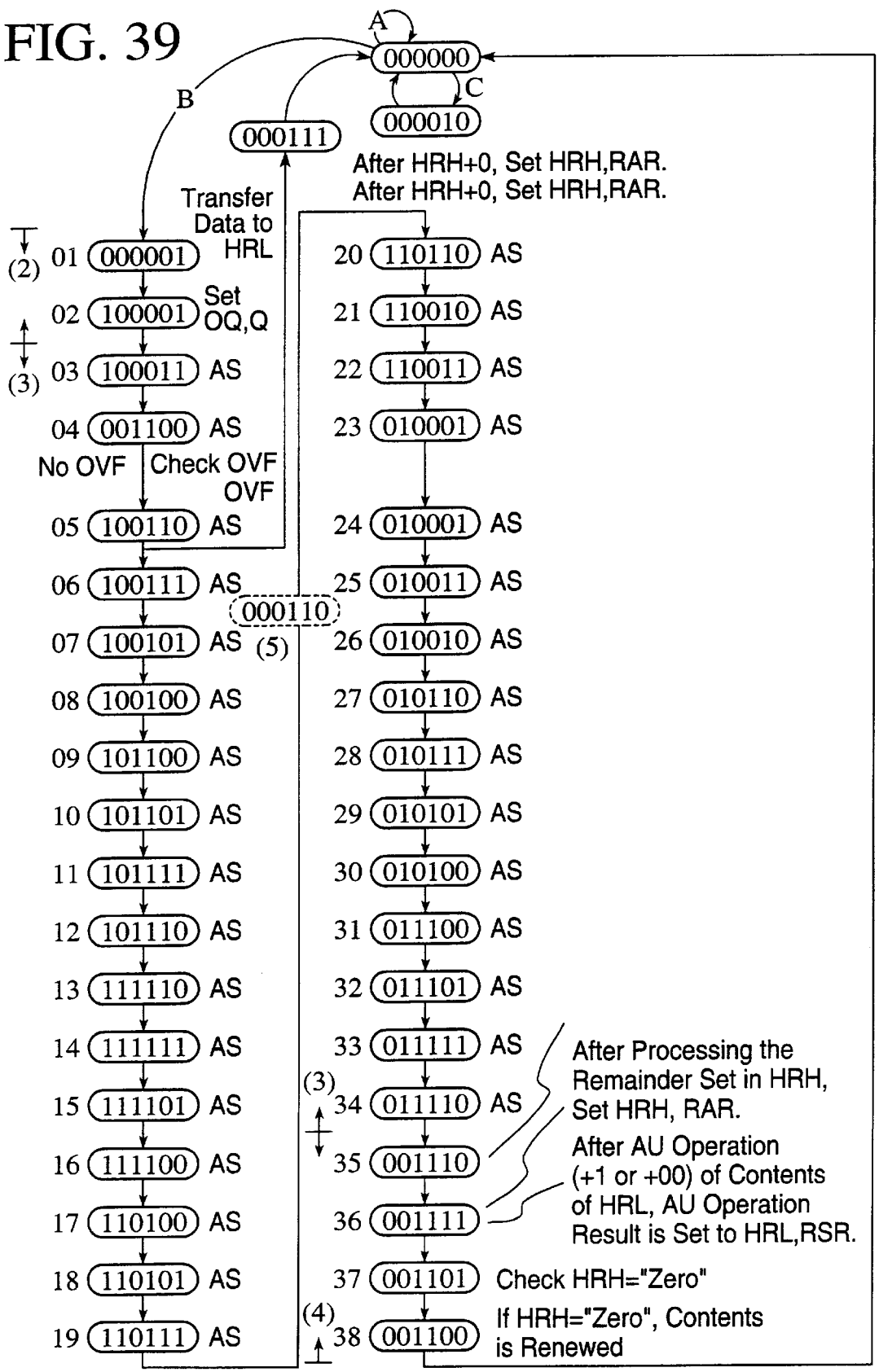
FIG. 39 is a state transition diagram for explaining the operations of the divider unit.

FIG. 39 is a state transitional diagram for explaining the operations of the aforementioned divider unit DIVU. The divider unit DIVU of this embodiment has a total status number of 42. The highest status "000000" of FIG. 39 is a ready status to be taken after reset. The ordinary dividing processing is executed by 38 cycles from the lefthand uppermost status "000001" to the righthand lowermost status "001100". The branching from the upper status "100110" of the center of the lefthand column is the processing at the time of occurrence of the overflow and is returned to the initial status by two cycles. In addition, the "000010" status under the ready status presents a save place at the time of continuous write/read requests.

The dividing processings by the aforementioned divider unit DIVU are coarsely divided into the following five, as will be individually described in the following.

(1) Ready Status ("000000" - "000010"):

The cycle "000000" expresses the ordinary ready status, and the cycle "000010" expresses the status to be taken only in case a register read instruction is issued in the access from the bus master to the divider unit DIVU immediately after a register write instruction. The construction of the divider unit DIVU of this embodiment cannot output a normal value if the register read instruction is issued from the bus master immediately after the register write instruction. As a result, in case the register read signal is issued from the bus master immediately after the register write instruction, the cycle "000010" is provided, unlike the ordinary ready status "000000", as the status for retaining the time period for preparing the ordinary read data by elongating the bus master reading bus cycle.

(2) Processing before Division ("000001" - "100001"):

This is a preparing period for the algorithm of a non-regression method. The sequence "000001" is a cycle for transferring the data written from the bus master to the HRL in the divider unit DIVU, and the sequence "100001" is used at the first cycle of the non-regression method to determine the "MSB (code) of the previous arithmetic result".

(3) Non-Regression Method ("100011" - "001110"):

The processing of the non-regression method is executed for 33 cycles. Of these, the 33th cycle ("001110") is slightly different from others. At this cycle, the HRH does not fetch the data because the remainder of the result is determined at the 32nd cycle.

(4) Processing after Division ("001110" - "001100"):

This is an after-processing cycle necessary in the non-regression method. At the cycle "001111", a predetermined processing is executed to add (or subtract) the remainder again, and an addition of 1 is executed in case the quotient is negative. In the two statuses "001111" and "1001101", the quotient and remainder are corrected in case the dividend is negative and divisible. The RAR and the RSR are set at the cycles "001110" and "001100".

(5) Overflow (OVF) Processing ("0001101 - 1000111"):

The status "000110" is indicated by broken lines, because the transition to the overflow status is accomplished by a circuit different from the circuit managing the ordinary status transition. This is also because the status is not apparently seen as one cycle (as is composed of half cycles "100110" and "000110"). At the cycle "000111", the RAR and RSR are set.

Thus, a time period as long as 38 cycles is taken for the divider unit to execute one division. Although the division thus takes a relatively long time period, thanks to the parallel arithmetic processings, as shown in FIG. 25, the substantially three-dimensional image processings can be executed at a drastically high speed by performing the perspective transformation processing by the aforementioned division, simultaneously in parallel with the coordinate coordination transformation by the multiply and accumulate operations and the clipping processing.

Figure 40:
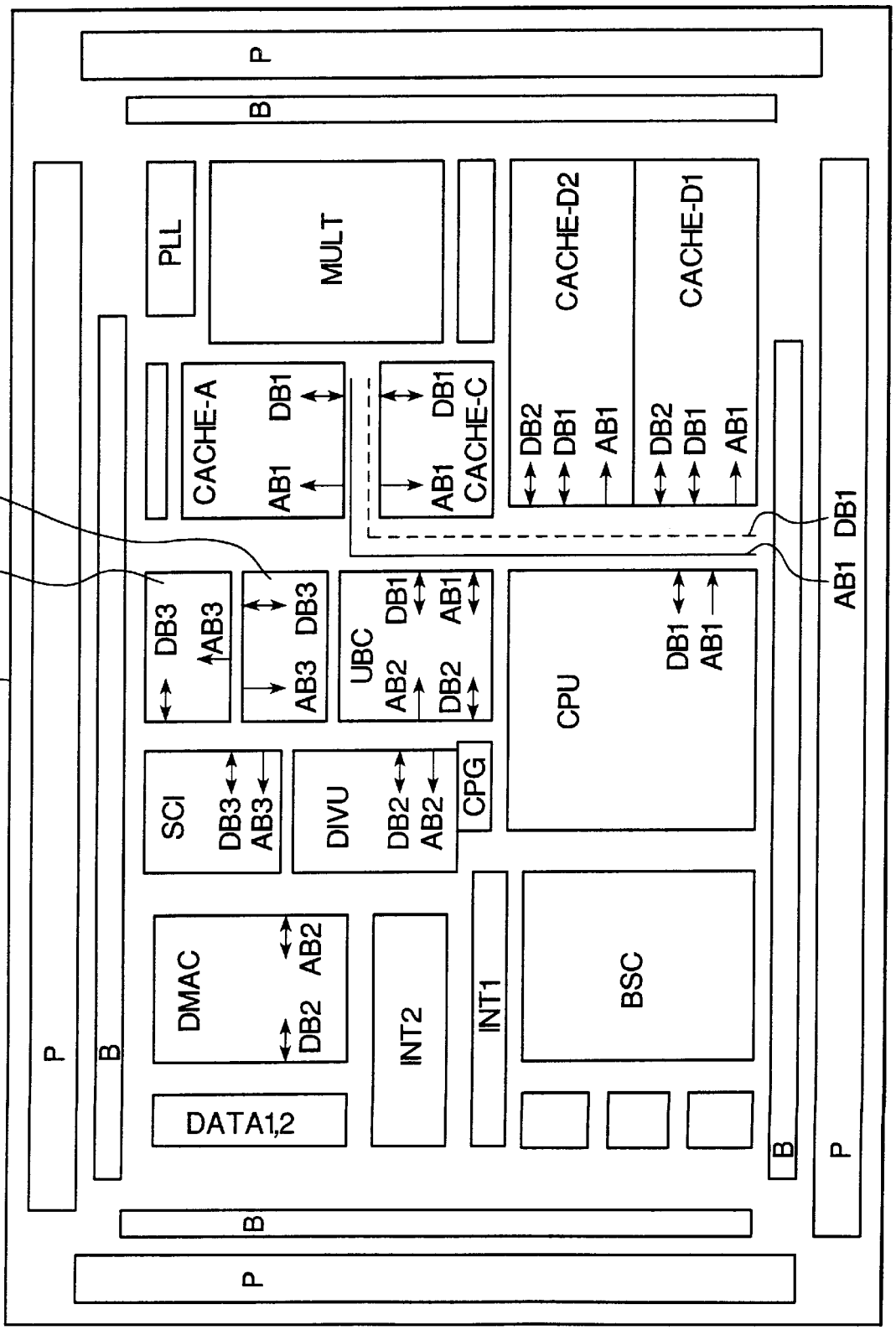
FIG. 40 is a layout diagram showing one embodiment of the single-chip microcomputer of FIG. 1.

FIG. 40 is a layout diagram showing one embodiment of the single-chip microcomputer of FIG. 1. In FIG. 40, the main circuits of the individual circuit blocks of FIG. 1 are representatively shown by way of example. The individual circuit blocks are so arranged as to have the individual buses shortened and their connections facilitated as the bus is divided into three, as has been described hereinbefore. It should be understood that the first bus (AB1, DB1) of the divided three buses is shown in FIG. 40 whereas the remaining second bus (AB2, DB2) and third bus (AB3, DB3) are arranged adjacent to the corresponding circuit blocks.

The central processing unit CPU and the cache data units (CDM) CACHE-D1 and CACHE-D2 of the cache memory are arranged across the first bus. The cache memory has its cache tag unit (TAG) CACHE-A and cache control unit (CAC) CACHE-C arranged together the multiplier unit MULT. The aforementioned central processing unit CPU and the multiplier unit MULT occupy the upper half of the chip substantially.

The bus state controller BSC is arranged to interpose the central processing unit CPU between itself and the cache data units CACHE-D1 and CACHE-D2. There are concentrated and arranged at the lefthand portion of the chip the break controller UBC, the divider unit DIVU, the interrupt control units INT1 and INT2, the direct memory access control unit DMAC and the data buffers DATA1 and DATA2, which are connected with the not-shown second bus (AB2, DB2).

Moreover, there are juxtaposed the timers FRT and WDT and the serial communication interface SCI which are connected with the not-shown third bus (AB3, DB3). These peripheral modules can have their occupied areas reduced by using those existing circuits as they are, which have their output circuit operations relatively delayed by delaying their bus cycles. In the periphery of the chip, there are arranged: a region P for forming bonding pads to be coupled to the aforementioned external terminals (as shown in FIGS. 2 and 3); and a region B for forming the input buffer, the output buffer and the input/output buffer corresponding to the bonding pads.

Figure 41A:
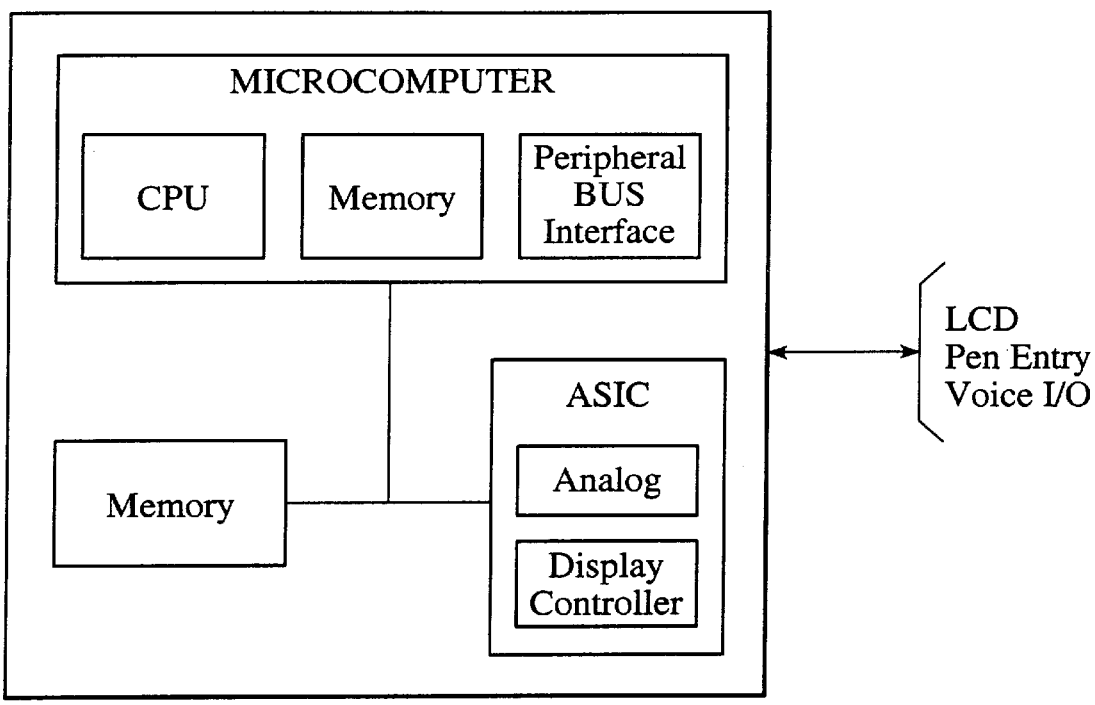
FIGS. 41(A) and 41(B) are a schematic construction diagram showing an applied example of the single-chip microcomputer according to the present invention.
Figure 41B:
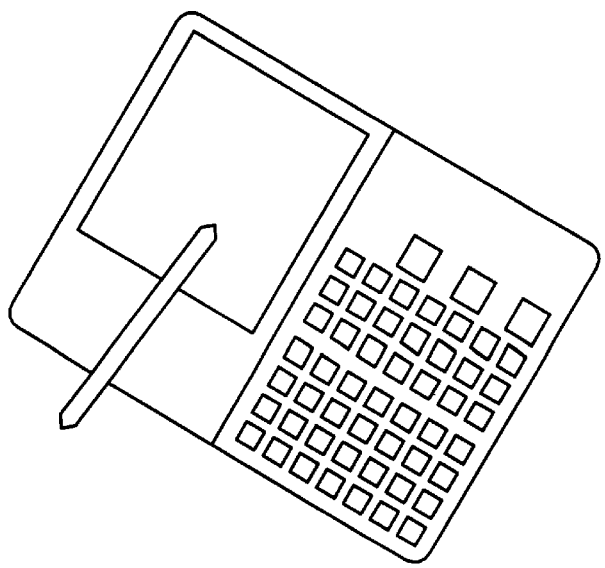

FIG. 41 shows an example of application of the single-chip microcomputer according to the present invention. FIG. 41(A) presents the block diagram of the application, and FIG. 41(B) presents an external view. This embodiment is directed to a pen-input type portable microcomputer.

In this embodiment, as shown in the block diagram of (A), the microcomputer is constructed of: the aforementioned single-chip microcomputer of FIG. 1; and a peripheral LSI composed of an external memory (Memory) and an ASIC (i.e., Application Specified IC). The terminal equipment is exemplified by a display unit having a pen entry function added to the LCD, and an voice input/output circuit. As seen from the external view (B), the microcomputer is made as thin and light as that of a palm-top type or notebook type and has its LCD display equipped with the pen entry portion and the key entry switch panel.

Figure 42:
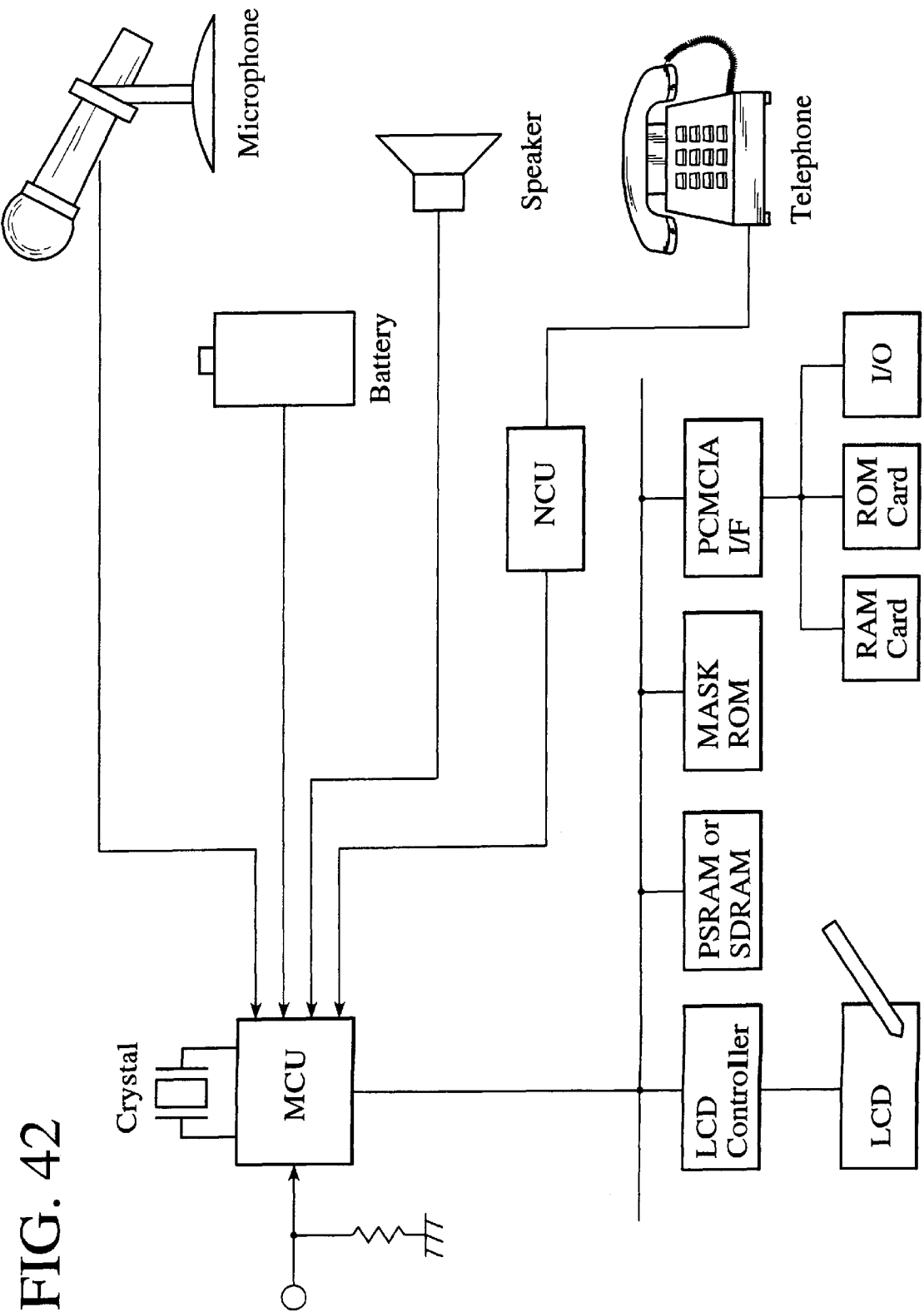
FIG. 42 is a block diagram showing one embodiment of a pen-input portable microcomputer or an applied example of the single-chip microcomputer according to the present invention.

FIG. 42 is a block diagram showing one embodiment of the pen entry type portable microcomputer of FIG. 40. The single-chip microcomputer MCU is driven by a battery. A microphone is used for the voice entry. A speaker is used for voice outputting.

Letters NCU designate an input/output interface for telephone circuits for inputting or outputting data through telephones. The microcomputer system is equipped on its external bus with the LCD panel for the display and the pen entry through the LCD controller. The external memory is exemplified by the SDRAM and the PSRAM. These memories are backed up, if necessary, by the battery voltage.

A mask ROM is stored with programs for data processing and letter patterns. Letters PCMCIAI/F designate a Personal Computer Memory Card International Association interface. Letters I/O designate an extended peripheral interface such as a wireless LAN (i.e., Local Area Network). Moreover, memory cards including a ROM card and a RAM card can be used as detachable external memories.

The operational effects to be obtained from the embodiments thus far described are as follows.

(1) The internal bus is divided into three: the first bus is connected with the central processing unit and the cache memory, and the second bus is connected with the direct memory access controller and the external bus interface. The first bus and the second bus are equipped with the break controller having a bus transceiver function to connect the first address bus and the second address bus selectively. The third bus is connected with peripheral modules and given a lower speed than the first and second bus cycles. There is provided the bus state controller for data transfers and synchronizations between the second bus and the third bus. As a resultant effect, the load capacity of a signal transmission path can be reduced to effect the signal transmissions at a high speed. Moreover, the consumption of current through the peripheral modules required to have no high operation speed can be reduced because the peripheral modules are isolated.

(2) The internal bus is divided into three: the first bus is connected with the central processing unit and the fixed point type multiply and accumulate arithmetic unit, and the second bus is connected with the fixed point type divider unit. As a resultant effect, the multiply and accumulate arithmetic operations can be accomplished at a high speed with a small number of cycles. The second bus is connected with the fixed point type divider unit, in which the arithmetic resultant effect is subjected to a dividing operation while another multiply and accumulate operations can be being carried out in parallel, so that the three-dimensional image processing can be accomplished at a high speed.

(3) The peripheral modules to be connected with the third bus are exemplified by at least one of the free running timer, the serial communication interface and the watch-dog timer. As a result, the peripheral modules, which have no direct participation in the speed-up of the data processing, can be given low-speed bus cycles. Thus, the existing peripheral modules can be used as they are without following the high speed of the central processing unit, to make the design efficient and to reduce the power dissipation in the peripheral modules.

(4) The aforementioned break controller is given a function to monitor the rewrite of the data of the cache memory by the direct memory access controller. As a resultant effect, the break of the cache data due to the rewrite of the data of the cache memory by the direct memory access controller can be detected while speeding up the operation and reducing the power dissipation by dividing the internal bus.

(5) Each of the aforementioned circuit blocks is constructed of the full static type CMOS circuit and is equipped with an operation mode controller including the register for controlling the feed/stop of a clock pulse. As a resultant effect, the clock can be fed to only the necessary circuit block so that the power dissipation can be reduced.

(6) The aforementioned external bus interface is given the burst read mode and the single-write mode of the synchronous dynamic type RAM, and the interface function to access the dynamic type RAM and the pseudo-static type RAM directly. As a resultant effect, the synchronous dynamic type RAM, the dynamic RAM and the pseudo-static type RAM can be directly connected by the external bus interface, to improve the user-friendliness.

(7) The clock pulse is produced with a phase delay from the clock pulse of the external bus interface and is fed to the central processing unit. As a resultant effect, the setup/hold time of the synchronous dynamic type RAM can be retained to extend the operation margin.

(8) The matching is given among the data to be read out in the burst read mode of the synchronous dynamic type RAM, the data of one block of the aforementioned cache memory, and the data transfer unit by the direct memory access controller. As a resultant effect, an efficient data transfer can be accomplished.

(9) The external bus interface is equipped with the memory control signal generator for generating the control signal necessary for setting the operation mode of the synchronous dynamic type RAM by using an address signal partially, when the central processing unit is started by accessing the predetermined access space to set the row address strobe signal, the column address strobe signal and the write enable signal to the low level. As a resultant effect, the synchronous dynamic type RAM can have its modes easily set by the central processing unit.

(10) The aforementioned cache memory is constructed of a plurality of tag memories and data memories corresponding to the tag memories. These tag memories and data memories are composed of CMOS static type memory cells. The sense amplifier for amplifying the read signals of the memory cells is exemplified by the CMOS latch circuit and the CMOS sense amplifier having the power switch MOSFETs composed of the P-channel type MOSFETs and the N-channel type MOSFETs for feeding the operation current to the CMOS latch circuit. As a resultant effect, no DC current can flow after the signal amplification to reduce the power dissipation.

(11) Only that one of the plurality of data memories which corresponds to the hit signal coming from the tag memory is activated. As a resultant effect, the power dissipation can be reduced.

(12) The plurality of data memories invalidate the transmission of all or a portion of the hit signals from the tag memory by the cache controller to make a direct access possible by the central processing unit. As a resultant effect, the manners of use can satisfy the various requests of users.

(13) In the single-chip microcomputer including the central processing unit and the cache memory, the cache memory is exemplified by CMOS static type memory cells as memory elements, and the sense amplifier for amplifying the read signal is exemplified by the CMOS latch circuit and the CMOS sense amplifier composed of the P-channel type MOSFETs and the N-channel type MOSFETs for feeding the operation current to the CMOS latch circuit. As a resultant effect, no DC current can flow after the signal amplification of the sense amplifier to reduce the power dissipation in the packaged cache memory.

(14) Only that one of the plurality of data memories which corresponds to the hit signal corresponding to the hit signal coming from the tag memory is activated. As a resultant effect, the power dissipation can be reduced in the single-chip microcomputer having the cache memory packaged therein.

(15) The first external terminal and the second external terminal are switched for the bus request signal and the bus acknowledge signal, respectively, when the slave mode is set according to the bus use priority control signal, and the first external terminal and the second external terminal are switched for the bus grant signal and the bus release signal, respectively, when the master mode is set. As a resultant effect, one single-chip microcomputer can be used for both the slave mode and the master mode in accordance with the bus use priority control signal, and the terminals are switched for use. As a resultant effect, the external terminals can be reduced in number and easily connected to improve the user-friendliness.

(16) The clipping processing of the (N−1)th coordinate having been subjected to the perspective transformation processing is performed by the central processing unit. The coordinate transformation processing for transforming the (N+1)th coordinate point intrinsic to a predetermined object into the coordinate having a predetermined view point as an origin point is performed by the central processing unit and the multiply and accumulate arithmetic unit. The perspective transformation processing of the N-th coordinate having been subjected to the coordinate transformation processing is performed by the divider unit in time parallel with the aforementioned clipping processing and coordinate transformation processing. Simultaneously in parallel with the clipping processing and the coordinate transformation processing either by the central processing unit and by the central processing unit and the multiply and accumulate arithmetic unit, the perspective transformation processing taking a longer time period is performed by the divider unit. As a resultant effect, a high-speed three-dimensional image processing can be realized.

(17) The aforementioned three-dimensional image processing is carried out by the single-chip microcomputer which comprises: the central processing unit and the multiply and accumulate arithmetic unit connected with the first bus together with the cache memory; the divider unit connected with the second bus together with the direct memory access control circuit and the external bus interface; the break controller connected with the first and second buses and having the bus transceiver function to connect the address bus of the first bus selectively with the address bus of the second bus; the peripheral modules connected with the third bus having a lower-speed bus cycle than the first and second bus cycles; and the bus state controller for effecting the signal transfers and the synchronization between the second bus and the third bus. As a resultant effect, a high-speed three-dimensional image processing can be realized by the relatively simple construction.

Although our invention has been specifically described in connection with its embodiments, it should not be limited to the embodiments but can naturally be modified in various manners without departing from the gist thereof.

In the embodiment of FIG. 1, for example, the central processing unit CPU should not be limited to the RISC type processor but can take a variety of modes of embodiment. The single-chip microcomputer of this embodiment may have the ASIC construction, in which the aforementioned individual circuit blocks are registered so that their necessary ones may be mounted according to the specifications of a user.

The single-chip microcomputer used in this specification has not a narrow meaning of the microcomputer having a ROM and a RAM packaged therein but a wide meaning of a data processor formed over one semiconductor substrate. Therefore, the single-chip microcomputer according to the present invention can be expressed as the data processor which has a central processing unit, a multiply and accumulate arithmetic unit and a divider unit, which can have at least its multiply and accumulate arithmetic unit and divider unit processed in parallel and which is formed over a single semiconductor substrate. Alternatively, the single-chip microcomputer can be said the data processor which can be connected with a continuously readable external memory and which is equipped over a single semiconductor substrate with a cache memory and means for reading the data having a data length of one line of the cache memory continuously from the external memory.

Moreover, the single-chip microcomputer of the invention can be said the data processor which can be connected with a mode settable external memory and which is equipped over a single semiconductor substrate with means for making a transfer to the external memory through an external terminal other than the mode setting data bus terminal. Furthermore, the single-chip microcomputer may be said: the data processor which can be connected with an external memory for inputting/outputting addresses and data in synchronism with a clock and which is formed over a single semiconductor substrate with means for producing the clock necessary for the memory and the data processor; or the data processor which includes a central processing unit for accessing a memory at the unit of 32 bits to execute an instruction having a fixed length of 16 bits, and an instruction/data unified cache memory and in which an instruction for loading/storing operations from the memory is placed at even word boundaries.

The present invention can be applied to the single-chip microcomputer having the above-specified wide meaning and to the three-dimensional image processing using the former.

The effects to be obtained from the representative of the invention disclosed herein will be briefly described in the following.

Specifically, the internal bus is divided into three: the first bus is connected with the central processing unit and the cache memory, and the second bus is connected with the direct memory access controller and the external bus interface. The first bus and the second bus are equipped with the break controller having a bus transceiver function to connect the first address bus and the second address bus selectively. The third bus is connected with peripheral modules and given a lower-speed bus cycle than the first and second bus cycles. There is provided the bus state controller for data transfers and synchronizations between the second bus and the third bus. As a result, the load capacity of a signal transmission path can be reduced to effect the signal transmissions at a high speed. Moreover, the consumption of current through the peripheral modules required to have no high operation speed can be reduced because the peripheral modules are isolated.

The internal bus is divided into three: the first bus is connected with the central processing unit and the fixed point type multiply and accumulate arithmetic unit, and the second bus is connected with the fixed point type divider unit. As a result, the multiply and accumulate arithmetic operations can be accomplished at a high speed with a small number of cycles. The second bus is connected with the fixed point type divider unit, in which the arithmetic result is subjected to a dividing operation while another multiply and accumulate operations can be being carried out in parallel, so that the three-dimensional image processing can be accomplished at a high speed.

The peripheral modules to be connected with the third bus are exemplified by at least one of the free running timer, the serial communication interface and the watch-dog timer. As a result, the peripheral modules, which have no direct participation in the speed-up of the data processing, can be given low-speed bus cycles. Thus, the existing peripheral modules can be used as they are without following the high speed of the central processing unit, to make the design efficient and to reduce the power dissipation in the peripheral modules. The aforementioned break controller is given a function to monitor the rewrite of the data of the cache memory by the direct memory access controller. As a result, the break of the cache data due to the rewrite of the data of the cache memory by the direct memory access controller can be detected while speeding up the operation and reducing the power dissipation by dividing the internal bus.

Each of the aforementioned circuit blocks is constructed of the full static type CMOS circuit and is equipped with an operation mode controller including the register for controlling the feed/stop of a clock pulse. As a result, the clock can be fed to only the necessary circuit block so that the power dissipation can be reduced.

The aforementioned external bus interface is given the burst read mode and the single-write mode of the synchronous dynamic type RAM, and the interface function to access the dynamic type RAM and the pseudo-static type RAM directly. As a result, the synchronous dynamic type RAM, the dynamic RAM and the pseudo-static type RAM can be directly connected by the external bus interface, to improve the user-friendliness.

The clock pulse is produced with a phase delay from the clock pulse of the external bus interface and is fed to the central processing unit. As a result, the setup/hold time of the synchronous dynamic type RAM can be retained to extend the operation margin.

The matching is given among the data to be read out in the burst read mode of the synchronous dynamic type RAM, the data of one block of the aforementioned cache memory, and the data transfer unit by the direct memory access controller. As a result, an efficient data transfer can be accomplished.

The external bus interface is equipped with the memory control signal generator for generating the control signal necessary for setting the operation mode of the synchronous dynamic type RAM by using an address signal partially, when the central processing unit is started by accessing the predetermined access space to set the row address strobe signal, the column address strobe signal and the write enable signal to the low level. As a result, the synchronous dynamic type RAM can have its modes easily set by the central processing unit.

The aforementioned cache memory is constructed of a plurality of tag memories and data memories corresponding to the tag memories. These tag memories and data memories are composed of CMOS static type memory cells. The sense amplifier for amplifying the read signals of the memory cells is exemplified by the CMOS latch circuit and the CMOS sense amplifier having the power switch MOSFETs composed of the P-channel type MOSFETs and the N-channel type MOSFETs for feeding the operation current to the CMOS latch circuit. As a result, no DC current can flow after the signal amplification to reduce the power dissipation.

Only that one of the plurality of data memories which corresponds to the hit signal coming from the tag memory is activated. As a result, the power dissipation can be reduced.

The plurality of data memories invalidate the transmission of all or a portion of the hit signals from the tag memory by the cache controller to make a direct access possible by the central processing unit. As a result, the manners of use can satisfy the various requests of users.

In the single-chip microcomputer including the central processing unit and the cache memory, the cache memory is exemplified by CMOS static type memory cells as memory elements, and the sense amplifier for amplifying the read signal is exemplified by the CMOS latch circuit and the CMOS sense amplifier composed of the P-channel type MOSFETs and the N-channel type MOSFETs for feeding the operation current to the CMOS latch circuit. As a result, no DC current can flow after the signal amplification of the sense amplifier to reduce the power dissipation in the packaged cache memory.

Only that one of the plurality of data memories which corresponds to the hit signal corresponding to the hit signal coming from the tag memory is activated. As a result, the power dissipation can be reduced in the single-chip microcomputer having the cache memory packaged therein.

The first external terminal and the second external terminal are switched for the bus request signal and the bus acknowledge signal, respectively, when the slave mode is set according to the bus use priority control signal, and the first external terminal and the second external terminal are switched for the bus grant signal and the bus release signal, respectively, when the master mode is set. As a result, one single-chip microcomputer can be used for both the slave mode and the master mode in accordance with the bus use priority control signal, and the terminals are switched for use. As a result, the external terminals can be reduced in number and easily connected to improve the user-friendliness.

The clipping processing of the (N−1)th coordinate having been subjected to the perspective transformation processing is performed by the central processing unit. The coordinate transformation processing for transforming the (N+1)th coordinate point intrinsic to a predetermined object into the coordinate having a predetermined view point as an origin point is performed by the central processing unit and the multiply and accumulate arithmetic unit. The perspective transformation processing of the N-th coordinate having been subjected to the coordinate transformation processing is performed by the divider unit in time parallel with the aforementioned clipping processing and coordinate transformation processing. Simultaneously in parallel with the clipping processing and the coordinate transformation processing either by the central processing unit and by the central processing unit and the multiply and accumulate arithmetic unit, the perspective transformation processing taking a longer time period is performed by the divider unit. As a result, a high-speed three-dimensional image processing can be realized.

The aforementioned three-dimensional image processing is carried out by the single-chip microcomputer which comprises: the central processing unit and the multiply and accumulate arithmetic unit connected with the first bus together with the cache memory; the divider unit connected with the second bus together with the direct memory access control circuit and the external bus interface; the break controller connected with the first and second buses and having the bus transceiver function to connect the address bus of the first bus selectively with the address bus of the second bus; the peripheral modules connected with the third bus having a lower-speed bus cycle than the first and second bus cycles; and the bus state controller for effecting the signal transfers and the synchronization between the second bus and the third bus. As a result, a high-speed three-dimensional image processing can be realized by the relatively simple construction.

What is claimed is:

1. A single-chip microcomputer for use with an external memory, wherein the external memory has a clock signal input terminal and a clock enable signal input terminal and operating in synchronization with a first clock signal having a first frequency and first phase, the first clock signal received at the clock signal input terminal, the single-chip microcomputer comprising:

a central processing unit which operates in accordance with a second clock signal having the first frequency and a second phase;

a clock signal providing circuit which provides the second clock signal to the central processing unit and which provides a clock signal as the first clock signal to the clock signal input terminal of the external memory via the first external clock terminal;

a second external terminal; and a memory control unit which provides to the second external terminal a clock enable signal to be received by the clock enable signal input terminal of the external memory, wherein the clock enable signal indicates to the external memory whether the first clock signal is enabled;

wherein the external memory is controlled in a synchronous manner responsive to the first clock signal based on the clock enable signal.

2. A single-chip microcomputer according to claim 1, further comprising third external terminals, wherein the central processing unit provides control signals to the external memory via the third external terminals in synchronization with the second clock signal, and wherein the external memory receives the control signals in synchronization with the first clock signal when the clock enable signal indicates that the first clock signal is enabled.

3. A single-chip microcomputer according to claim 1, wherein the phase difference between the first clock signal and the second clock signal is about 90 degrees.

4. A single-chip microcomputer according to claim 2, wherein the clock signal providing circuit includes:

a frequency doubler; and a frequency divider dividing an output of the frequency doubler into a plurality of clock signals of different phases, wherein one of the plurality of clock signals is used as the first clock signal and another of the plurality of clock signals is used as the second clock signal.

5. A single chip microcomputer according to claim 4, wherein the external memory comprises a synchronous dynamic random access memory.

6. A single-chip microcomputer according to claim 5, wherein the control signals include a row address strobe signal, a column address strobe signal, a chip select signal, a write enable signal and address signals, wherein the first clock signal has a phase advanced from a phase of the second clock signal.

7. A single-chip microcomputer according to claim 6, wherein the memory control unit generates the row address strobe signal, the column address strobe signal, the chip select signal and the write enable signal.

8. A single-chip microcomputer according to claim 7, wherein the memory control unit controls signal levels of the row address strobe signal, the column address strobe signal, the clip select signal and the write enable signal to input a predetermined command to the synchronous dynamic random access memory.

9. A method for controlling a synchronous external memory in a data processing system, the data processing system having a single-chip processor, the memory being external to the single-chip processor, the method comprising the steps of:

generating a system clock signal having a first frequency and first phase with a clock signal providing circuit in the single-chip processor;

generating a memory clock signal in the single-chip processor by phase adjusting the system clock signal, the memory clock signal having the first frequency and a second phase;

generating a clock enable signal in the single-chip processor wherein the clock enable signal indicates to the external memory whether the memory clock signal is enabled;

providing the system clock signal to a processing unit in the single-chip processor; and providing the memory clock signal to the external memory;

wherein the external memory is controlled in a synchronous manner responsive to the memory clock signal and the clock enable signal.

10. The method of claim 9, wherein the external memory comprises a synchronous dynamic random access memory (SDRAM).

11. A method according to claim 9, wherein the second phase is phase advanced from the first phase of the system clock signal.

12. The method of claim 10, wherein the single-chip processor is programmed to control the phase adjusting of the system clock signal based on set-up and hold-time characteristics of the SDRAM.

13. A single-chip processor having a system clock signal with a first frequency and first phase the single-chip processor comprising:

a memory clock signal generator which receives the system clock signal of the single-chip processor and which generates a memory clock signal by phase adjusting the system clock signal, the memory clock signal having the first frequency and a second phase;

a first terminal receiving the memory clock signal, the first terminal providing the memory clock signal to be coupled to a synchronous memory external to the single-chip processor; and a memory control signal generator, the memory control signal generator generating control signals to be coupled to the synchronous memory, the control signals including a clock enable signal, the clock enable signal indicating to the synchronous memory whether the memory clock signal is enabled, a row address strobe signal, a column address strobe signal, a chip select signal and a write enable signal;

wherein the external memory is controlled in a synchronous manner responsive to the first clock signal based on the clock enable signal.

14. A single-chip processor according to claim 13, wherein the memory control signal generator controls signal levels of the row address strobe signal, the column address strobe signal, the chip select signal and the write enable signal to input a predetermined command to the synchronous memory.

15. A method for controlling a synchronous memory in a data processing system, the data processing system having a single-chip processor, wherein the synchronous memory is external to the single-chip processor, the method comprising the steps of generating a system clock signal having a first frequency and first phase with a clock signal providing circuit in the processor;

generating a memory clock signal in the single-chip processor based on the system clock signal, the memory clock signal having the first frequency and a second phase;

supplying a plurality of control signals to the synchronous memory from the single-chip processor, wherein the plurality of control signals including a clock enable signal, the clock enable signal indicating to the synchronous memory whether the memory clock signal is enabled;

wherein the synchronous memory operates in one of a plurality of modes in response to the plurality of control signals from the single-chip processor, providing the system clock signal to a processing unit in the single-chip processor, and providing the memory clock signal to the synchronous memory, wherein the synchronous memory operates synchronously responsive to the memory clock signal and based on the clock enable signal in the one of the plurality of modes responsive to the plurality of control signals from the single-chip processor.

16. The method of claim 15, wherein the synchronous memory comprises a synchronous dynamic random access memory (SDRAM).

17. The method of claim 15, wherein the single-chip processor is programmed to controls a phase abutment of the system clock signal based on set-up and hold-time characteristics of the synchronous memory.

18. The method of claim 15, wherein the control signals comprise a row address strobe signal, a column address strobe signal, a chip select signal and a write enable signal.

19. The method of claim 18, wherein signal levels of the row address strobe signal the column address strobe signal, the chip select signal and the write enable signal are controlled by the single-chip processor to input a predetermined command to the synchronous memory.

* * * * *